United States Patent
Verheyden et al.

(10) Patent No.: US 11,048,051 B2
(45) Date of Patent: Jun. 29, 2021

(54) SHUTTER CONFIGURATION FOR A FIBER OPTIC CONNECTOR PORT WITH MODULAR FIBER CARRIERS; AND CONNECTION SYSTEM

(71) Applicant: COMMSCOPE TECHNOLOGIES LLC, Hickory, NC (US)

(72) Inventors: Danny Willy August Verheyden, Kessel-Lo (BE); Jozef Christiaan Mathieu Versleegers, Bree (BE); Alfons Rudi Hermans, Sint-Truiden (BE); Thierry Mike Declerck, Kumtich (BE); Michael Maris, Paal (BE); Walter Mattheus, Wijgmaal (BE); David Donald Erdman, Hummelstown, PA (US); Randall Bobby Paul, Elizabethville, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/757,144

(22) PCT Filed: Oct. 16, 2018

(86) PCT No.: PCT/US2018/056120
§ 371 (c)(1),
(2) Date: Apr. 17, 2020

(87) PCT Pub. No.: WO2019/079326
PCT Pub. Date: Apr. 25, 2019

(65) Prior Publication Data
US 2020/0341208 A1 Oct. 29, 2020

Related U.S. Application Data

(60) Provisional application No. 62/573,618, filed on Oct. 17, 2017, provisional application No. 62/573,625, (Continued)

(51) Int. Cl.
*G02B 6/38* (2006.01)
*G02B 6/40* (2006.01)
(Continued)

(52) U.S. Cl.
CPC ......... *G02B 6/3885* (2013.01); *G02B 6/3636* (2013.01); *G02B 6/3652* (2013.01);
(Continued)

(58) Field of Classification Search
None
See application file for complete search history.

(56) References Cited

U.S. PATENT DOCUMENTS 4,911,526 A * 3/1990 Hsu .......................... B41J 2/46
385/115
4,923,275 A * 5/1990 Kaukeinen ................ B41J 2/46
385/115

(Continued)

FOREIGN PATENT DOCUMENTS

JP 2000180670 A * 6/2000
KR 20020095866 A * 12/2002
(Continued)

OTHER PUBLICATIONS

Shin et al. (Derwent-Acc-No. 2003-309612), Abstractor KR 2002-095866, Dec. 28, 2002. (Year: 2002).*
(Continued)

*Primary Examiner* — Michelle R Connelly
(74) *Attorney, Agent, or Firm* — Merchant & Gould P.C.

(57) ABSTRACT

The present disclosure relates to connector ports with shutters configured to inhibit dust intrusion by including periph-
(Continued)

eral regions that oppose undercut portions of the connector port when the shutter is closed. The present disclosure also relates to fiber optic connectors having latching configurations with double latches for retaining the fiber optic connectors in connector ports. The present disclosure also relates to a fiber optic connector including a plurality of stacked fiber carrier modules. The present disclosure also relates to a fiber optic connector including a connector body and a rear connector piece that is secured to the connector body by a snap-fit connection. The rear connector piece can be configured for attachment to a fiber optic cable. The rear connector piece can be secured to the connector body by a snap-fit connection. The rear connector piece can have a snap-fit interface compatible with a number of different styles or types of connector bodies to promote manufacturing efficiency.

11 Claims, 61 Drawing Sheets

Related U.S. Application Data filed on Oct. 17, 2017, provisional application No. 62/573,608, filed on Oct. 17, 2017.

(51) Int. Cl.
*G02B 6/36* (2006.01)
*G02B 6/42* (2006.01)

(52) U.S. Cl.
CPC ......... *G02B 6/3809* (2013.01); *G02B 6/3839* (2013.01); *G02B 6/3849* (2013.01); *G02B 6/3861* (2013.01); *G02B 6/368* (2013.01); *G02B 6/3821* (2013.01); *G02B 6/3825* (2013.01); *G02B 6/3851* (2013.01); *G02B 6/403* (2013.01); *G02B 2006/4297* (2013.01)

(56) References Cited

U.S. PATENT DOCUMENTS

| | | | | |
|---|---|---|---|---|
| 4,991,930 A * | 2/1991 | Baek | | G02B 6/06 |
| | | | | 385/115 |
| 5,528,713 A * | 6/1996 | Dannoux | | G02B 6/30 |
| | | | | 385/49 |
| 6,364,539 B1 * | 4/2002 | Shahid | | G02B 6/3879 |
| | | | | 385/65 |
| 6,595,696 B1 | 7/2003 | Zellak | | |
| 8,870,466 B2 | 10/2014 | Lu | | |
| 8,985,864 B2 | 3/2015 | Ott | | |
| 9,575,272 B2 | 2/2017 | Ott | | |
| 9,759,869 B2 | 9/2017 | Verheyden et al. | | |
| 9,810,850 B1 * | 11/2017 | Angelov | | G02B 6/3839 |
| 9,971,096 B2 * | 5/2018 | Shastri | | G02B 6/136 |
| 2002/0003933 A1 * | 1/2002 | Sherrer | | G02B 6/3652 |
| | | | | 385/83 |
| 2003/0174998 A1 * | 9/2003 | Shevchuk | | G02B 6/3878 |
| | | | | 385/137 |
| 2005/0031290 A1 * | 2/2005 | Shevchuk | | G02B 6/3878 |
| | | | | 385/137 |
| 2013/0156379 A1 | 6/2013 | Ott | | |
| 2013/0308908 A1 | 11/2013 | Isenhour et al. | | |
| 2014/0072265 A1 | 3/2014 | Ott | | |
| 2015/0378109 A1 | 12/2015 | Samal et al. | | |
| 2018/0113260 A1 * | 4/2018 | Abumi | | G02B 6/3809 |

FOREIGN PATENT DOCUMENTS

| | | | | |
|---|---|---|---|---|
| WO | 2012/112344 A1 | 8/2012 | | |
| WO | 2013/036843 A2 | 3/2013 | | |
| WO | 2013/117589 A2 | 8/2013 | | |
| WO | 2013/117598 A2 | 8/2013 | | |
| WO | 2015/048198 A1 | 4/2015 | | |
| WO | 2016/043922 A1 | 3/2016 | | |
| WO | 2016/100384 A1 | 6/2016 | | |
| WO | WO-2016100384 A1 * | 6/2016 | ........... | G02B 6/3825 |
| WO | 2017/081306 A1 | 5/2017 | | |
| WO | 2017/192461 A2 | 11/2017 | | |
| WO | 2017/223072 A1 | 12/2017 | | |
| WO | 2018/020022 A1 | 2/2018 | | |
| WO | 2018/144128 A2 | 8/2018 | | |

OTHER PUBLICATIONS

International Search Report and Written Opinion of the International Searching Authority for International Patent Application No. PCT/US2018/056120 dated Mar. 11, 2019, 15 pages.

* cited by examiner

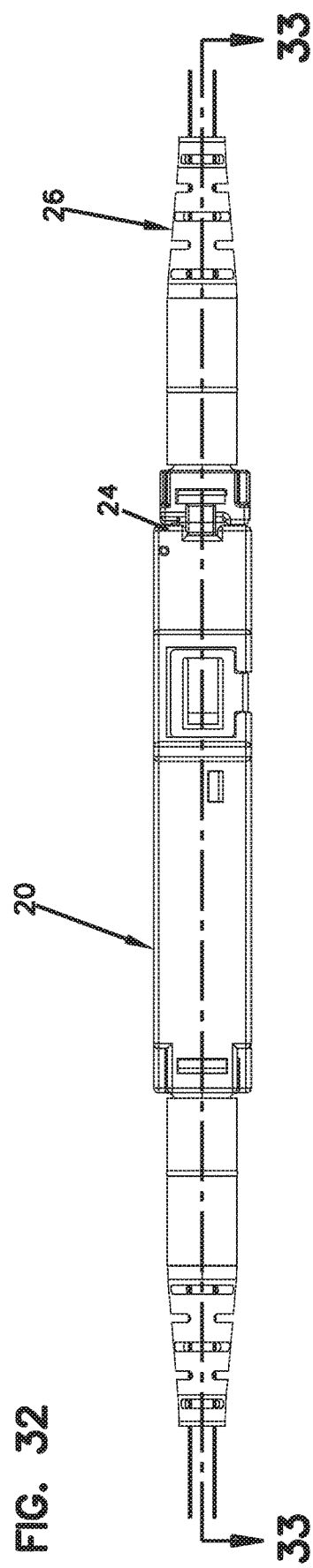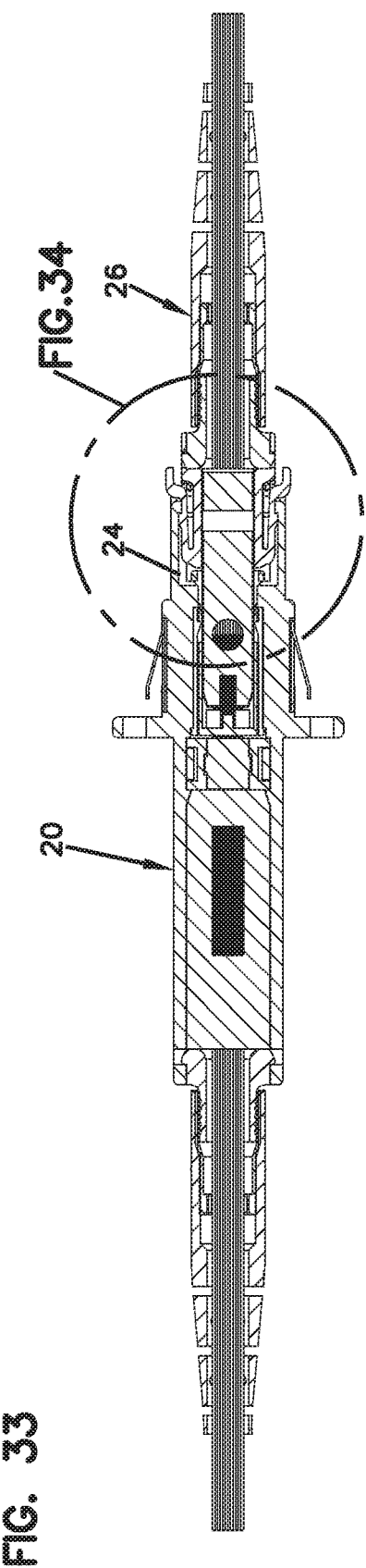

SHUTTER CONFIGURATION FOR A FIBER OPTIC CONNECTOR PORT WITH MODULAR FIBER CARRIERS; AND CONNECTION SYSTEM

CROSS-REFERENCE TO RELATED APPLICATIONS

This application is a National Stage Application of PCT/US2018/056120, filed on Oct. 16, 2018, which claims the benefit of U.S. Patent Application Ser. No. 62/573,618, filed on Oct. 17, 2017, and claims the benefit of U.S. Patent Application Ser. No. 62/573,625, filed on Oct. 17, 2017, and claims the benefit of U.S. Patent Application Ser. No. 62/573,608, filed on Oct. 17, 2017, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to ferrule-less fiber optic connectors such as multi-fiber ferrule-less fiber optic connectors.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly and demateably optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Fiber optical adapters for ferrule-less connectors can include internal fiber alignment devices configured to receive bare optical fibers of ferrule-less fiber optic connectors desired to be optically coupled together and to align the fiber tips of the fiber optic connectors to enable the transfer of optical signals there between. Example ferrule-less fiber optic connectors and/or fiber optic adapters are disclosed by PCT Publication Nos. WO 2012/112344; WO 2013/117598; WO 2017/081306; WO 2016/100384; WO 2016/043922; and U.S. Pat. Nos. 8,870,466 and 9,575,272.

In other examples, fiber optic connectors can have male and female configurations which allow the male and female fiber optic connectors to be directly optically coupled together without the need for an intermediate fiber optic adapter. The male and female optical connectors have rear ends that are mechanically coupled (e.g., by crimps, adhesive or other means) to the ends of fiber optic cables.

SUMMARY

One aspect of the present disclosure relates to a shutter configuration for a fiber optic connector port that is configured to inhibit the ingress of dust or other contaminants. In certain examples, the shutter configuration includes a shutter moveable between an open position and a closed position. When the shutter is in the closed position, peripheral portions of the shutter can overlap undercut portions of the walls defining the connector port to provide enhanced ingress protection. In certain examples, the connector port is defined by a main connector body having an open side, and the shutter can be loaded into a mounted position through the open side. Thereafter, the open side can be covered by a cover piece. In certain examples, the cover piece can carry a fiber alignment structure such as a bare fiber alignment structure for aligning bare optical fibers. In certain examples, the cover piece that encloses the open side of the connector body defining the connector port includes a front lip that overhangs a pivot interface of the shutter to provide front coverage of the pivot interface. In certain examples, the connector port includes undercut surfaces that extend along a bottom section and side sections of the port. In certain examples, guide or alignment slots are defined through side shoulders defining the undercut portions with the alignment slots being configured for receiving latches of a male fiber optic connector adapted to be inserted into the fiber optic connector port. In certain examples, the male fiber optic connector can include integrated double latches having base ends that are unitarily (e.g., monolithically) formed with sidewalls of connector body of the male fiber optic connector.

In certain examples, the shutter is spring biased toward the closed position. In certain examples, a spring can be pre-mounted on the shutter prior to installing the shutter at the connector port, and the spring can be automatically tensioned upon loading the shutter into the connector port. In certain examples, the spring is carried with the shutter. In certain examples, the shutter includes pivot pins, and the spring includes coil portions that mount over the pivot pins. In certain examples, the shutter includes an integrated shroud section that at least partially surrounds and covers the coil portions of the spring. In certain examples, the spring can have a loop portion that extends between the coil portions and that is received within a recessed region defined at a backside of a main body of the shutter. In certain examples, the recessed region can surround a central protrusion that extends through the spring loop and conforms in general shape to the shape of the spring loop.

Another aspect of the present disclosure relates to a fiber optic connector including the connector body, the first and second latches having base ends unitarily formed with the connector body. In certain examples, latches can be individually actuated or can be actuated by an actuation structure (e.g., a slide collar) that ensures the latches are actuated concurrently. In certain examples, the latches each have a cantilevered configuration.

Another aspect of the present disclosure relates to a shutter configuration for a connector port. In certain examples, the shutter configuration can include a shutter and a spring for biasing the shutter toward a closed position. In certain examples, the shutter includes oppositely positioned pivot pins aligned along a pivot axis, and the spring includes coil portions mounted on the pivot pins. In certain examples, the spring also includes a loop portion that extends along a back side of the shutter and interconnects the two coil portions. In certain examples, the coil portions include tangs for tensioning the spring when the shutter is loaded in the connector port. In certain examples, the loop portion of the spring extends within a recessed portion located at the back side of the shutter.

Another aspect of the present disclosure relates to a fiber optic adapter or a female fiber optic connector including a port defining structure defining a connector port for receiving a male fiber optic connector. The port defining structure includes a first side position opposite from a second side. The port defining structure also includes third and fourth opposite sides that extend between the first and second sides. The second, third and fourth sides each include an ingress protection shoulder defining an ingress protection surface that faces in an inward direction. The inward direction corresponds to a direction that the male fiber optic connector is moved when the male fiber optic connector is inserted into the connector port. The fiber optic adapter or female fiber optic connector also includes a shutter pivotally connected to the port defining structure. The shutter is pivotally movable about a pivot axis relative to the port defining structure between an open position where the connector port is open and a closed position where the connector port is closed. The pivot axis is located at the first side of the port defining structure. The shutter includes an inner side and an outer side. The inner side faces in the inward direction when the shutter is in the closed position and the outer side faces in an outward direction when the shutter is in the closed position. The outward direction corresponds to a direction that the male fiber optic connector is moved when the male fiber optic connector is removed from the connector port. Peripheral portions of the outer side of the shutter overlap and oppose the ingress protection surfaces when the shutter is in the close position. A spring is provided for biasing the shutter toward the closed position.

Another aspect of the present disclosure relates to a system for manufacturing fiber optic connectors using fiber optic subassemblies each including a fiber carrier module supporting a plurality of optical fibers. In certain examples, the fiber carrier modules can be stacked together to provide multiple rows of non-ferrulized optical fibers can be incorporated into a fiber optic connector. By selecting different numbers of fiber carrier modules in the stack, fiber optic connectors having different fiber counts can be manufactured using the same basic building block components.

In certain examples, the fiber carrier modules in accordance with the present disclosure provide advantages in fiber processing prior to final assembly of fiber optic connectors incorporating the fiber carrier modules. For example, the fiber carrier modules allow the optical fibers to be readily handled as a group by automated equipment, robotics, fixtures or even manually, thereby facilitating conducting processing operations on the optical fibers. Example processing operations can include cleaving (e.g., laser cleaving, mechanical cleaving), polishing, shaping (e.g., shaping the fiber tips with an energy source such as a laser, a plasma generated between electrodes, or other sources) and cleaning.

In certain examples, fiber carrier modules in accordance with the present disclosure can be connected together in stacks with a mating relationship between the modules. In certain examples, mechanical connections (e.g., snap-fit connections) or adhesive connections (e.g., epoxy) can be used to hold the modules together in a stack.

In certain examples, the fiber carrier modules in accordance with the principles of the present disclosure can include anchoring locations where the optical fibers are anchored relative to the fiber carrier modules. The anchoring locations can provide mechanical anchoring (e.g., via clamping or other means) or adhesive anchoring with an adhesive such as epoxy. In certain examples, the optical fibers carried by the fiber carrier modules include anchored portions that are axially fixed relative to the fiber carrier modules, and non-anchored portions that are capable of sliding axially relative to the fiber carrier modules. In certain examples, the fiber carrier modules can include fiber buckling zones for accommodating fiber buckling within the fiber carrier modules as the non-anchored portions of the optical fibers slide while the anchored portions remained fixed.

In certain examples, the stacked fiber carrier modules in accordance with the principles of the present disclosure can be incorporated within a connector body. In certain examples, the connector body can include structures such as latches, flanges, clips or other structures for fastening the connector body to another fiber optic connector, to a fiber optic adapter, to a panel or to another telecommunications structure. In certain examples, the connector body can be part of a female fiber optic connector defining a port for receiving a male ferrule-less fiber optic connector. In certain examples, a bare fiber alignment structure including bare fiber alignment features (e.g., grooves such as v-grooves, fiber bores or other features for co-axially aligning optical fibers) can be incorporated in the female fiber optic connector. The bare fiber alignment structure within the female fiber optic connector can function to receive end portions of bare fibers associated with the fiber carrier modules and for aligning such bare fibers with bare fibers corresponding to a male fiber optic connector inserted into the port of the female fiber optic connector. In other examples, the fiber carrier modules can be incorporated into a male ferrule-less fiber optic connector. In such an example, the bare fiber end portions of the optical fibers associated with the fiber carrier modules can project outwardly from ends of the fiber carrier modules and can be protected by a retractable nose piece of the male fiber optic connector. The retractable nose piece can include openings corresponding to each of the bare fiber portions that project outwardly from the fiber carrier modules. The nose piece can be movable between a retracted position and an extended position. When in the extended position, the bare optical fibers are protected within the nose piece. When in the retracted position, the optical fibers can extend through the openings in the nose piece and project outwardly beyond an end face of the nose piece.

Another aspect of the present disclosure relates to a fiber carrier having one or more grooves for receiving one or more optical fibers. The fiber carrier can include an anchoring location where the one or more optical fibers are anchored relative to the carrier. The anchoring location can include adhesive for anchoring the one or more optical fibers. The carrier can also include a capillary flow stop for controlling the location of the adhesive such that the adhesive does not migrate outside of the anchoring zone. For example, the capillary flow stop can prevent adhesive from migrating from the anchoring location along the grooves to a fiber buckling zone. In certain examples, the capillary flow stop includes a discontinuity or break in the one or more grooves. In certain examples, the capillary flow stop includes a void or open region or slot or notch or cavity sized and shape such that an adhesive having a predetermined viscosity will not flow past the or through the capillary flow stop via capillary action.

Another aspect of the present disclosure relates to a fiber optic connector including a plurality of fiber optic subassemblies each including a fiber carrier module supporting a plurality of optical fibers. The fiber carrier modules are coupled together in a stacked arrangement. Each of the fiber carrier modules includes a first end and an opposite second end. Each of the fiber carrier modules defines a fiber passage that extends from the second end to the first end. The optical fibers extend through the fiber passage and include non-ferrulized portions that project outwardly from the first ends of the fiber carrier modules. The fiber optic subassemblies also include fiber anchoring locations where the optical fibers are anchored relative to the fiber carrier modules.

Another aspect of the present disclosure relates to a fiber optic connection system (e.g., a family of fiber optic connectors or a product line of fiber optic connectors) which includes a plurality of different types or styles of fiber optic connectors each having a common or similar rear connection interface. The rear connection interface is configured to be interconnected with a corresponding interface on a rear connector piece. The rear connector piece is configured to be anchored to a fiber optic cable. The common interconnect configuration allows one style or type of rear connector piece to be used for the different styles or types of fiber optic connectors. In other words, the rear connector piece is compatible with different types of fiber optic connectors (e.g., male and female fiber optic connectors). In this way, the manufacturing efficiency of the entire system can be improved by reducing the total number of parts in the system. Additionally, to accommodate a new type of fiber optic cable, it is only necessary to modify the rear connector piece to render all the fiber optic connector types in the system compatible with the new type of fiber optic cable. In certain examples, rear connector pieces can be manufactured of different materials to comply with different specification requirements. The different materials can include metals, engineered plastics and composite configurations including both metal and plastic. It will be appreciated that for higher retention forces and cable anchoring capability, higher strength materials such as metals can be utilized. For applications requiring lower retention forces, plastics can primarily be used. In certain examples, fiber optic cables can be anchored to rear connector pieces by means such as mechanical crimps, adhesive or other techniques.

Another aspect of the present disclosure relates to a fiber optic connector including a connector body and a rear connector piece that is secured to the connector body by a snap-fit connection. The rear connector piece can be configured for attachment to a fiber optic cable. In a certain example, the rear connector piece is secured to the connector body by a snap-fit connection. In certain examples, the snap-fit connection requires a relatively low force to assemble, but provides relatively high retention forces. In certain examples, the design of the rear connector piece is compatible with multiple types or styles of fiber optic connectors to provide cost optimization. Additionally, when a specialty cable requires a specialty termination, the connector bodies can remain the same and it is only necessary to provide one cable specific rear connector piece which thereby renders all the connector bodies in the system compatible with the specialty cable. This allows for a faster time to market for specialty cables and/or other types of cables.

Aspects of the present disclosure also relate to a connection interface between a connector body and a rear connector piece for anchoring a fiber optic cable. The connection interface can include a simplified snap-fit configuration for easy assembly. In certain examples, the assembly process can be accomplished by a simple translational movement. In certain examples, the connection interface requires a relatively low force to assemble, but provides a relatively high retention force. In certain examples, the connection includes at least three snap-fit tabs. In certain examples, the connection interface can include a square-shaped form factor having at least four snap-fit retention tabs.

Another aspect of the present disclosure relates to a fiber optic connector product line including a first fiber optic connector of a first type and a second fiber optic connector of a second type that is different from the first type. The first and second fiber optic connectors can respectively include a first and second connector bodies having rear ends. The fiber optic connector product line also includes a rear connector piece configured to be anchored to a fiber optic cable. The rear connector piece is compatible and interconnectable with the rear ends of both the first and second connector bodies. In certain examples, the fiber optic product line can include more than two types or styles of fiber optic connectors that are compatible with the rear connector piece. In certain examples, the first and second fiber optic connector can include male and female fiber optic connectors. In certain examples, the rear connector piece can include a structure for allowing strength members of a fiber optic cable to be crimped thereto. In another example, the structure can include a stub portion.

Still another aspect of the present disclosure relates to a fiber optic connector including a connector body having a rear end that includes a first connection interface. The fiber optic connector also includes a rear connector piece configured to be anchored to a fiber optic cable. The rear connector piece defines a second connection interface configured to interlock with the first connection interface via a snap-fit connection. The first and second connection interfaces include at least three receptacles and at least three tabs configured to fit within the at least three receptacles.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows:

FIG. 32 is a side view showing the male fiber optic connector of FIG. 29 coupled to the female fiber optic connector of FIG. 1;

FIG. 33 is a cross-sectional view taken along section line 33-33 of FIG. 32;

DETAILED DESCRIPTION

Figure 1:
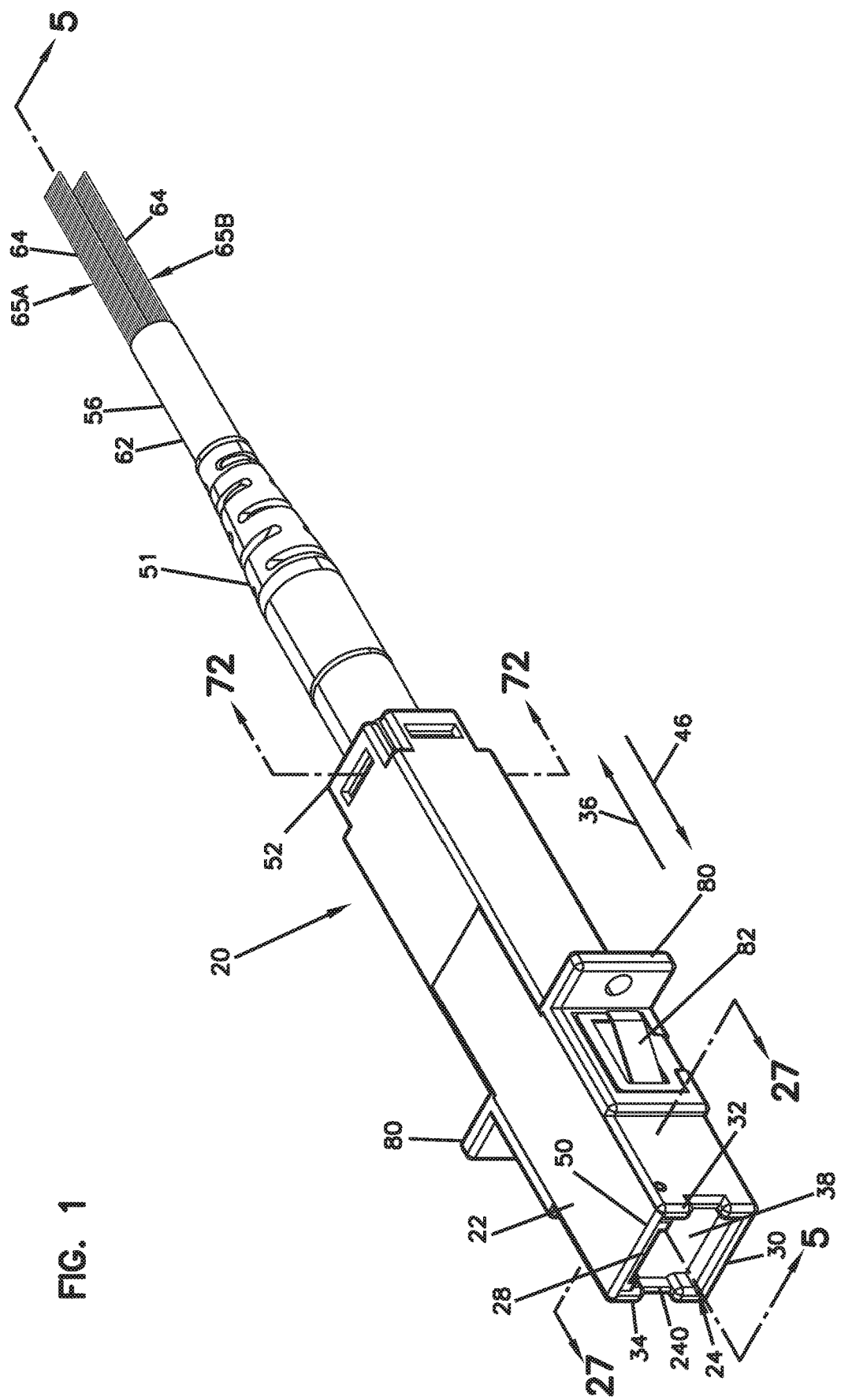
FIG. 1 is a perspective view of a female fiber optic connector in accordance with the principles of the present disclosure.
Figure 3:
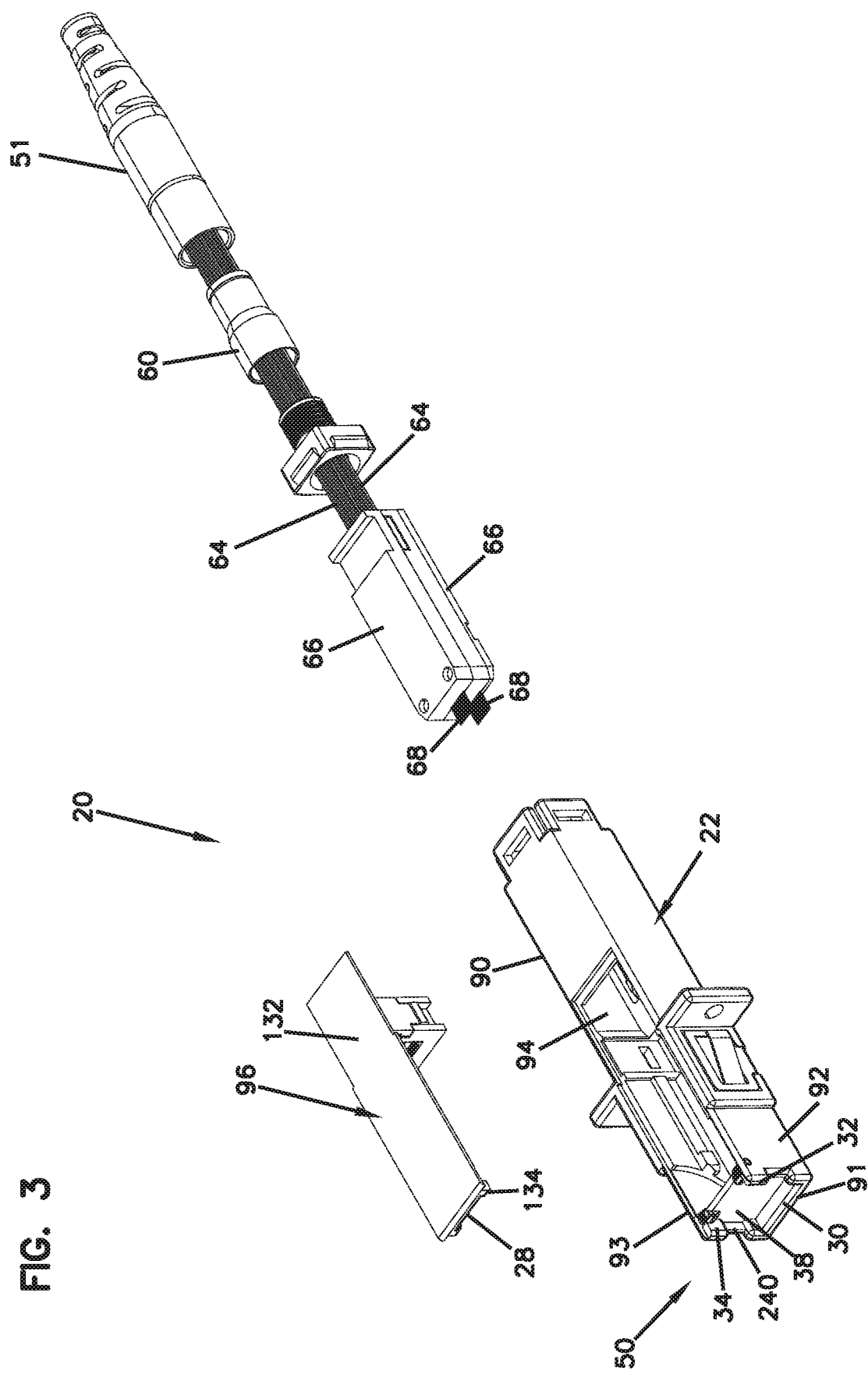
FIG. 3 is an exploded view of the female fiber optic connector of FIG. 1.

FIG. 1 depicts a female fiber optic connector 20 in accordance with the principles of the present disclosure. The female fiber optic connector 20 includes a port defining structure such as a connector housing 22 (e.g., connector body) which defines a connector port 24 for receiving a male fiber optic connector 26 (see FIG. 29). As shown at FIG. 3, the port defining structure of the connector housing 22 includes a first side 28 positioned opposite from a second side 30, and third and fourth opposite sides 32, 34 that extend between the first and second sides 28, 30. As shown at FIGS. 23-28, the second, third and fourth sides 30, 32 and 34 each include an ingress protection shoulder 30A, 32A and 34A defining an ingress protection surface 30B, 32B, 34B that faces in an inward direction (see arrow 36). The inward direction corresponds to a direction the male fiber optic connector 26 is moved when the male fiber optic connector 26 is inserted into the connector port 24.

Figure 10:
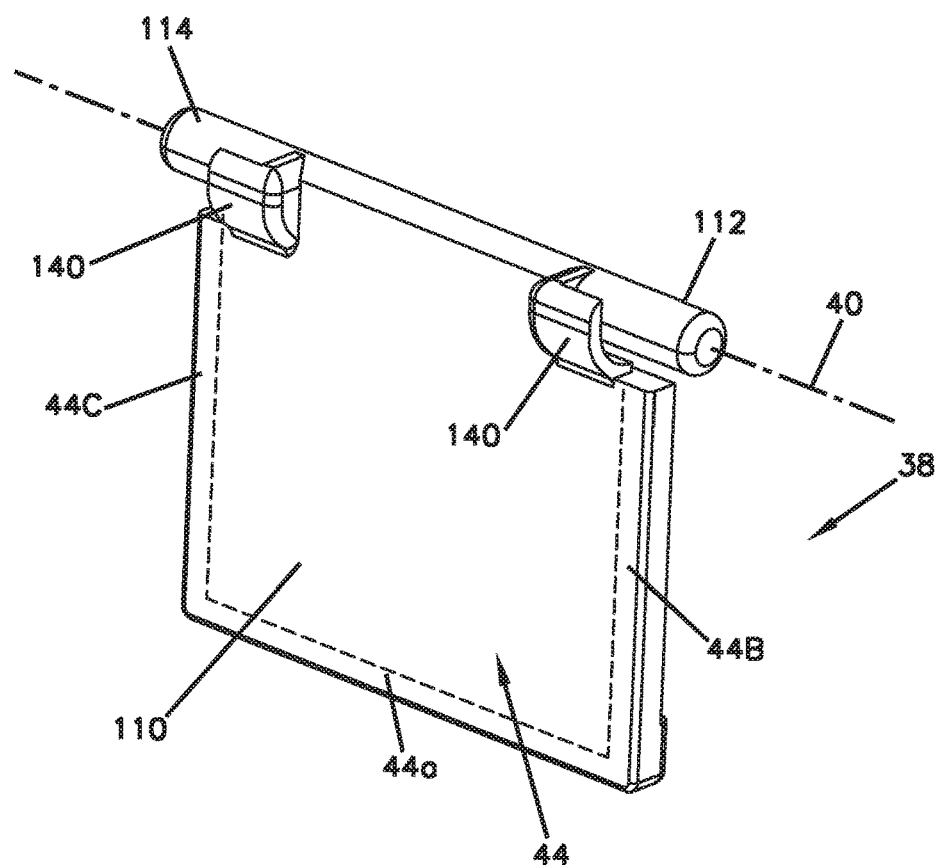
FIG. 10 is a perspective view of an outer side of the shutter of the female fiber optic connector of FIG. 1.
Figure 11:
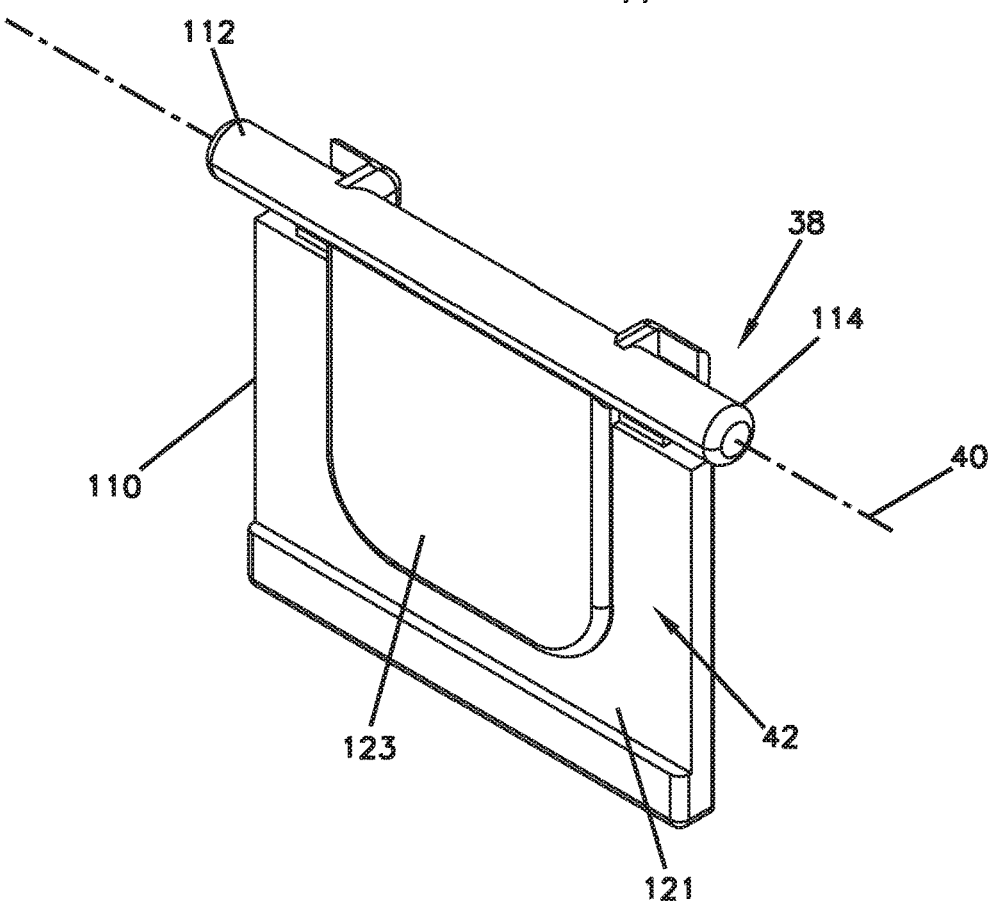
FIG. 11 is a perspective view of the inner side of the shutter of FIG. 10.
Figure 12:
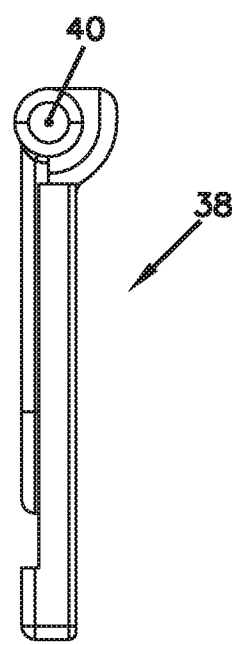
FIG. 12 is a side profile view of the shutter of FIG. 10.
Figure 13:
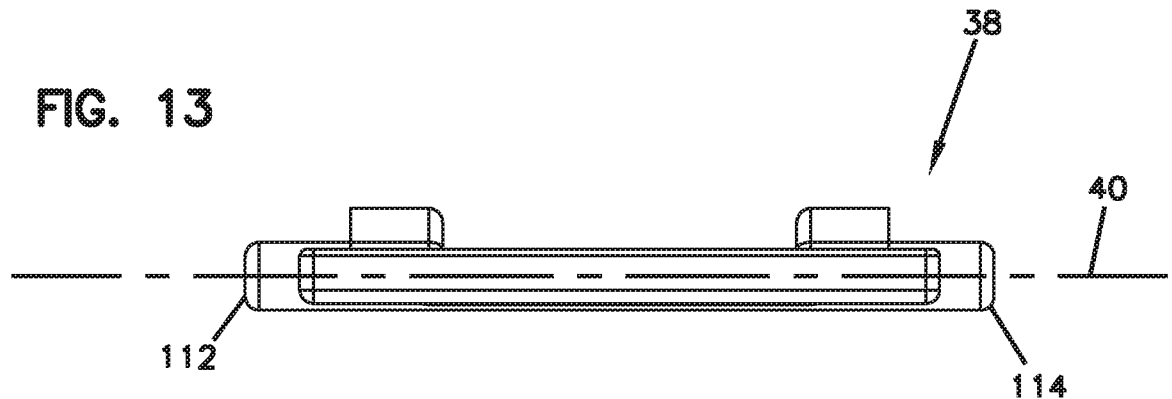
FIG. 13 is a bottom view of the shutter of FIG. 10.
Figure 14:
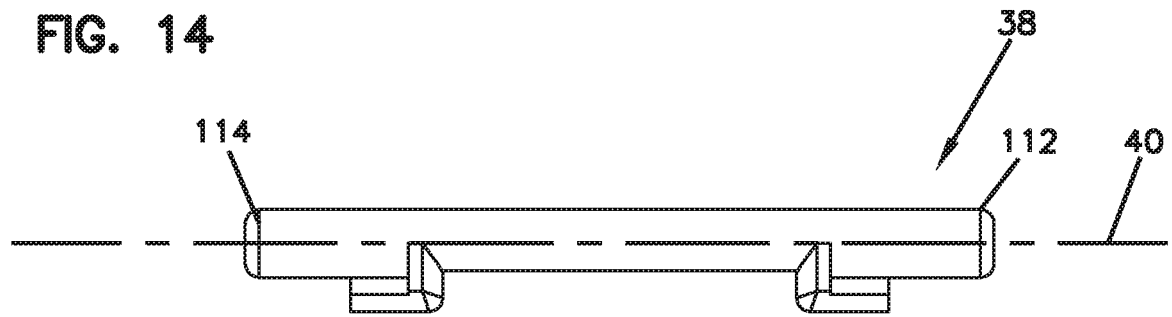
FIG. 14 is a top view of the shutter of FIG. 10.
Figure 15:
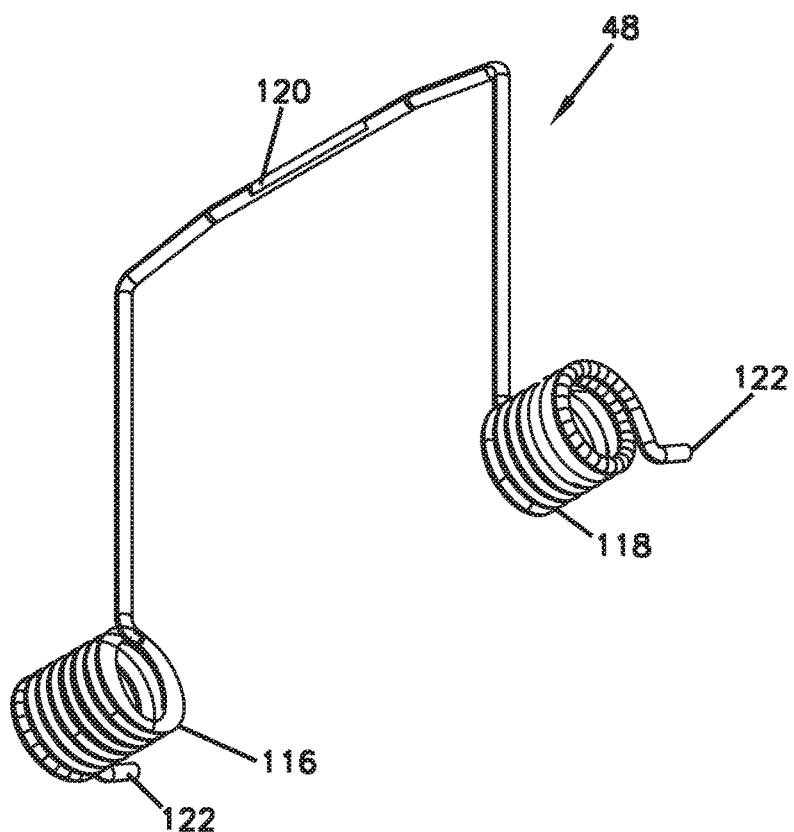
FIG. 15 is a perspective view of a spring for biasing the shutter of the fiber optic connector of FIG. 1 toward a closed position.
Figure 16:
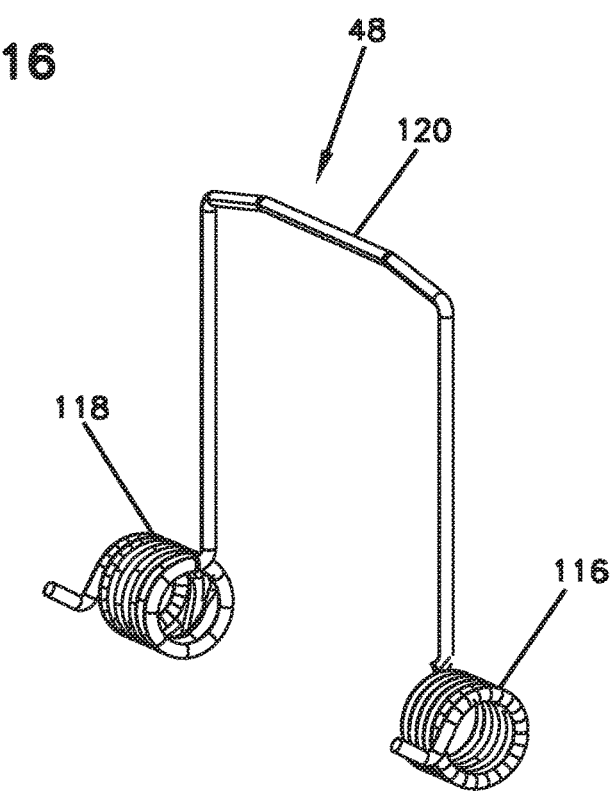
FIG. 16 is another perspective view of the spring of FIG. 15.
Figure 17:
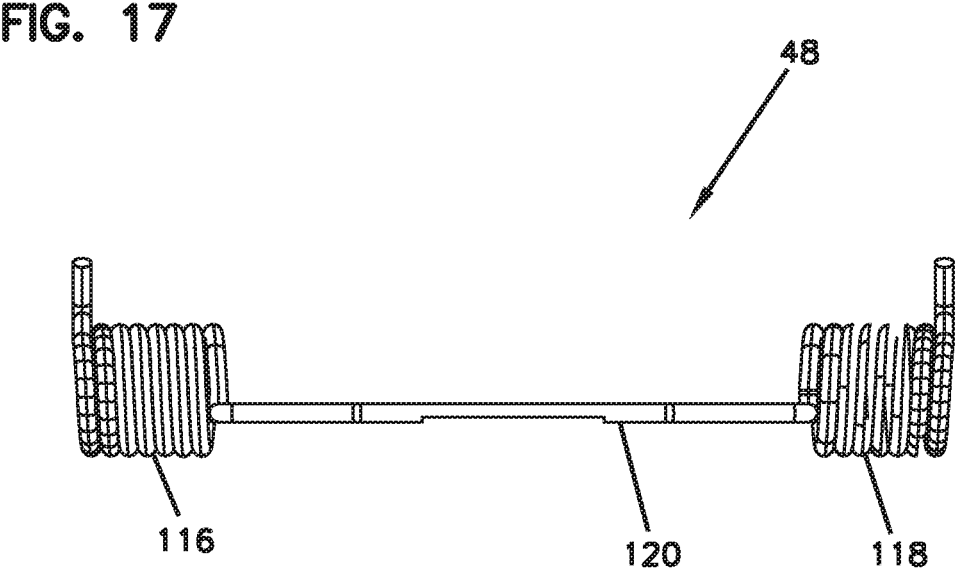
FIG. 17 is a top view of the spring of FIG. 15.
Figure 18:
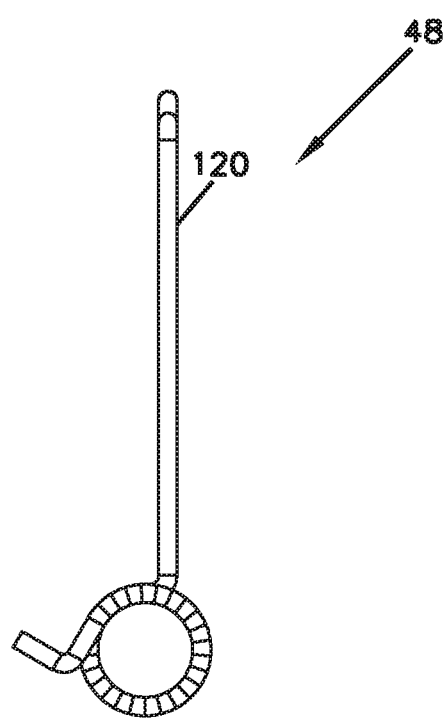
FIG. 18 is a side profile view of the spring of FIG. 15.
Figure 19:
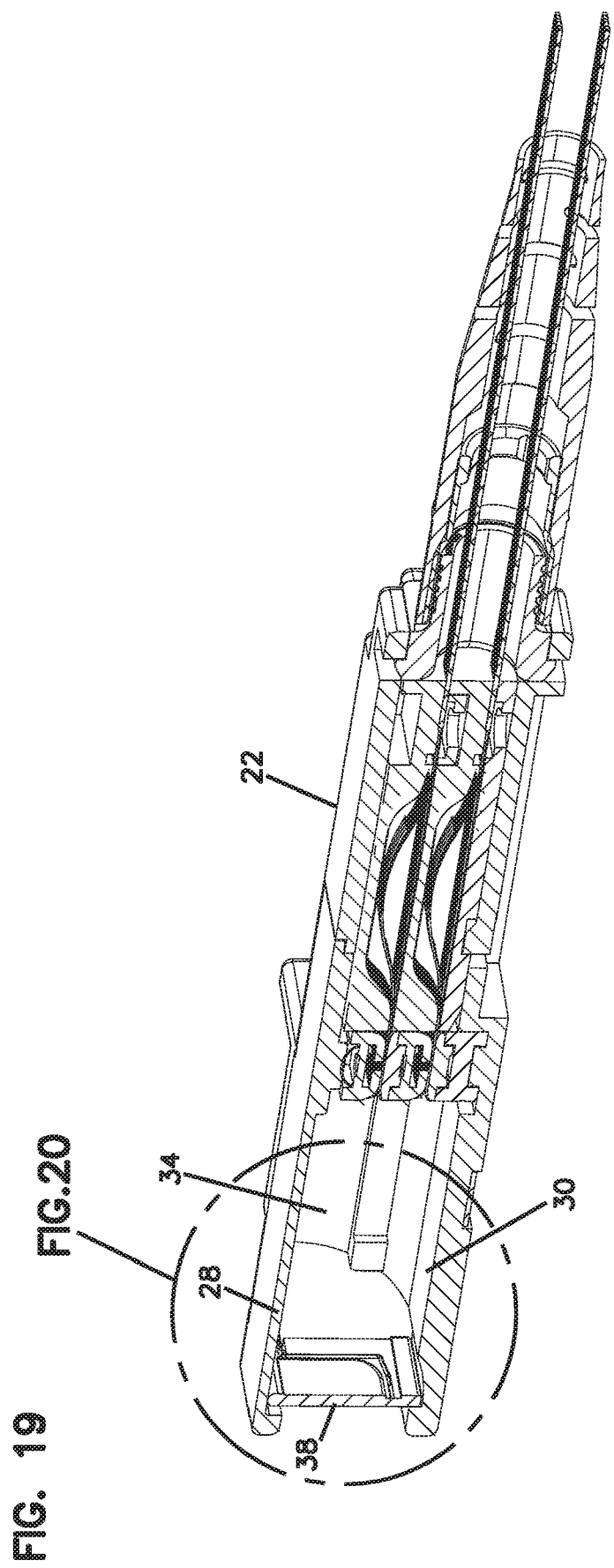
FIG. 19 is a perspective cross-sectional view taken generally along cross-section line 5-5 of FIG. 1 with the shutter shown in the closed position.
Figure 20:
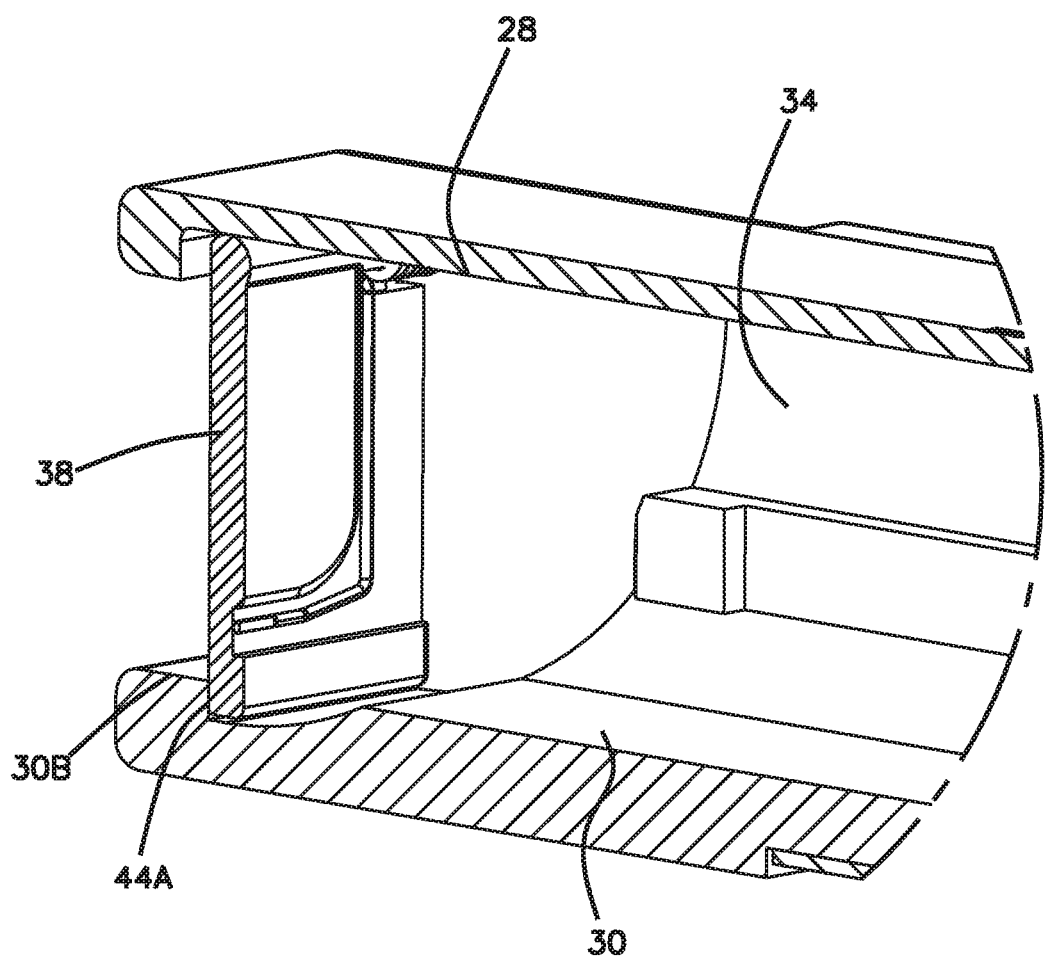
FIG. 20 is an enlarged view of a portion of FIG. 19 showing the shutter in the closed position.
Figure 21:
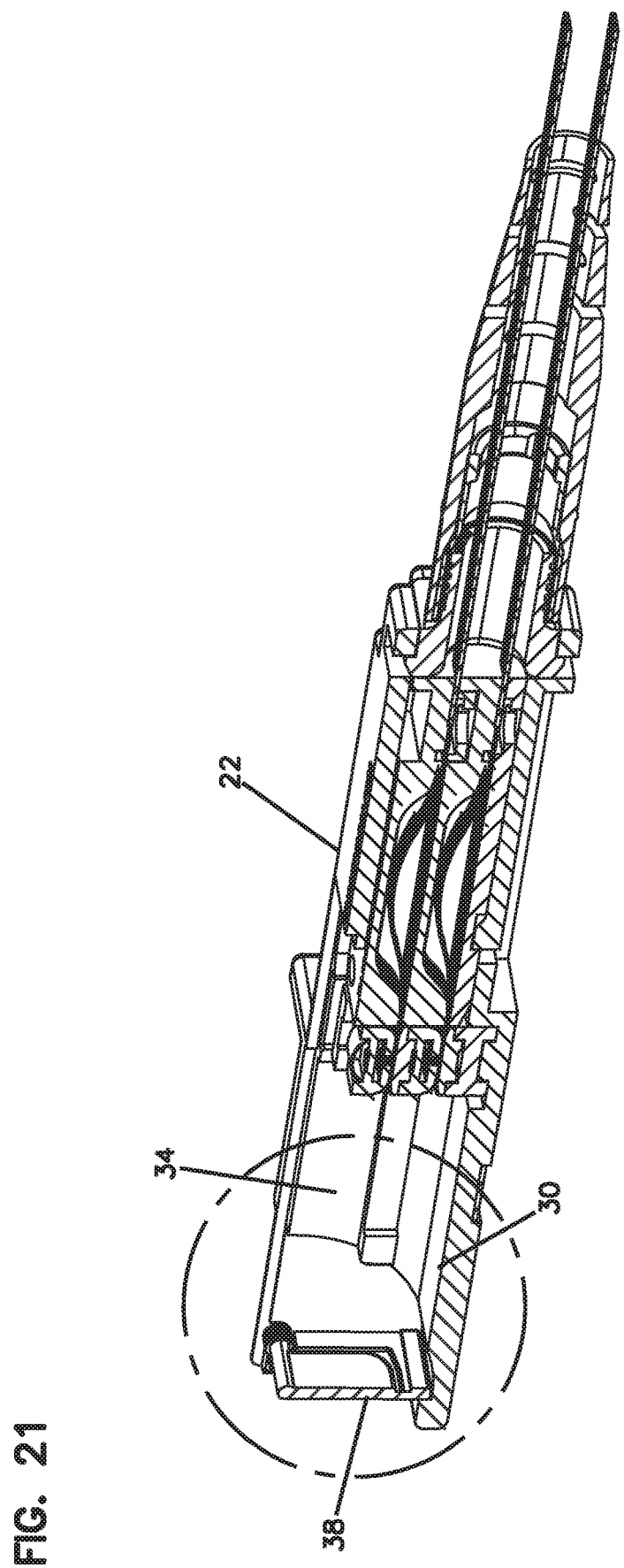
FIG. 21 is a cross-sectional view taken generally along cross-section line 5-5 of FIG. 1 showing the shutter in the closed position with a top cover of the fiber optic connector removed.
Figure 22:
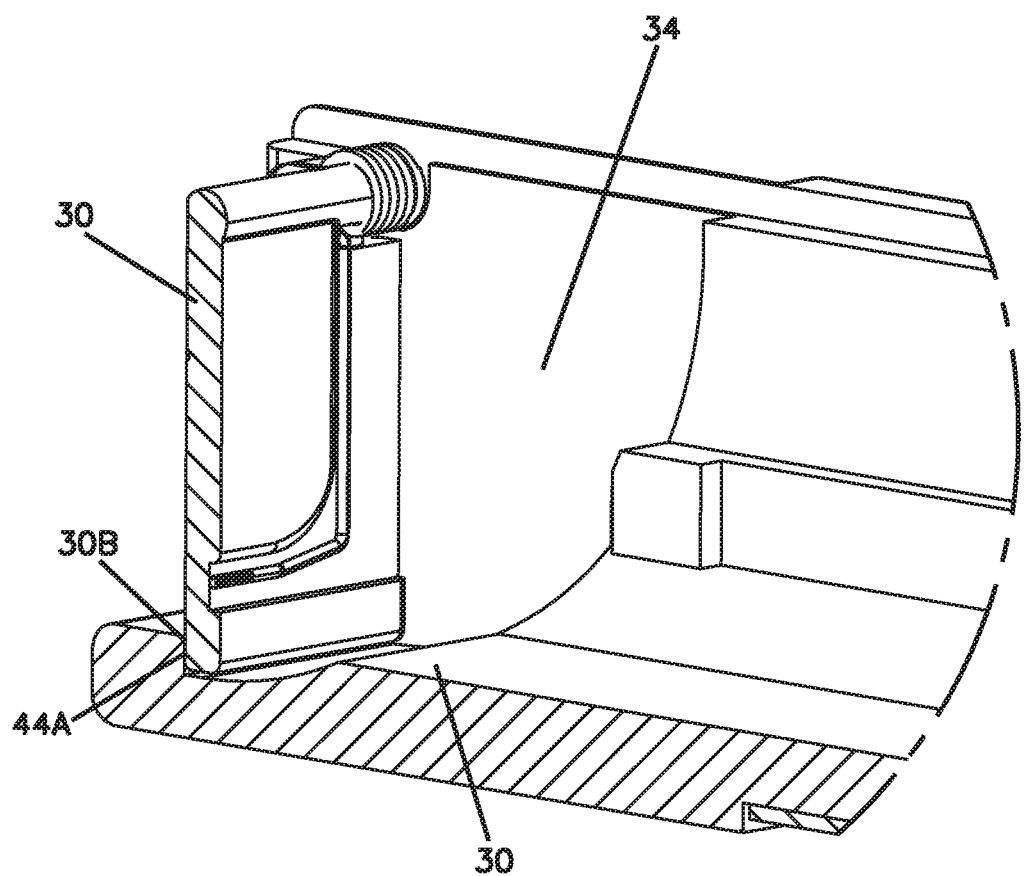
FIG. 22 is an enlarged view of a portion of the cross-sectional view of FIG. 21 showing the shutter in the closed position.
Figure 23:
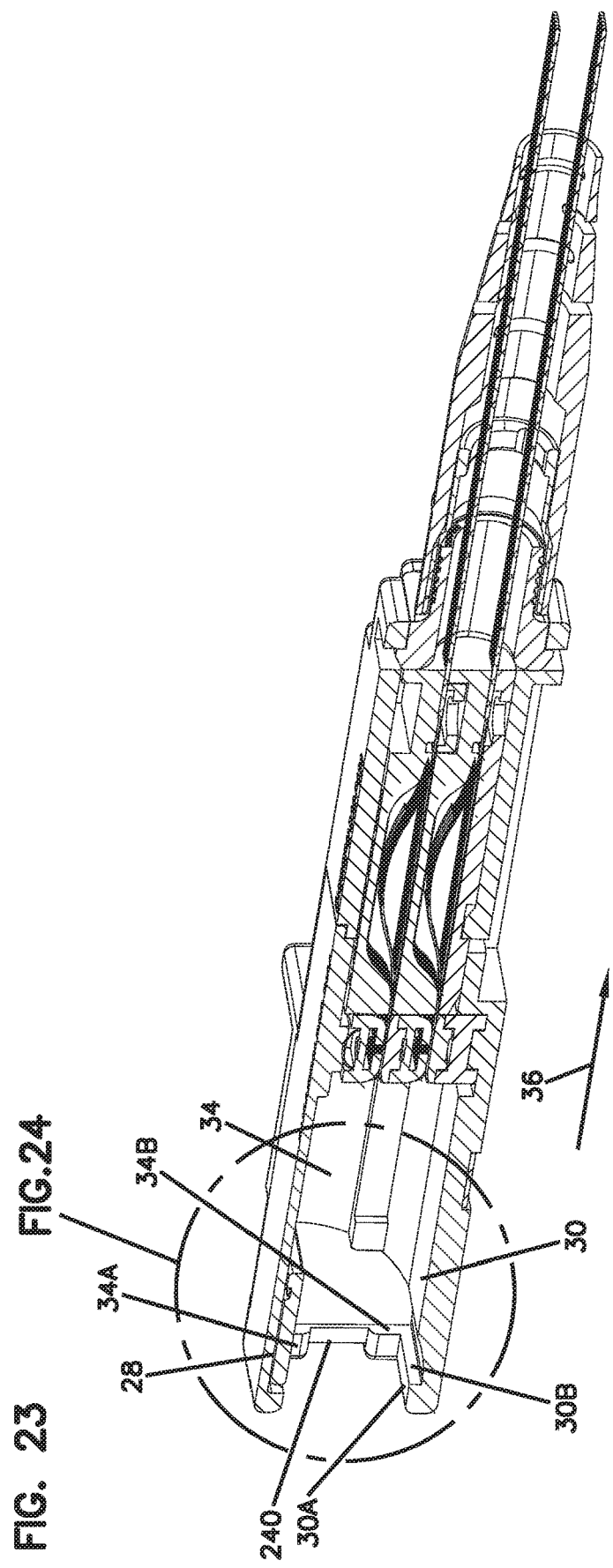
FIG. 23 is another perspective cross-sectional view taken generally along section line 5-5 of FIG. 1 with the shutter in the open position.
Figure 24:
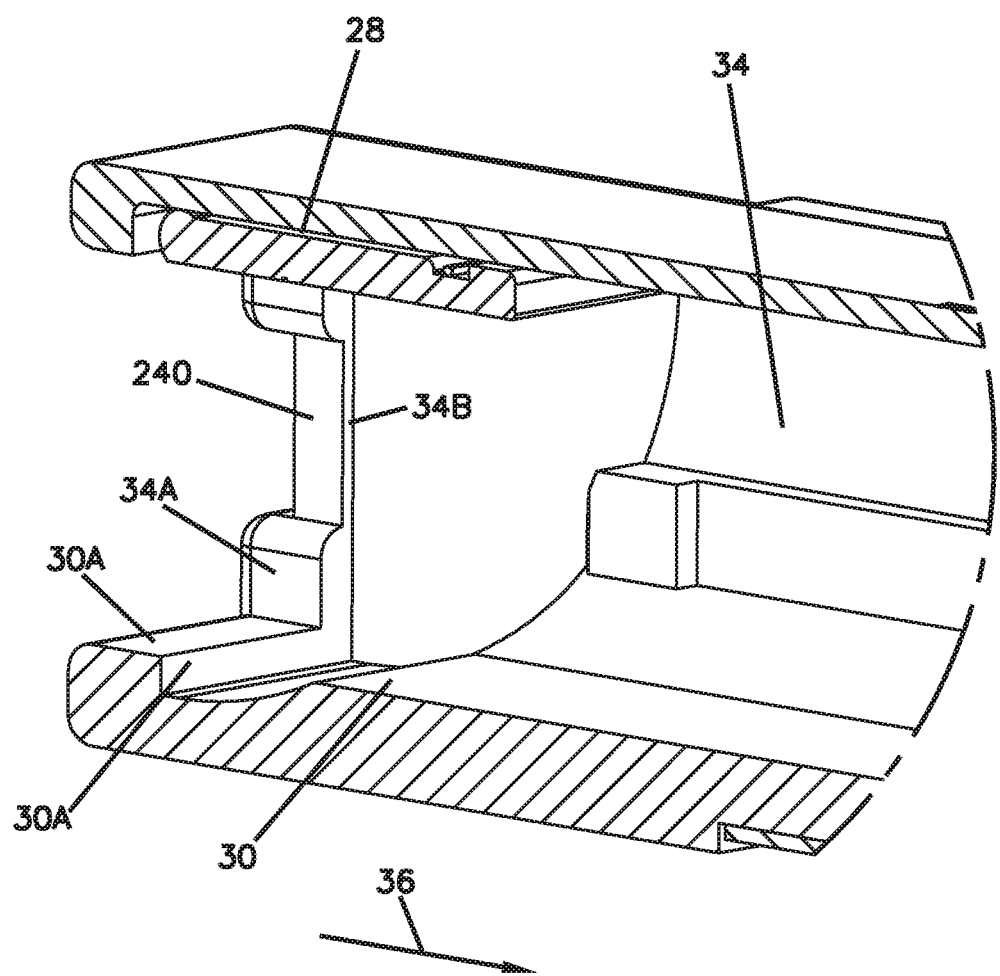
FIG. 24 is an enlarged view of a portion of FIG. 23 showing the shutter in the open position.
Figure 25:
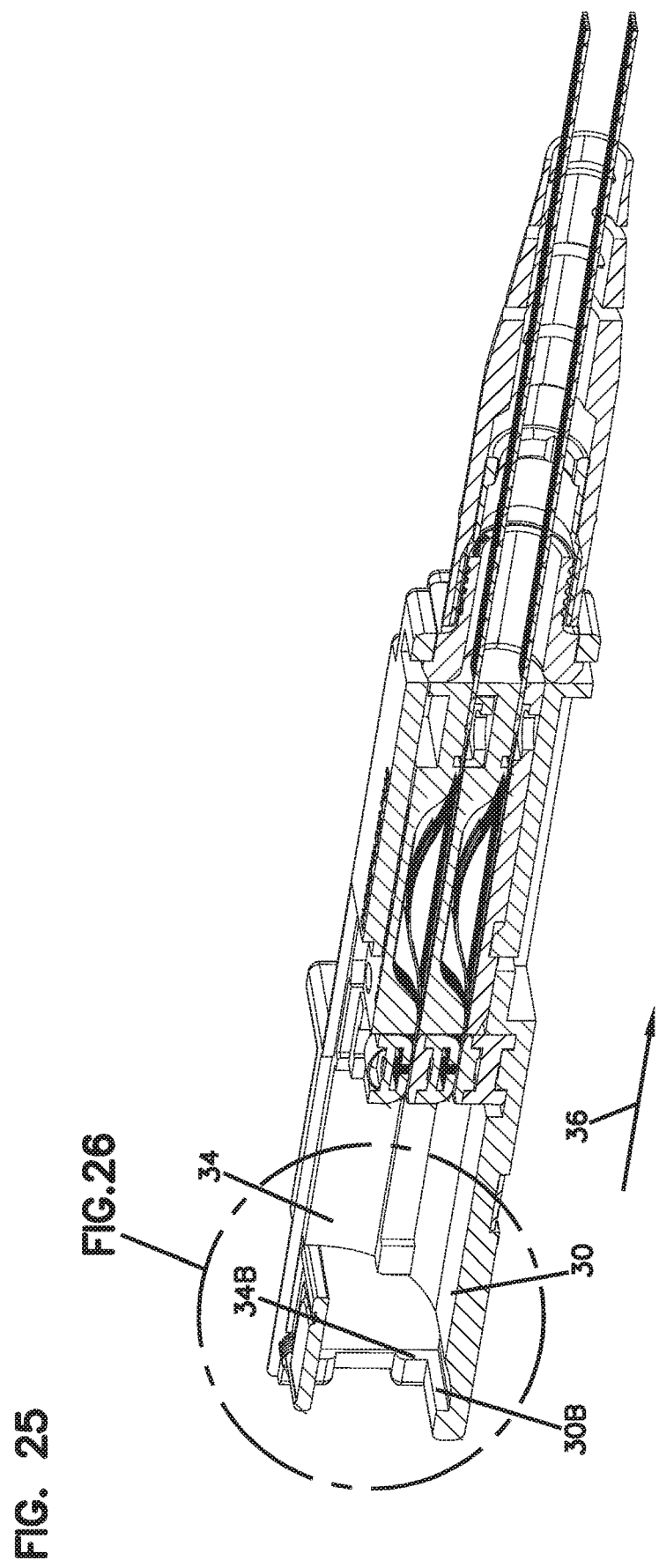
FIG. 25 is another perspective cross-sectional view taken along section line 5-5 of FIG. 1, in the view of FIG. 25 the top cover piece of the fiber optic connector has been removed and the shutter is shown in the open position.
Figure 26:
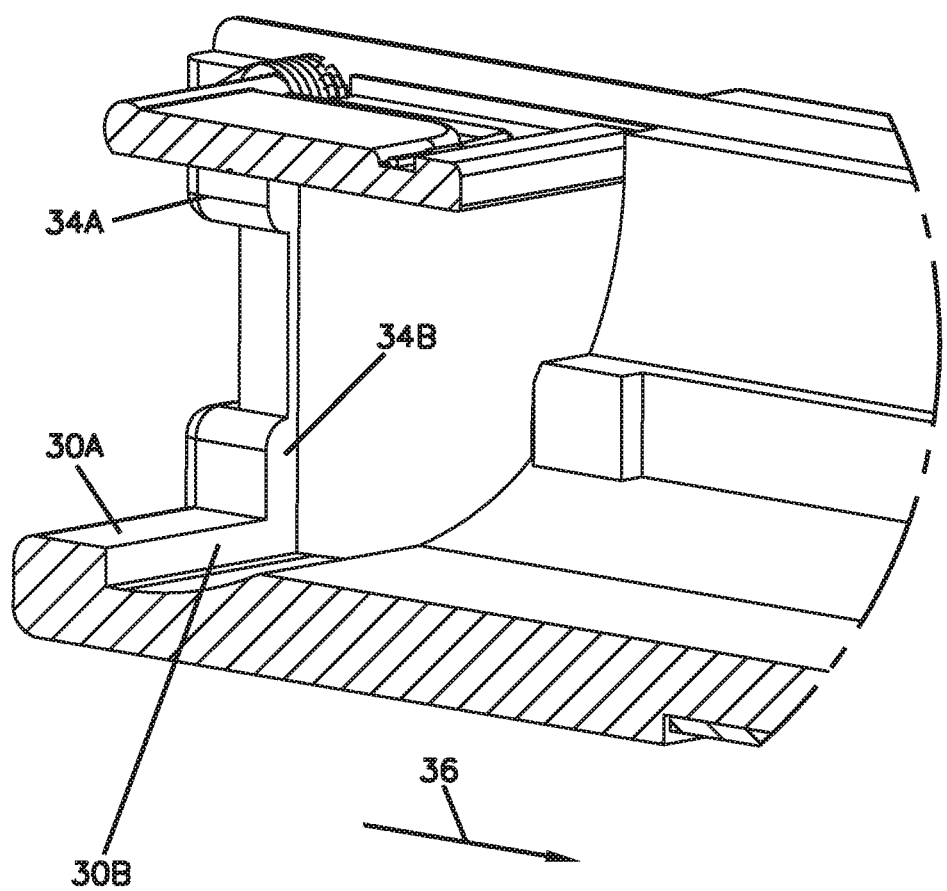
FIG. 26 is an enlarged view of FIG. 25 showing the shutter in the open position.
Figure 27:
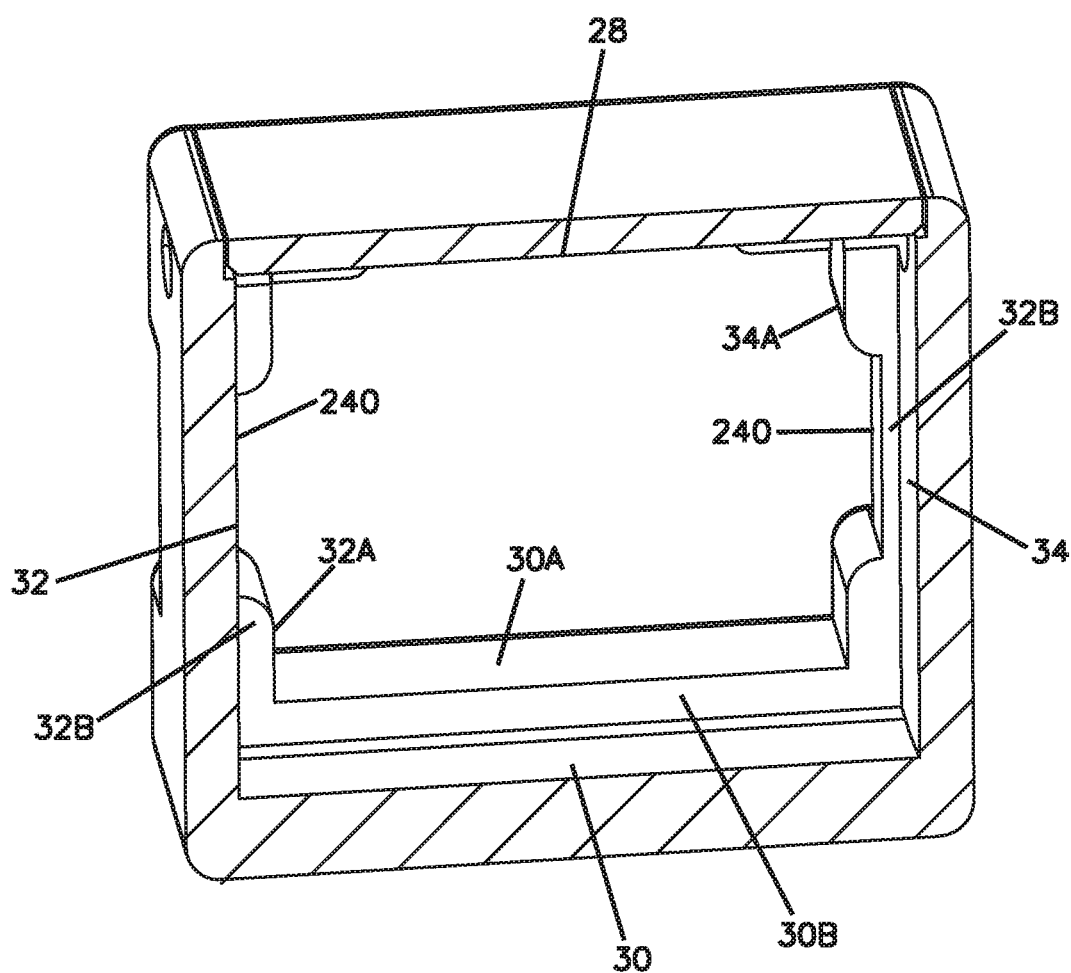
FIG. 27 is a cross-sectional view taken along section line 27-27 of FIG. 1, the cross-sectional view shows ingress protection services provided by the walls of the connector port.
Figure 28:
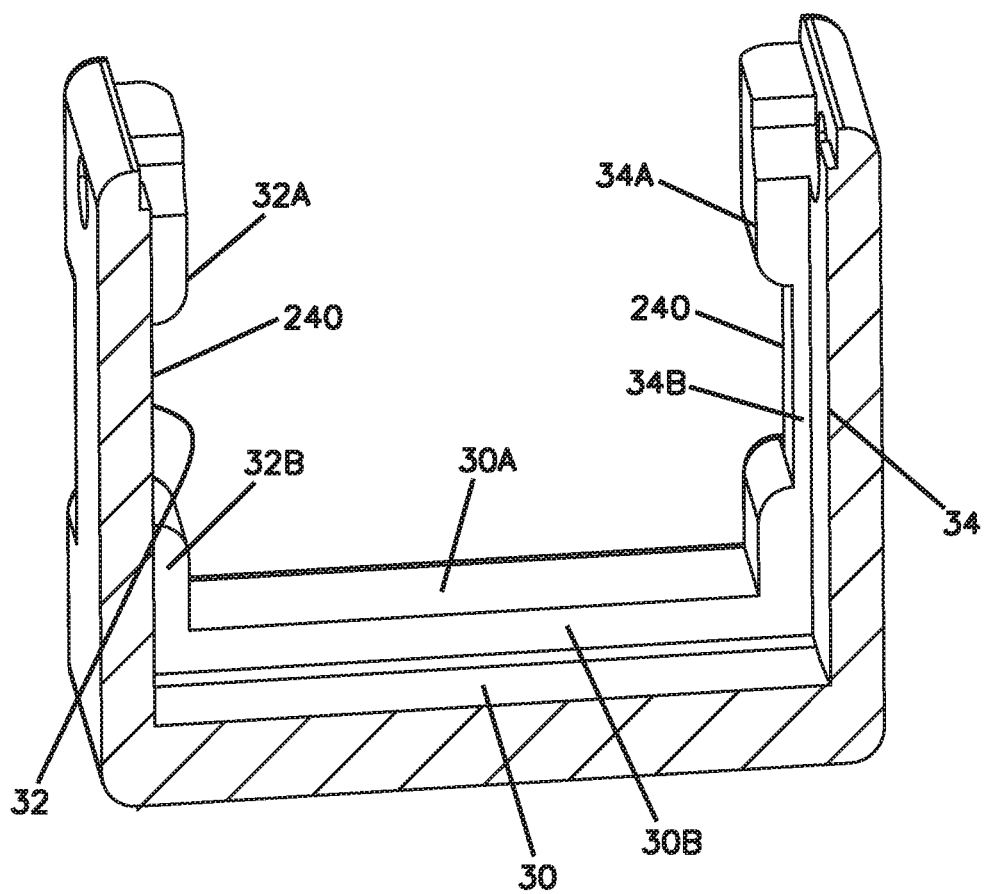
FIG. 28 is a cross-sectional view taken along section line 27-27 of FIG. 1 with the top cover piece of the connector housing removed.

The female fiber optic connector 20 also includes a shutter 38 pivotally connected to the connector housing 22. The shutter 38 is pivotally movable about a pivot axis 40 relative to the connector housing 22 between an open position (see FIGS. 6, 9 and 23-26) where the connector port 24 is open and a closed position (see FIGS. 5, 8 and 19-22) where the connector port 24 is closed. The pivot axis 40 is located at the first side 28 of the connector port 24. The shutter 38 includes an inner side 42 and an outer side 44. The inner side 42 faces in the inward direction 36 when the shutter 38 is in the closed position and the outer side 44 faces in an outward direction (see arrow 46) when the shutter 38 is in the closed position. The outward direction 46 corresponds to a direction the male fiber optic connector is moved when the male fiber optic connector is removed from the connector port 24. Peripheral portions 44A, 44B and 44C (see FIG. 10) of the outer side 44 of the shutter 38 overlap and oppose the ingress protection surfaces 30B, 32B and 34B when the shutter 38 is in the closed position. A spring 48 is provided for biasing the shutter 38 toward the closed position. The overlap between the ingress protection surfaces 30B, 32B and 34B and the peripheral surfaces 44A-44C of the shutter 38 assists in preventing dust or other contaminants from entering the connector housing 22 when the shutter 38 is closed.

Referring to FIG. 1, the connector housing 22 includes a first end 50 positioned opposite from a second end 52. The connector port 24 is defined at the first end 50 and a cable anchoring piece 54 (e.g., a rear connector piece)(see FIG. 2) is attached at the second end 52. A fiber optic cable 56 can be anchored to the cable anchoring piece 54. The fiber optic cable 56 is anchored to the second end 52 of the connector housing 22. For example, strength numbers 58 (e.g., reinforcing yarns such as fiberglass yarns or Aramid yarns or alternatively a more robust strength member such as glass reinforced polymer rods) can be mechanically secured to the cable anchoring piece 54 by means such as a crimp sleeve 60 (e.g., mechanical fasteners) or by adhesive such as epoxy. The cable anchoring piece 54 can attach to the connector housing 22 by a snap-fit connection or by another type of connection. A flexible boot 51 mounts over the crimp sleeve 60 and provides radius and strain relief protection to the fiber optic cable 56 at the cable-to-connector interface. The crimp sleeve 60 can also engage a jacket 62 of the fiber optic cable 56. The jacket 62 can contain one or more optical fibers 64. In the depicted example, the fiber optic cable 56 includes a plurality of optical fibers 64 that can be routed into the connector housing 22 through the second end 52 of the connector housing 22. The optical fibers 64 can be arranged in sets or separate groups or can all be arranged in one group within the fiber optic cable 56. As depicted, the fiber optic cable 56 includes two fiber ribbons 65A, 65B each respectively including a set of optical fibers 64. The optical fibers 64 are arranged within two separate fiber ribbons 65A, 65B each including a plurality of optical fibers held together by a matrix material (e.g., a binder, coating, resin, etc.) within the fiber optic cable 56. In one example, each ribbon 64 includes twelve fibers, but other fiber counts are applicable as well. In other examples, connectors in accordance with the principles of the present disclosure can be used with non-ribbonized fiber optic cable (e.g., loose tube fiber optic cable) where the optical fibers of the fiber optic cable are not ribbonized. The optical fibers 64 include portions that are routed through carrier modules 66 (see FIGS. 3 and 5-7) that mount within the connector housing 22. In certain examples, one carrier module 66 is provided for each optical fiber ribbon 65A, 65B. Within the carrier module 66, portions of the optical fibers 64 can be stripped to remove polymeric coatings and/or matrix material corresponding to the ribbonizing process. As depicted, bare fiber end portions 68 of the optical fibers 64 project forwardly beyond front ends of the modules 66. When the modules 66 are loaded within the connector housing 22, the end portions 68 fit within corresponding fiber alignment features 69 (e.g., grooves such as V grooves, precision fiber alignment bores, or other fiber alignment structures) defined by a bare fiber alignment structure 71 positioned within the connector housing 22. Elastic cantilevers 73 can bias/press the end portions 68 of the optical fibers into the fiber alignment features 69. Various components of the fiber alignment structure 71 which defined the alignment features 69 can be stacked and biased together by one or more springs 75.

Figure 2:
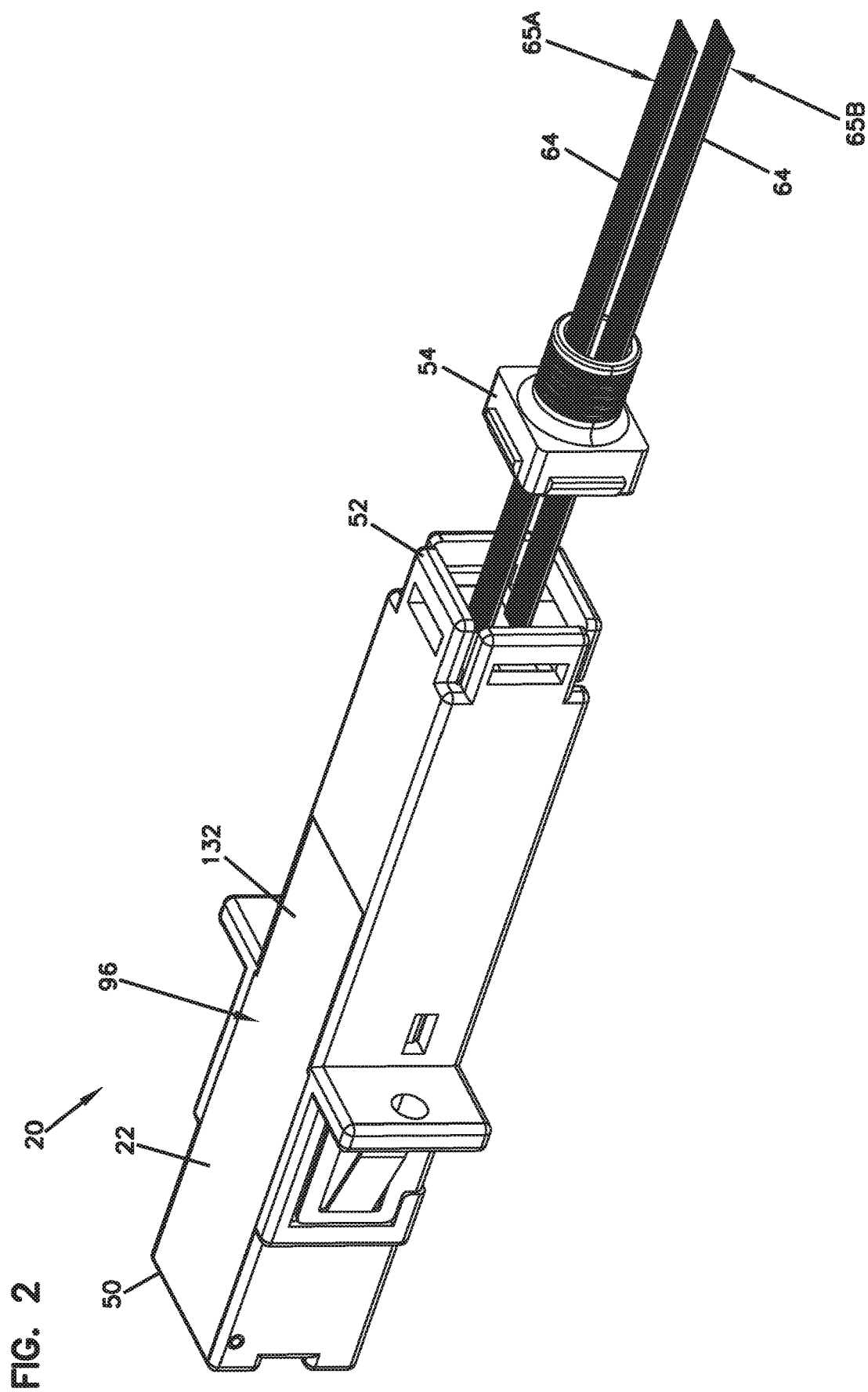
FIG. 2 shows the female fiber optic connector of FIG. 1 with a rear cable anchoring piece disconnected from a main housing of the fiber optic connector.

Referring to FIGS. 1-3, the connector housing 22 includes exterior flanges 80 and corresponding clips 82 for mounting the female fiber optic connector 20 in a panel (e.g., within a port of a connection panel) or other connector mounting structure.

Referring to FIG. 3, the connector housing 22 includes a main housing body 90 including sidewalls 91, 92 and 93 corresponding to the second, third and fourth sides, 30, 32 and 34 of the connector port 24. The main housing body 90 also defines an open side 94 corresponding to the first side 28 of the connector port 24. The connector housing 22 includes a cover piece 96 (e.g., a lid) that attaches to the main housing body 90 to enclose the open side 94 of the main housing body 90 and to define the first side 28 of the connector port 24. By removing the cover piece 96, the shutter 38 can readily be installed at the first end 50 of the connector housing 22. Similarly, the bare fiber alignment structure 71 can also be readily installed into the interior of the connector housing 22 through the open side 94. Once the various components have been installed within the connector housing 22, the cover piece 96 can be secured to the main housing body 90 to enclose the open side 94. In certain examples, the cover piece 96 can be secured in place by a snap-fit connection with respect to the main housing body 90 or can be adhesively affixed in place. The open side 94 also allows the ingress protection surfaces 30B, 32B and 34B (which are undercut) to be readily formed within the interior of the connector housing through an insert molding process.

Figure 4:
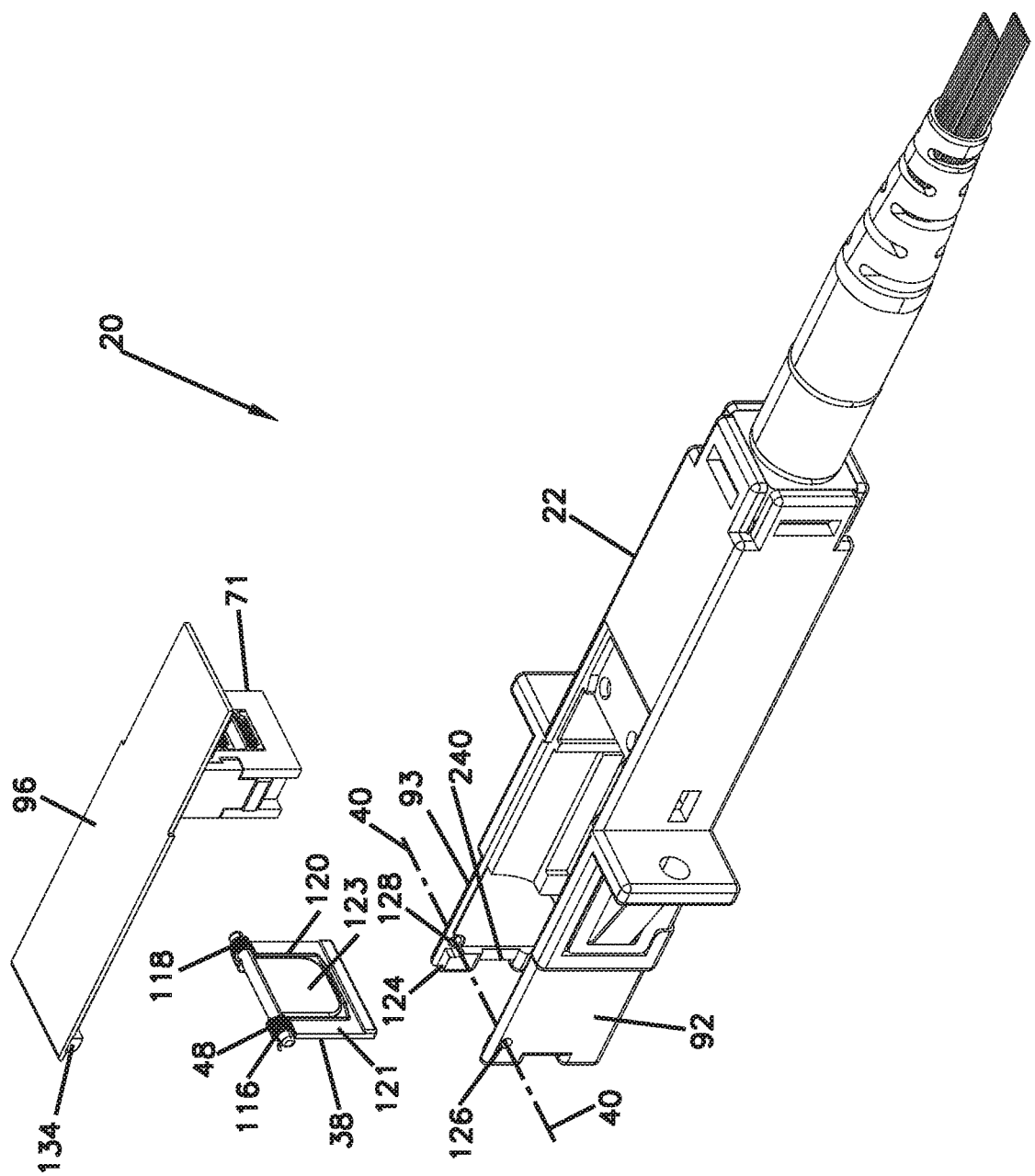
FIG. 4 is another exploded view of the female fiber optic connector of FIG. 1.

In certain examples, the spring 48 can be pre-mounted on the shutter 38 before the shutter is pivotally connected to the connector housing 22. As shown at FIGS. 10-14, the shutter 38 includes a main shutter body 110 and first and second pivot pins 112, 114 that project laterally in opposite directions from the main shutter body 110. In certain examples, the pivot pins 112, 114 are part (e.g., ends) of a continuous pin structure that is integrally formed with the main shutter body 110. In certain examples, the main shutter body 110 defines the inner side 42 and the outer side 44 of the shutter 38. FIG. 4 shows the spring 48 pre-mounted on the shutter 38 prior to the shutter 38 being loaded into the connector housing 22. The pre-mounting of the spring 48 on the shutter 38 facilitates the installation process and reduces the likelihood of losing parts.

Referring to FIG. 4 and FIGS. 15-18, the spring 48 includes first and second coil portions 116, 118 that respectively mount over the first and second pivot pins 112, 114. The spring 38 also includes a loop portion 120 that connects the first and second coil portions 116, 118 together. When the spring 48 is mounted to the shutter 38, the loop portion 120 is positioned at and extends along the inner side 42 of the shutter 38. The loop portion 120 extends across the main shutter body 110 from the first coil portion 116 to the second coil portion 118. The loop portion is shown mounted within a recessed region 121 of the inner side 42 of the main shutter body 110. The main shutter body 120 includes a projection 123 that fits inside the loop portion 120 and has a contour that generally conforms to the shape of the loop portion 120.

The spring 48 also includes spring tangs 122 that project outwardly from the coil portions 116, 118 of the spring 48. When the shutter 38 with the pre-mounted spring 48 is loaded into the connector housing 22, the spring tangs 122 engage ledges 124 provided at the sidewalls 92, 93 of the connector housing 22 such that the spring 48 is tensioned to cause the spring to bias the shutter 38 to the closed position. The sidewalls 92, 93 also define openings 126, 128 for receiving the pivot pins 112, 114 to provide a pivotal section or interface between the shutter 38 and the connector housing 22. The shutter pivots relative to the connector housing 22 about the pivot axis 40 which is defined by the pivot pins 112, 114 and extends through the openings 126, 128. The cover piece 96 includes a main body 132 that covers the open side 94 of the main housing body 90, and a front lip 134 that projects downwardly from the main body 132 and overhangs the pivot connection region of the shutter 38 at the first and 50 of the connector housing 22. The lip 134 can include an inwardly facing surface 136 that opposes the top peripheral portion of the main shutter body 110 when the main shutter body 110 is in the closed position. The surface 136 also provides front coverage of the pivot pins 112, 114 and the upper portion of the shutter 38. The shutter 38 can include coil shrouds 140 (see FIG. 10) positioned at the outer side 44 of the shutter 38 for at least partially covering and encircling the coil portions 116, 118 of the spring 48.

Figure 29:
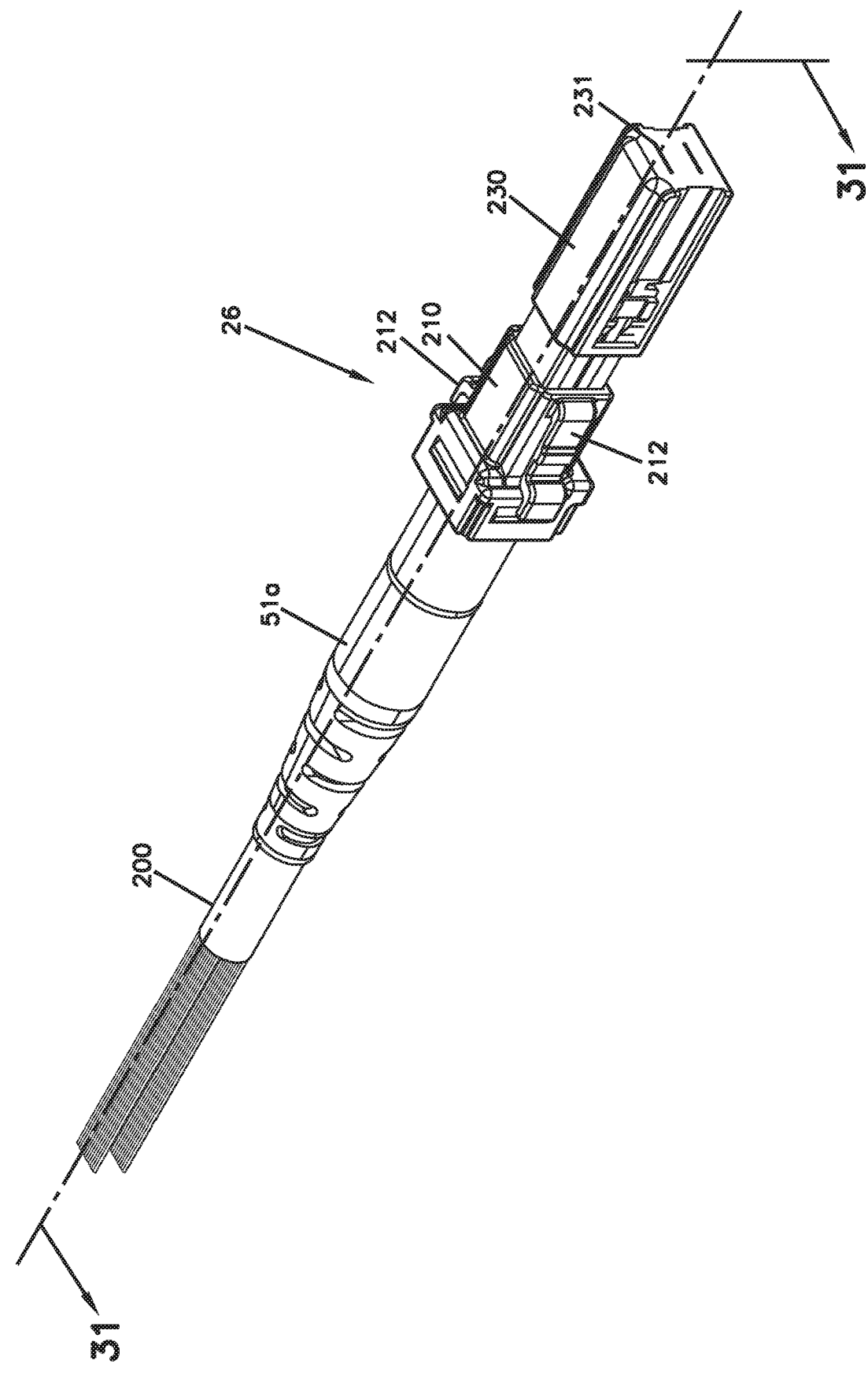
FIG. 29 is a perspective view of a male fiber optic connector in accordance with the principles of the present disclosure.
Figure 30:
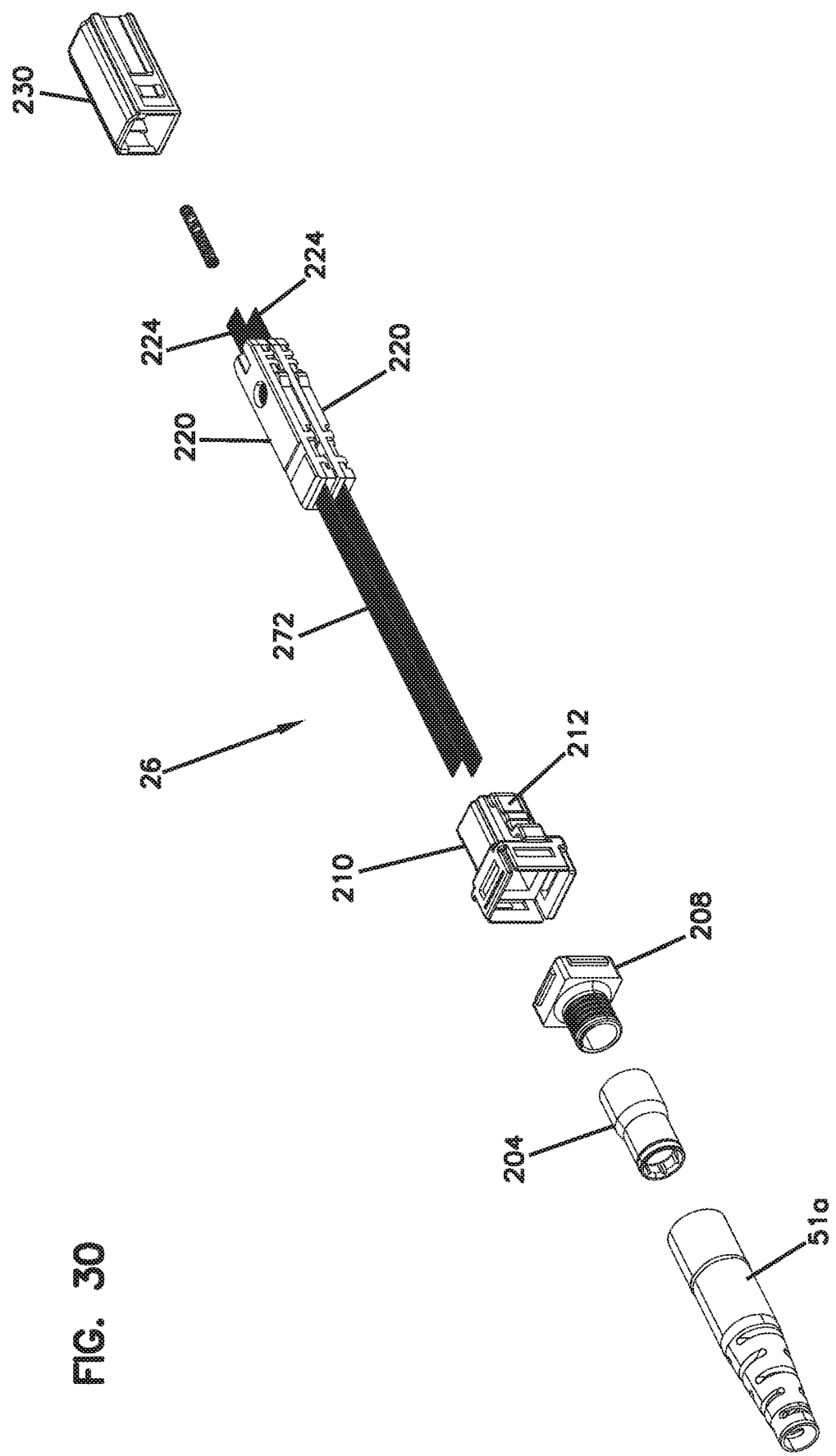
FIG. 30 is an exploded view of the male fiber optic connector of FIG. 29.
Figure 31:
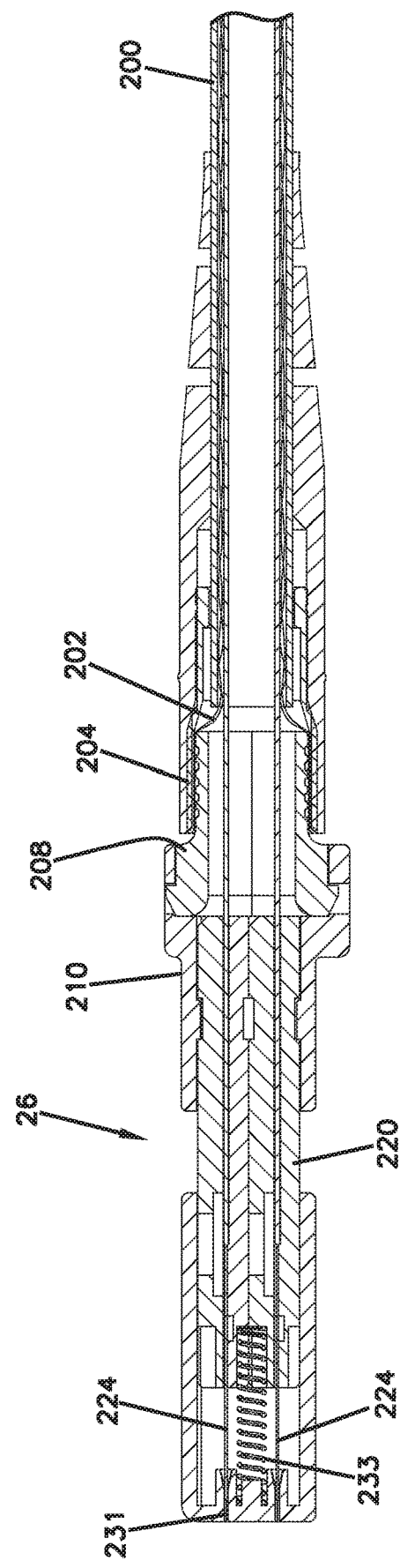
FIG. 31 is a cross-sectional view taken along section line 31-31 of FIG. 29.

Referring to FIG. 29, the male fiber optic connector 26 is depicted as a multi-fiber fiber optic connector. In the depicted example, the male fiber optic connector 26 is a ferrule-less fiber optic connector. The male fiber optic connector 26 is shown anchored to a fiber optic cable 200. Strength members 202 (e.g., string-like reinforcing elements such as Aramid yarns, fiberglass yarns or other structures as well as more rigid reinforcing structures such as fiberglass reinforced polymer rods or metal rods) can be anchored to the male fiber optic connector 26. In one example, strength members 202 can be anchored to a rear piece of the male fiber optic connector 26. As depicted at FIG. 31, strength members 202 are shown mechanically fastened by a crimp 204 to a rear stub portion 206 of a cable anchor 208 that mounts at a back side of the male fiber optic connector 26. A boot 51a can mount over the crimp 204 to provide bend radius protection at the cable-to-connector interface adjacent the rear end of the fiber optic connector 26. The male fiber optic connector 26 also includes a connector body 210 having a rear snap-fit interface for coupling with the rear cable anchor 208. The connector body 210 also includes first and second latches 212. The first and second latches 212 can include a flexible/elastic cantilevered configuration with base ends 213 that are unitarily formed with a main portion 211 of the connection body 210. The latches can have an elastic configuration and can be flexed between a retaining position and a release position. The first and second latches 212 can include retention catches 215 (e.g., tabs). It will be appreciated that the first and second latches 212 are configured for retaining the male fiber optic connector 26 within the connector port 24 of the female fiber optic connector 20. The retention catches 215 can include retention surfaces 214. In certain examples, the latches can be positioned on opposite sides of the connector body 210. In certain examples, the first and second latches 212 can have a resilient or elastic construction. In certain examples, first and second latches 212 can be integrally (e.g., monolithically) molded with the main portion of the connector body 210 to form a seamless molded plastic part.

The male fiber optic connector 26 also includes fiber carrier modules 220 each receiving a plurality of optical fibers 272 corresponding to the fiber optic cable 200. The optical fibers 272 can include end portions 224 that are preferably bare optical fibers (e.g., fibers including only a core and cladding without any coating). The fiber carrier modules 220 can be arranged in a stacked configuration and can be loaded into the interior of the connector body 210 and secured in place by latches (e.g., a snap fit configuration), adhesive or other means. In certain examples, the fibers can be anchored by adhesive or mechanical means (e.g., clamping) within the fiber carrier modules 220. In certain examples, fiber carrier modules can include fiber buckling regions for allowing portions of the optical fibers to buckle within the fiber carrier modules 220 when an optical connection is made with the female fiber optic connector 20. The male fiber optic connector 26 can also include a nose piece 230 that mounts over front ends of the fiber carrier modules 20. The nose piece 230 can slide relative to the fiber connection modules 220. The nose piece 230 can include openings 231 for receiving the end portions 224 of the optical fibers. The nose piece 230 can be movable between an extended position where the optical fiber ends 224 are protected and housed within the nose piece 230, and a retracted position where the optical fiber ends 224 extend through the openings 231 in the end wall of the nose piece and are therefore exposed. A spring 233 can be provided for biasing the nose piece toward the extended position.

When the male fiber optic connector 26 is inserted within the connector port 24, the latches 212 fit within guiding slots 240 defined by the third and fourth sides 32, 34 of the connector port 24. The guiding slots 240 can extend through the shoulders 32A, 34A. When the male fiber optic connector 26 is fully inserted within the connector port 24, the latches can snap to a retaining position where the retention surfaces of the latches 212 opposed the ingress action surfaces 32B, 34B provided at the sidewalls of the connector port 24. It will be appreciated that the ingress protection surfaces 32B, 34B have a reduced height at the location of the guiding slots 240. When the fiber optic connector 26 is inserted into the connector port 24, the latches 212 engage the sidewalls of the connector port and are forced to flex inwardly until the retaining surfaces 214 of the catches 215 move past the ingress protection surfaces 32B, 34B. Once the retention surfaces move past the ingress protection surfaces 32B, 34B, the latches snap outwardly via their internal inherent elasticity to a latching position where the retention surfaces 214 oppose the ingress protection surfaces 32B, 34B.

To remove the fiber optic connector 26 from the connector port 24, the latches 212 can be manually flexed toward one another to disengage the catches 215 from the ingress protection surfaces such that the male fiber optic connector 26 can be removed from the connector port 24 without interference from the latches 212. In certain examples, an optional collar or other structure can be mounted over the latches. A collar can be retractable and can include a ramp surface that engages the latches to move the latches from the latching position to a disengaged position. This way, a single structure can be grasped to move the latches from the latching position to the unlatching latched position. Therefore, it would not be necessary to separately manually engage each of the latches.

Figure 34:
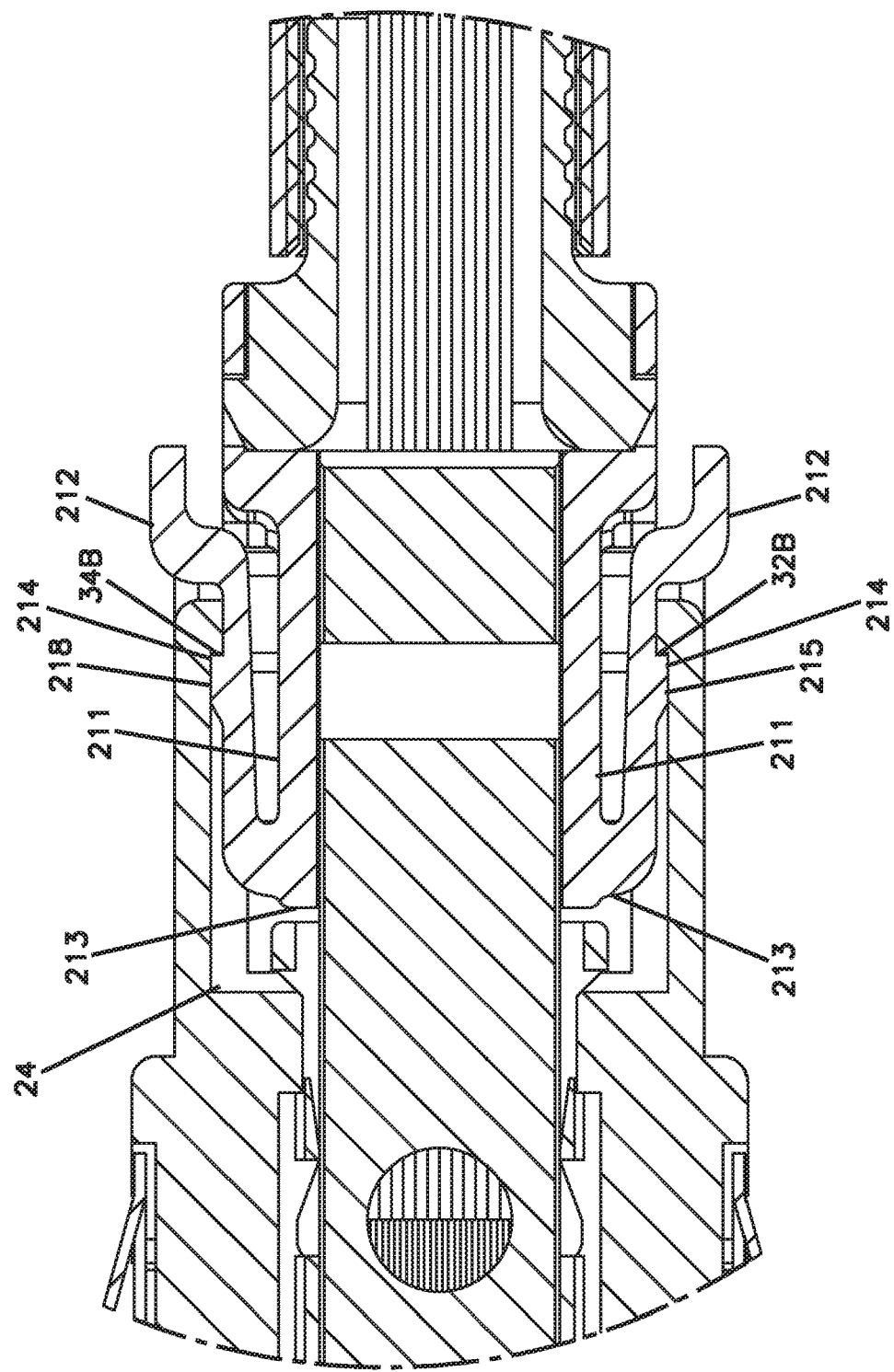
FIG. 34 is an enlarged view of a portion of the cross-sectional view of FIG. 33.
Figure 35:
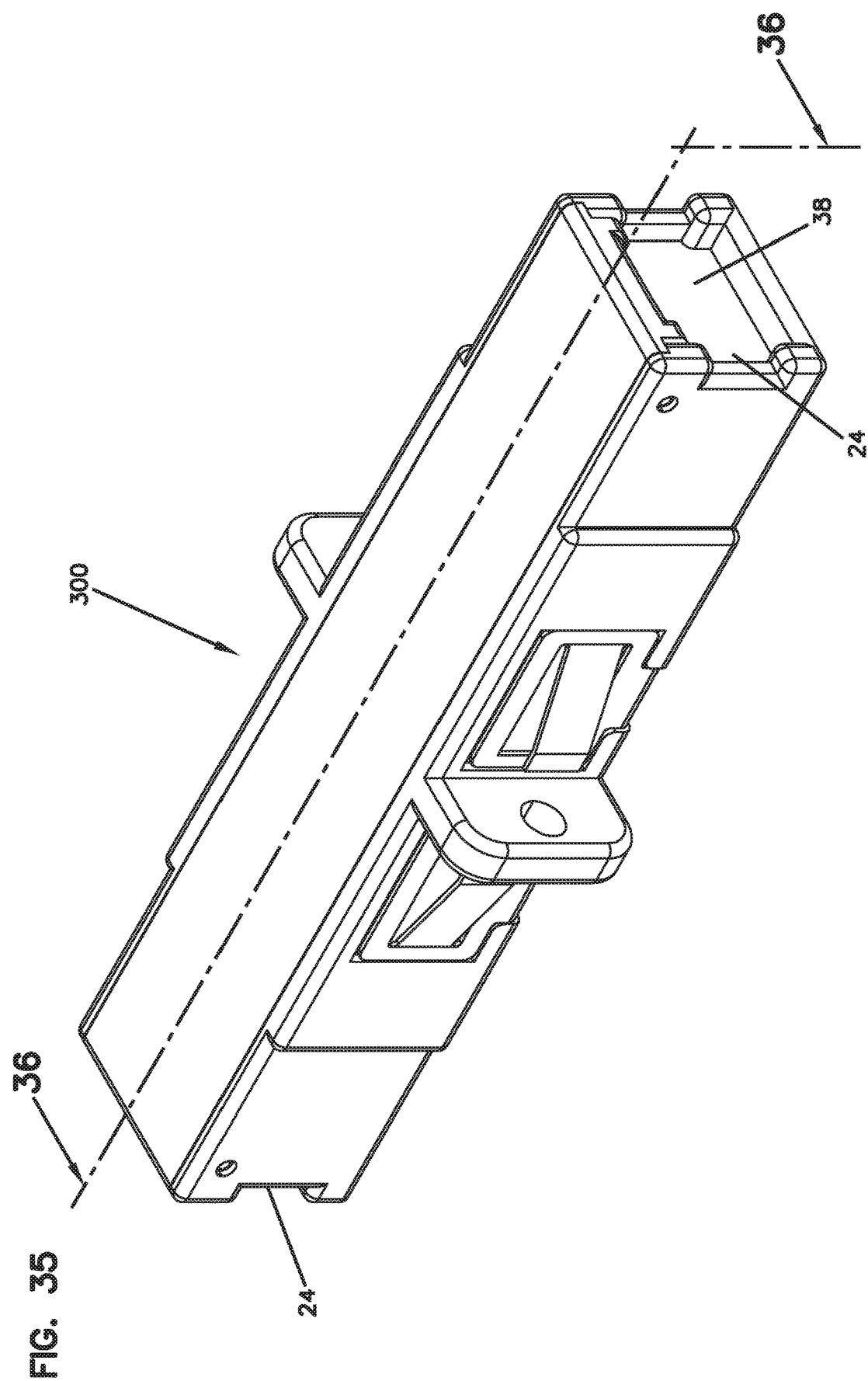
FIG. 35 is a perspective view of a fiber optic adapter in accordance with the principles of the present disclosure.
Figure 36:
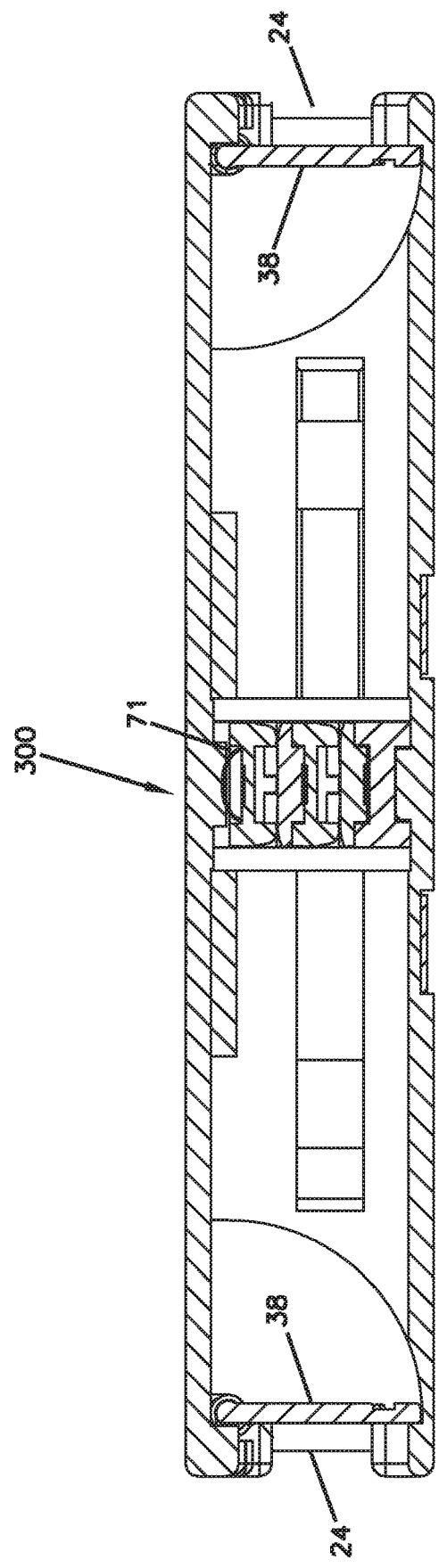
FIG. 36 is a cross-sectional view taken along section line 36-36 of FIG. 35, in the cross-sectional view of FIG. 36 the shutters are shown in closed positions.
Figure 37:
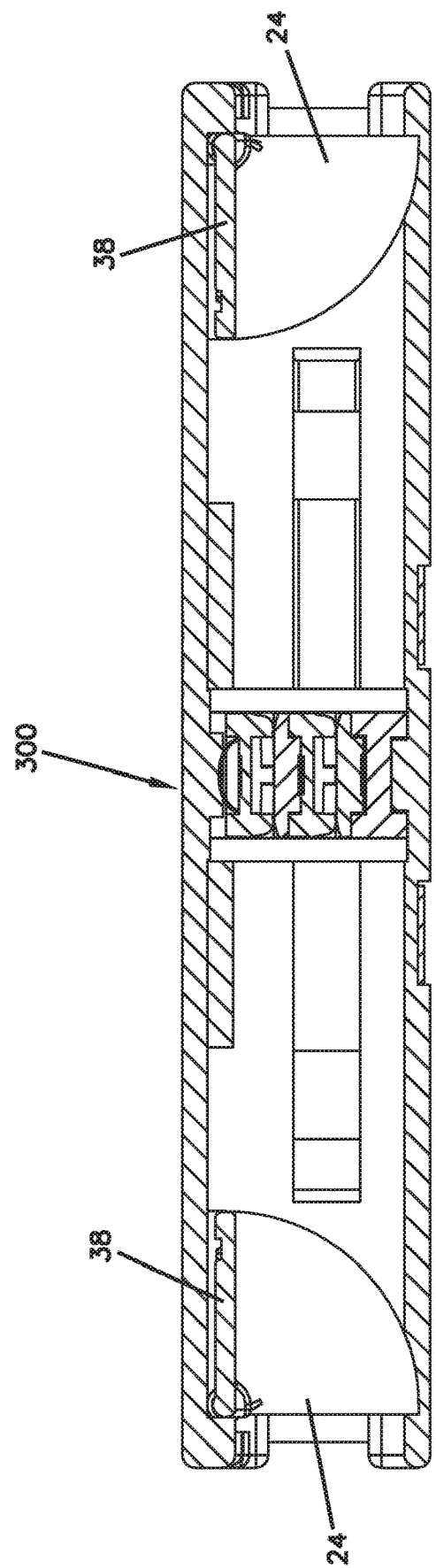
FIG. 37 is a cross-sectional view taken along section line 36-36 of FIG. 35 with the shutters are shown in open positions.
Figure 38:
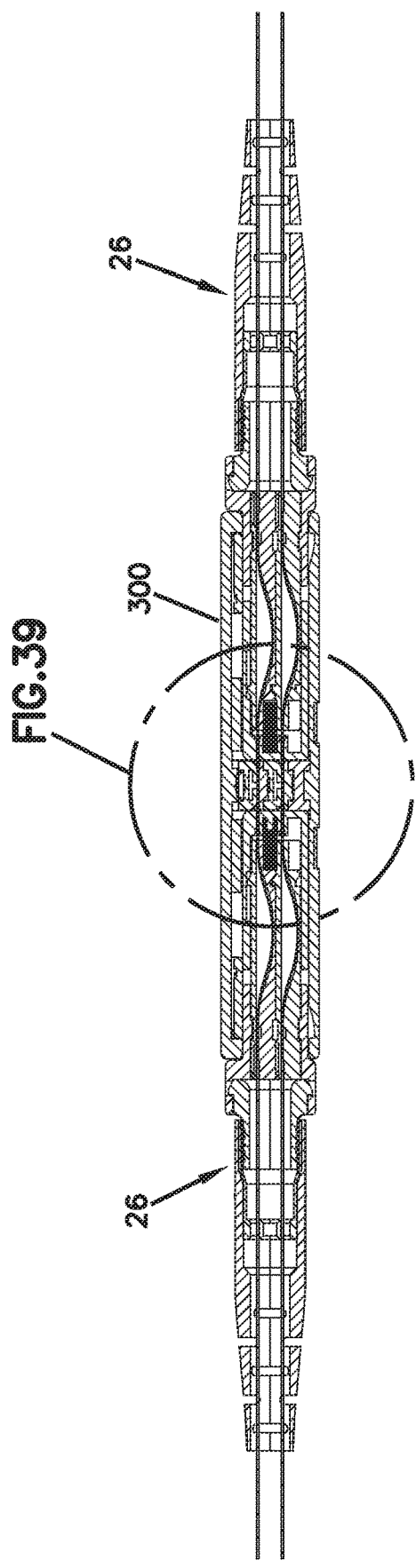
FIG. 38 is a cross-sectional view showing the fiber optic adapter of FIG. 35 being used to mechanically and optically couple together two of the male fiber optic connectors of FIG. 29.
Figure 39:
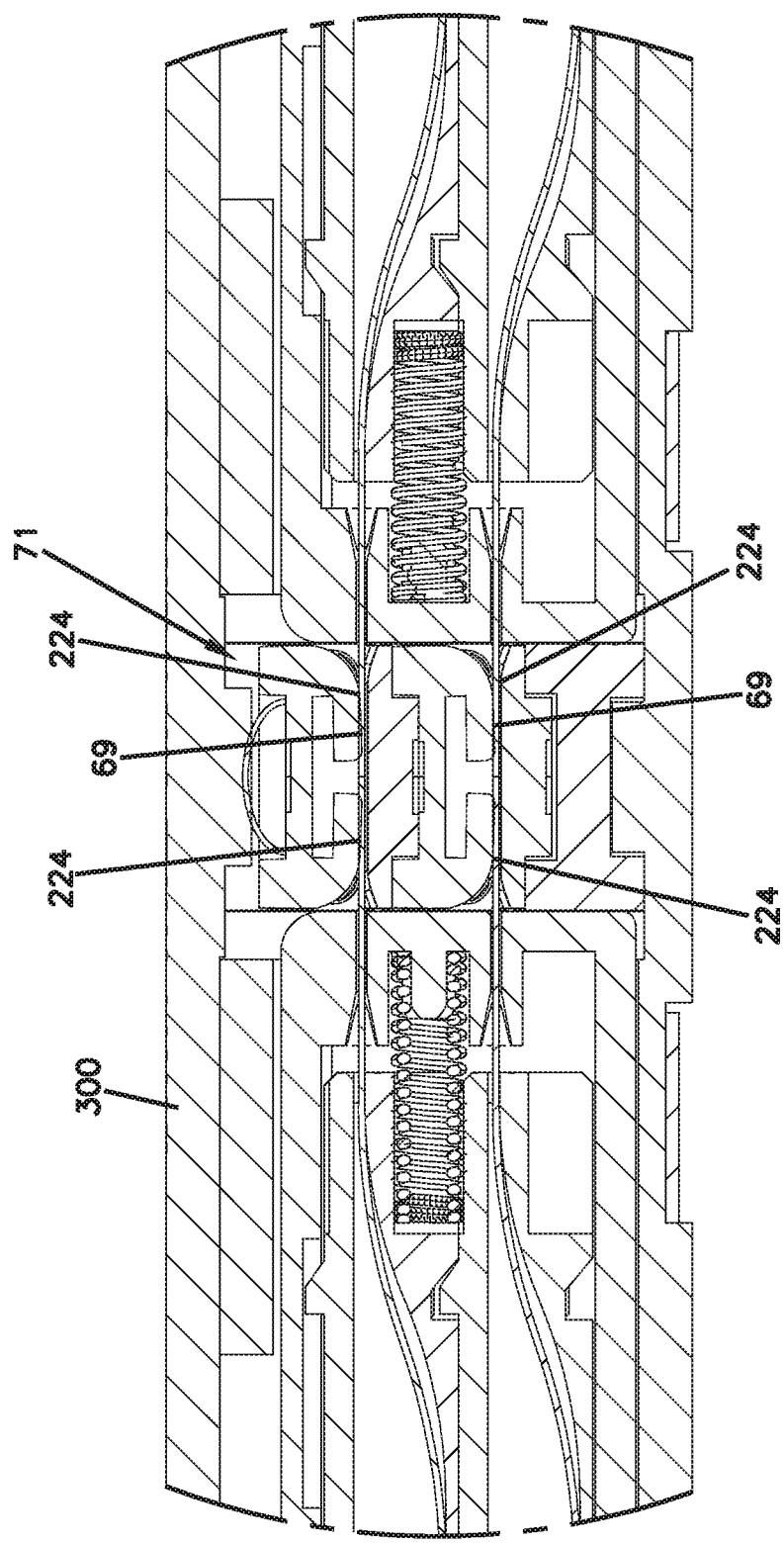
FIG. 39 is an enlarged view showing a bare fiber alignment system integrated within the fiber optic adapter of FIG. 35 for aligning inner fibers of the male fiber optic connectors inserted within the connector ports of the fiber optic adapter.

FIGS. 32-34 show the male fiber optic connector 26 latched within the connector port 24 of the female fiber optic connector 20. FIG. 34 shows how the remaining surfaces of the latches 212 oppose the ingress protection surfaces 32B, 34B provided at the third and fourth sides 32, 34 of the connector port 24.

The male fiber optic connection 26 is inserted in the inward direction 36 to load the male fiber optic connector 26 into the connector port 24. The male fiber optic connector 26 is moved in the outward direction 46 (after the latches have been moved to the non-latching position) to remove the male fiber optic connector 26 from the connector port 24. When the male fiber optic connector 26 is inserted into the connector port 24, the nose piece 230 is moved to expose the end portions 224 of the optical fibers of the male fiber optic connector 26 such that the end portions 224 can fit within the bare fiber alignment features 69 (e.g., grooves, V grooves, openings) provided within the female fiber optic connector 20 to provide coaxial alignment between the optical fibers of the male fiber optic connector and the optical fibers of the female fiber optic connector.

FIGS. 35-39 show example of fiber optic adapter 300 in accordance with the principles of the present disclosure. Fiber optic adapter includes connector ports 24 provided at each end. Shutters 38 of the type described above are provided at each of the connector ports 24. The fiber optic adapter 300 includes a bare fiber alignment structure 71 located at a central region of the fiber optic adapter 300. In use, male fiber optic connectors 26 are inserted into each of the opposite ports of the fiber optic adapter 300. Upon insertion of the fiber optic connectors into the ports, the shutters 38 are pushed open and the nose pieces of the fiber optic connectors 26 are retracted. Insertion continues until the bare optical fibers (e.g., the end portions 224) of the fiber optic connectors 26 are received within the bare fiber alignment features 69 of the fiber optic adapter such that the optical fibers of the two male fiber optic connectors 26 are coaxially aligned with one another. When fully inserted within the ports, the latches 212 of the male fiber optic connectors 26 engage the ingress protection surfaces provided at the sides of the ports to retain the male fiber optic connectors in the inserted position. To disconnect the fiber optic connectors from one another, latches 212 are moved to the released orientation thereby allowing the male fiber optic connectors 26 to be withdrawn from the connector ports 24 of the fiber optic adapter 300.

Figure 40:
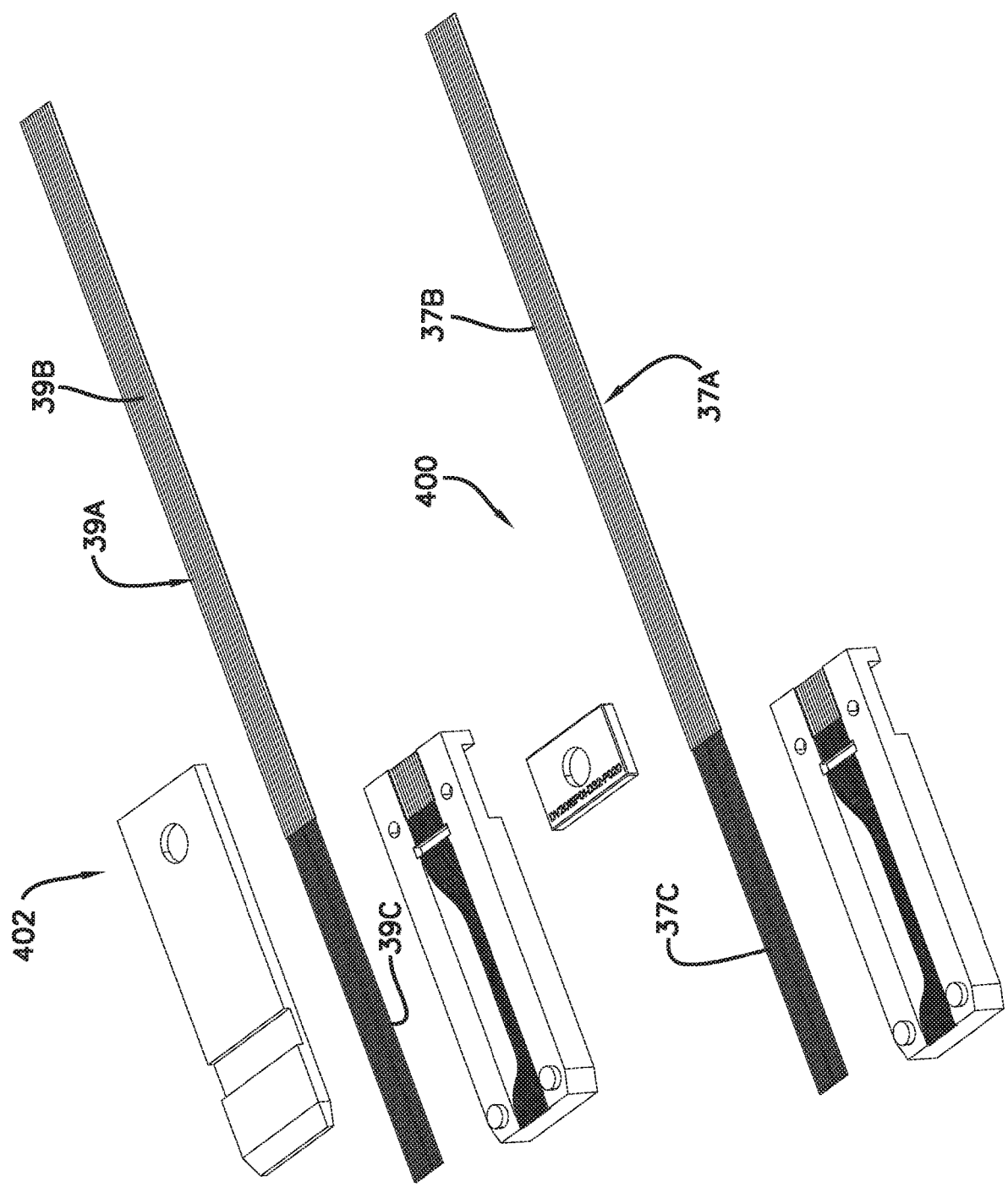
FIG. 40 is an exploded view showing first and second fiber optic subassemblies adapted to be stacked together and incorporated within the interior of the female fiber optic connector of FIG. 1.
Figure 54:
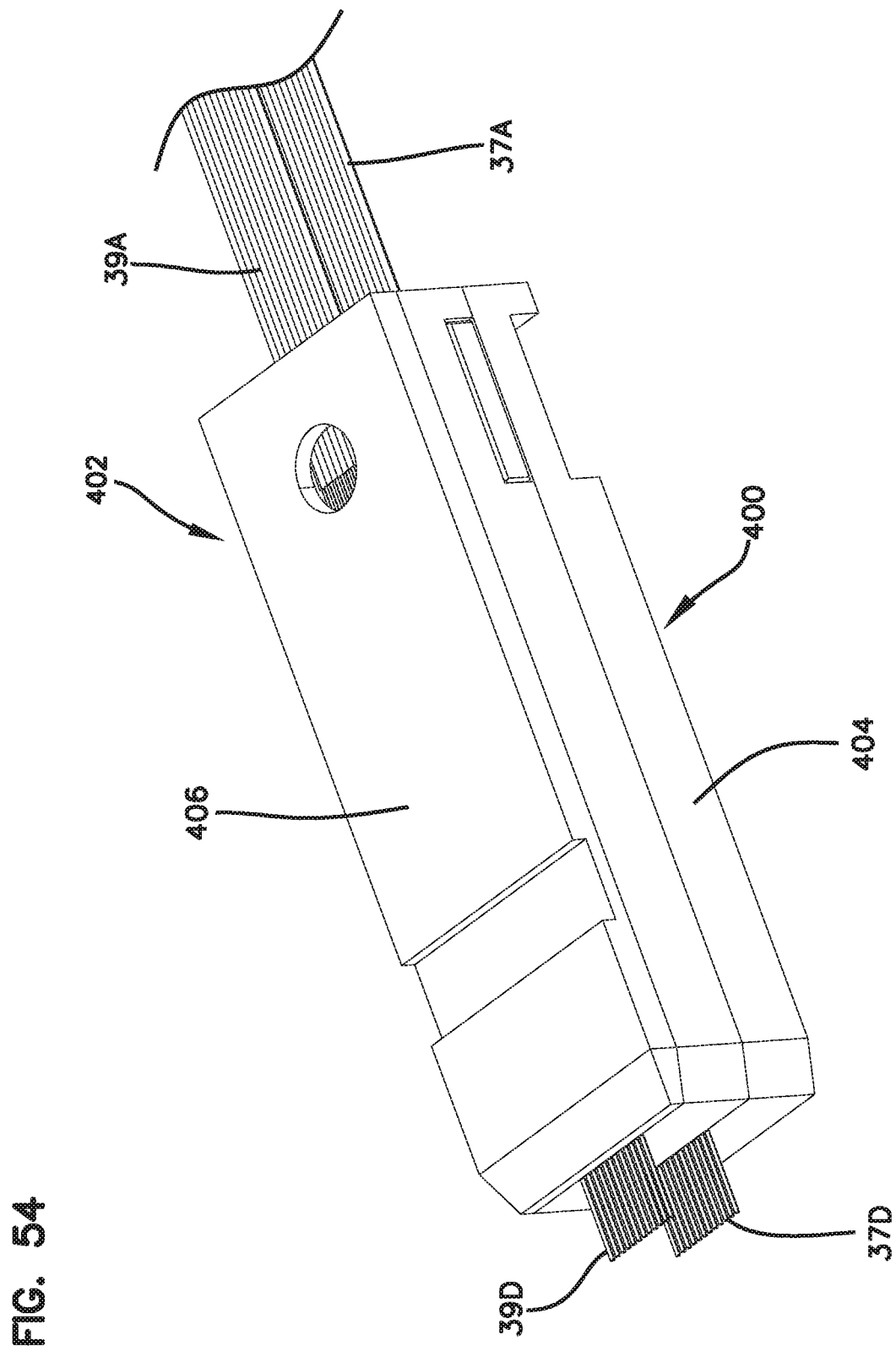
FIG. 54 shows an assembly step after the assembly step of FIG. 53 where the upper fiber optic subassembly is stacked upon the lower fiber optic subassembly in a mating, nested, stacked relationship.
Figure 55:
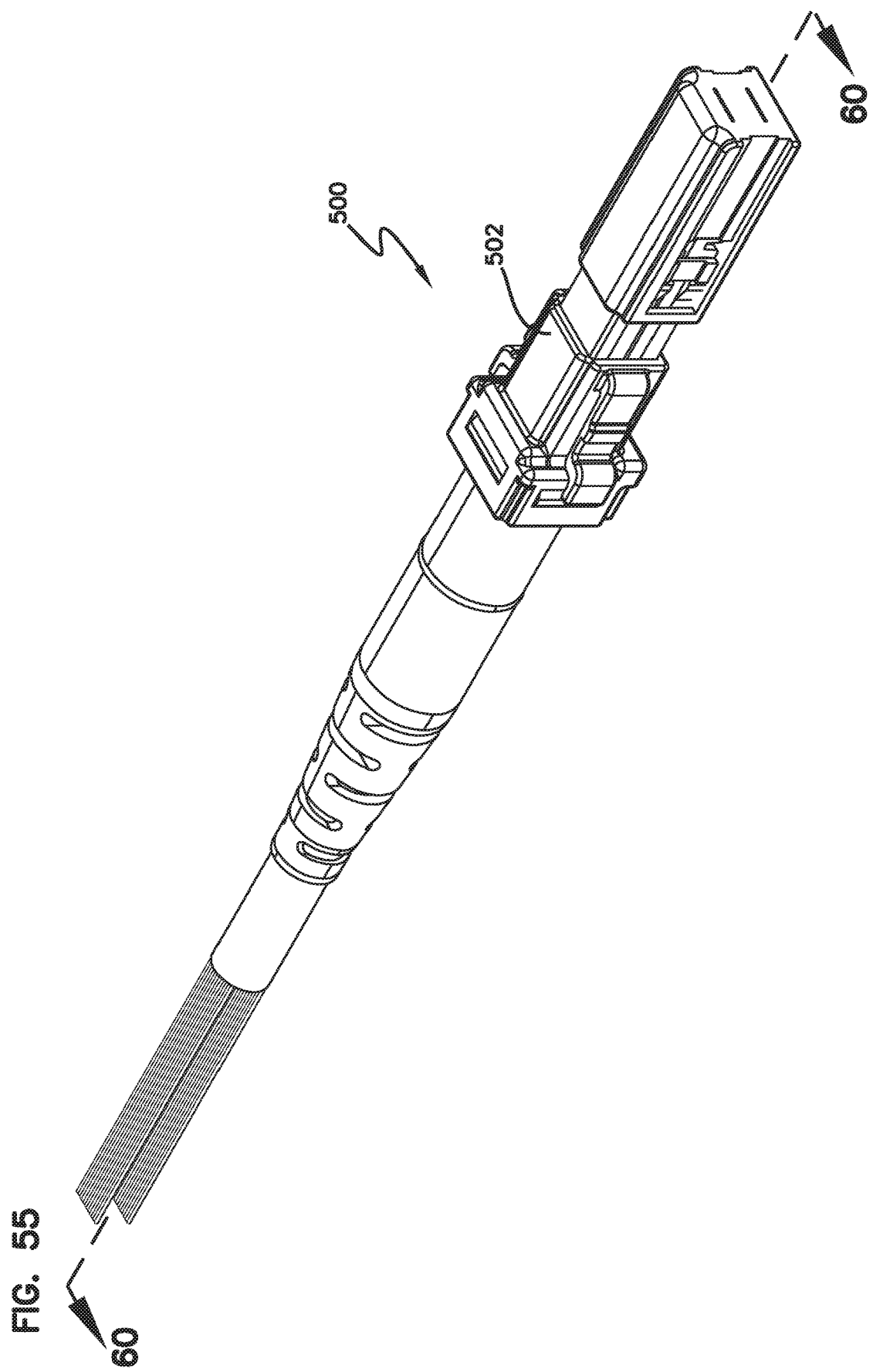
FIG. 55 is a perspective view of a male fiber optic connector in accordance with the principles of the present disclosure.
Figure 56:
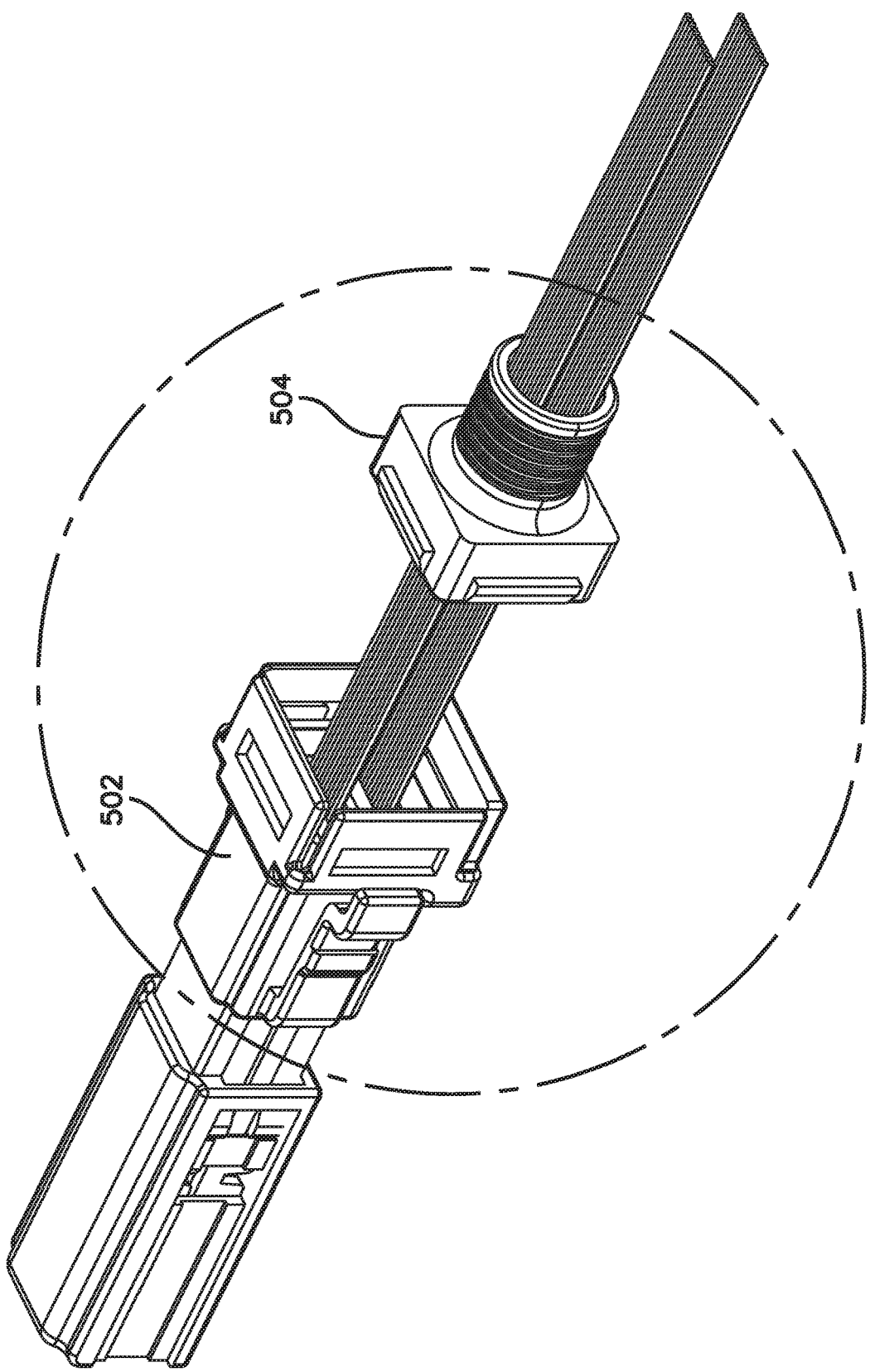
FIG. 56 is another perspective view of the male fiber optic connector of FIG. 55 with a rear cable anchor shown exploded outwardly from a main connector body of the male fiber optic connector.
Figure 57:
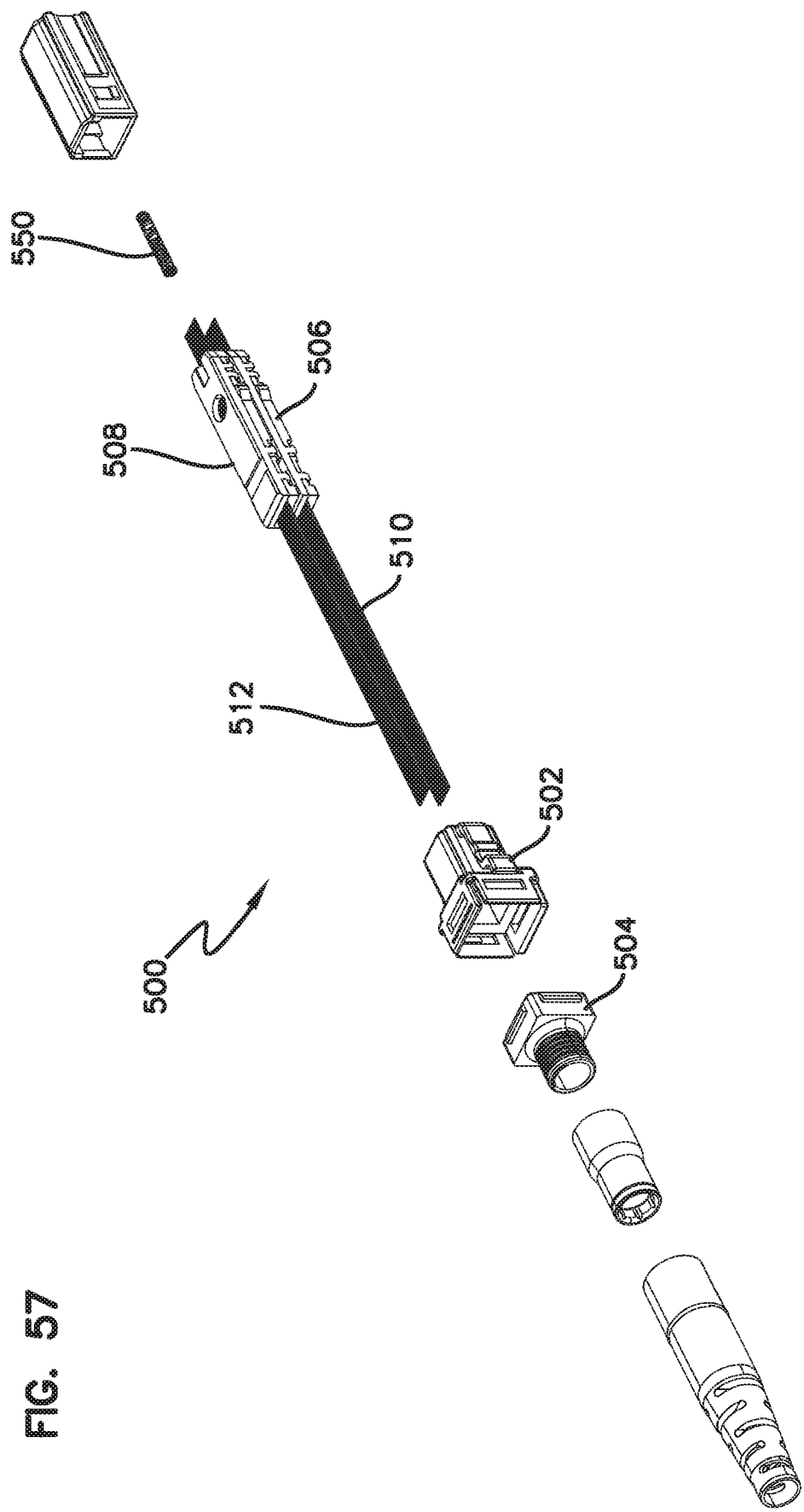
FIG. 57 is an exploded view of the male fiber optic connector of FIG. 55.
Figure 58:
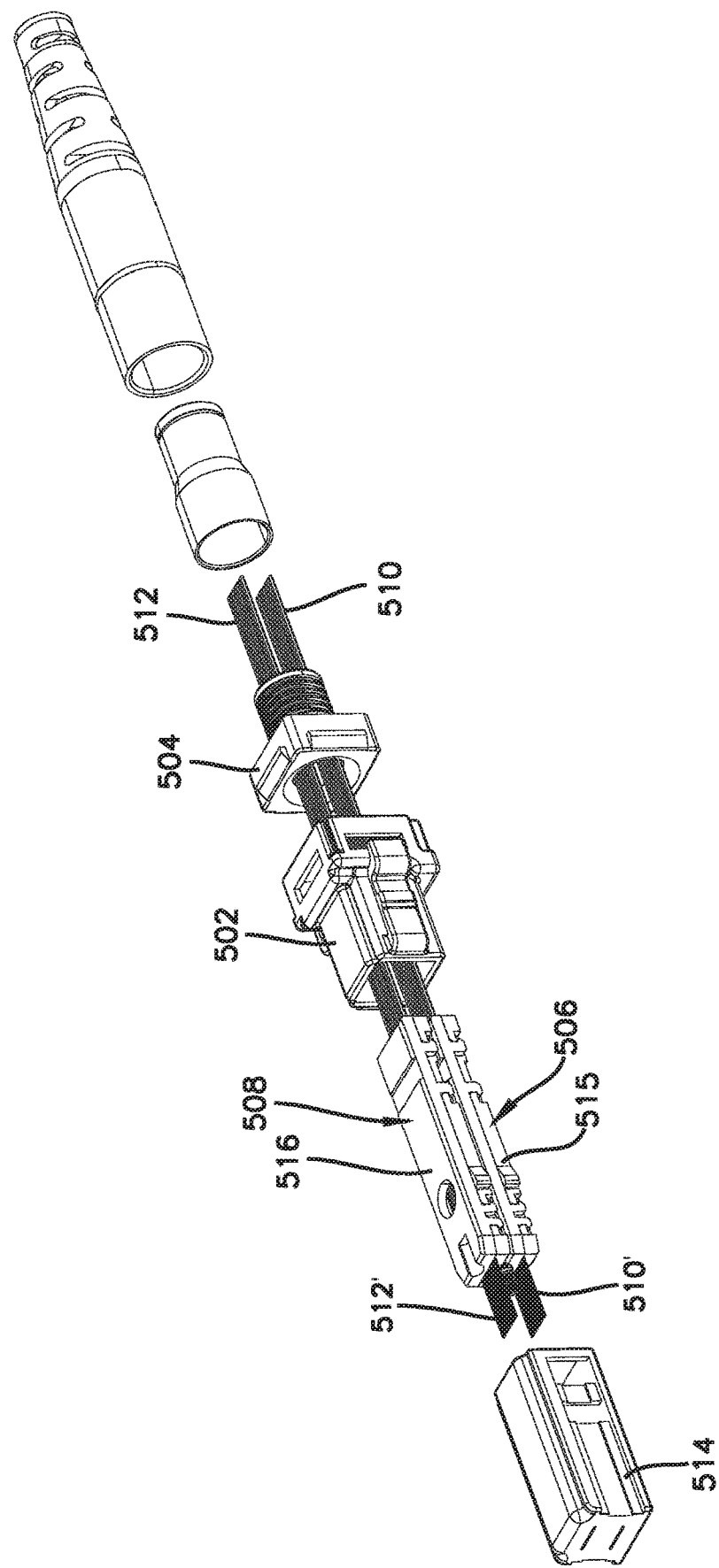
FIG. 58 is another exploded view of the male fiber optic connector of FIG. 55.
Figure 59:
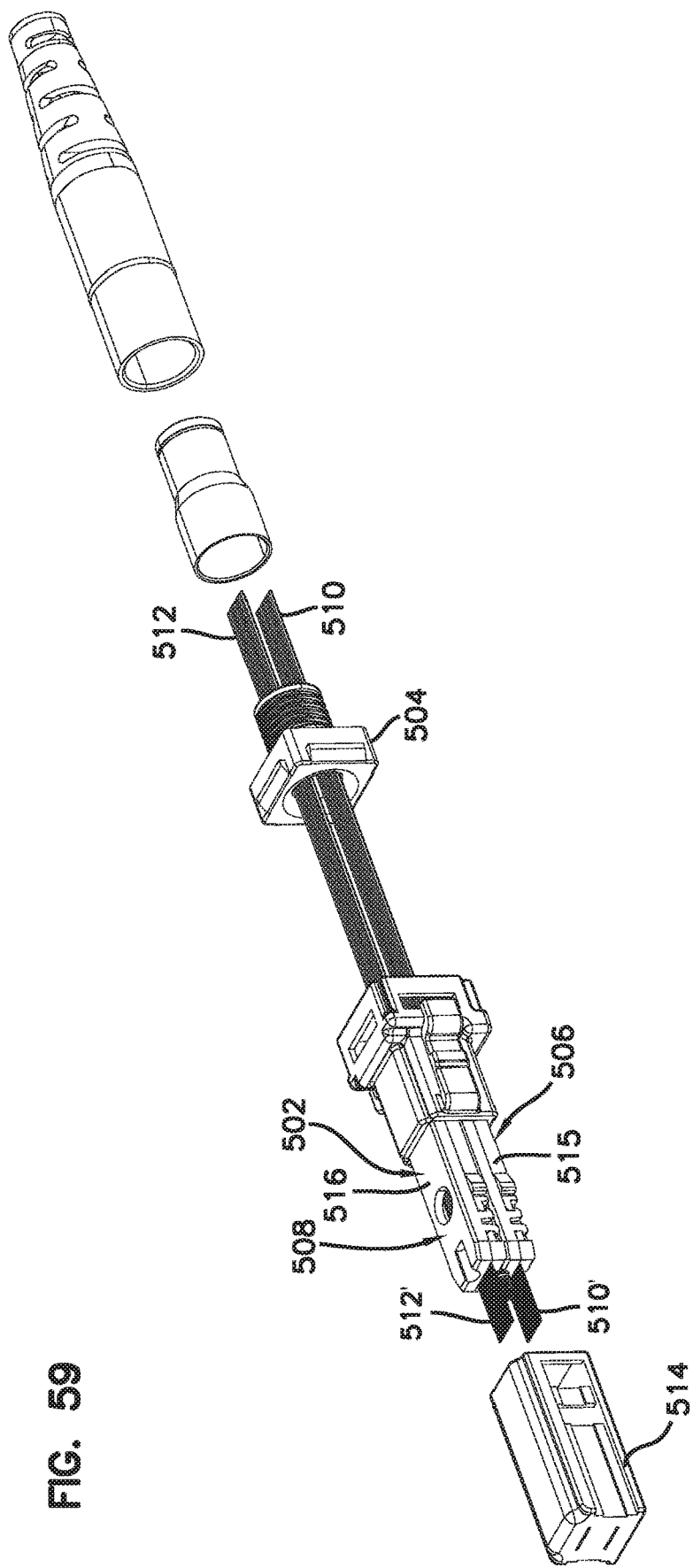
FIG. 59 is another exploded view of the male fiber optic connector of FIG. 55 showing a stack of fiber optic subassemblies loaded into a connector body of the male fiber optic connector.
Figure 60:
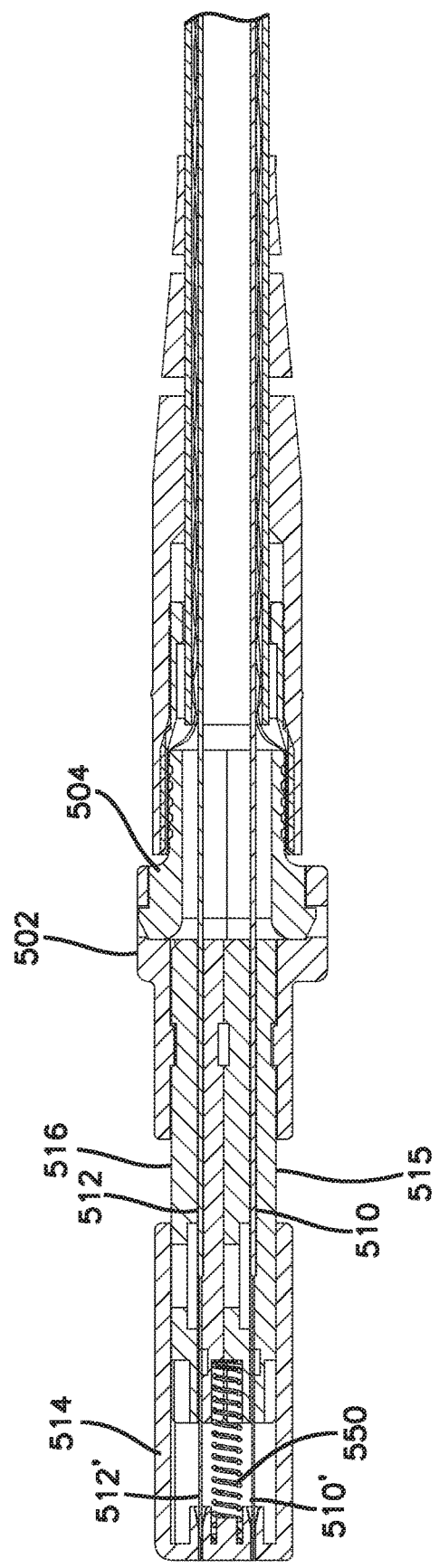
FIG. 60 is a cross sectional view taken along section line 60-60 of FIG. 55.
Figure 61:
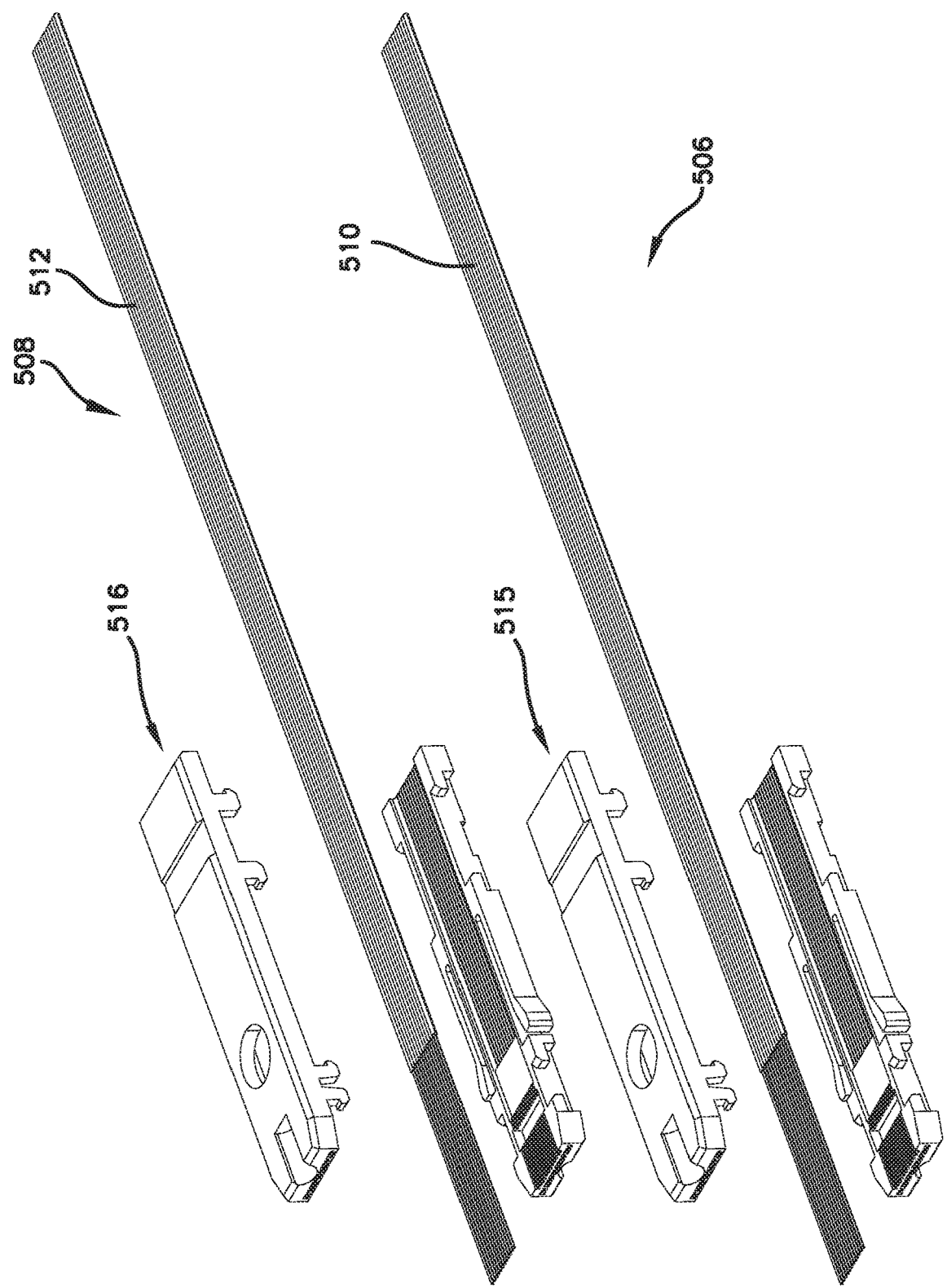
FIG. 61 is an exploded view of two fiber optic subassemblies that are integrated within the male fiber optic connector of FIG. 55.
Figure 62:
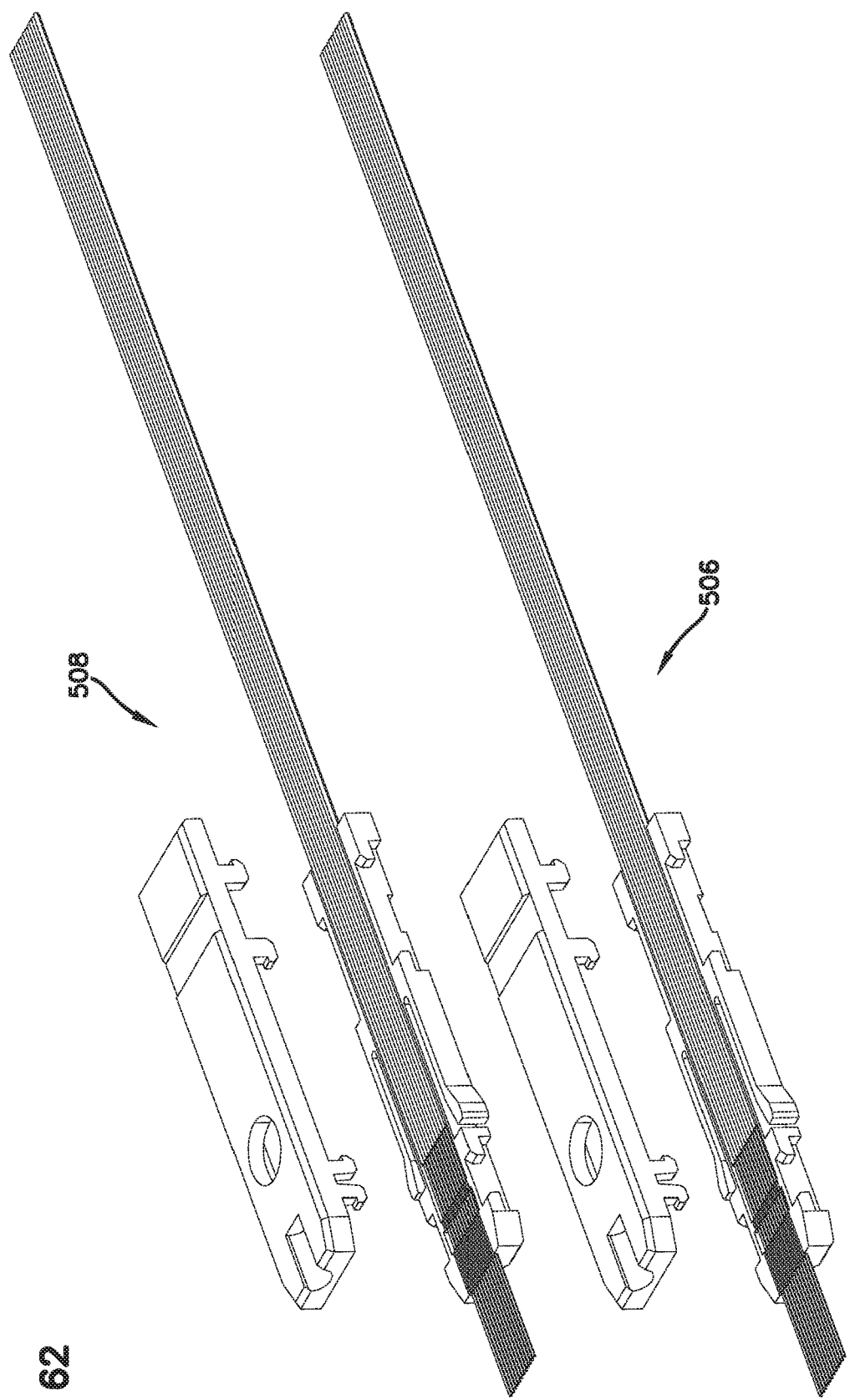
FIG. 62 shows the fiber optic subassemblies of FIG. 61 with rows of optical fibers loaded within the fiber carrier modules.
Figure 63:
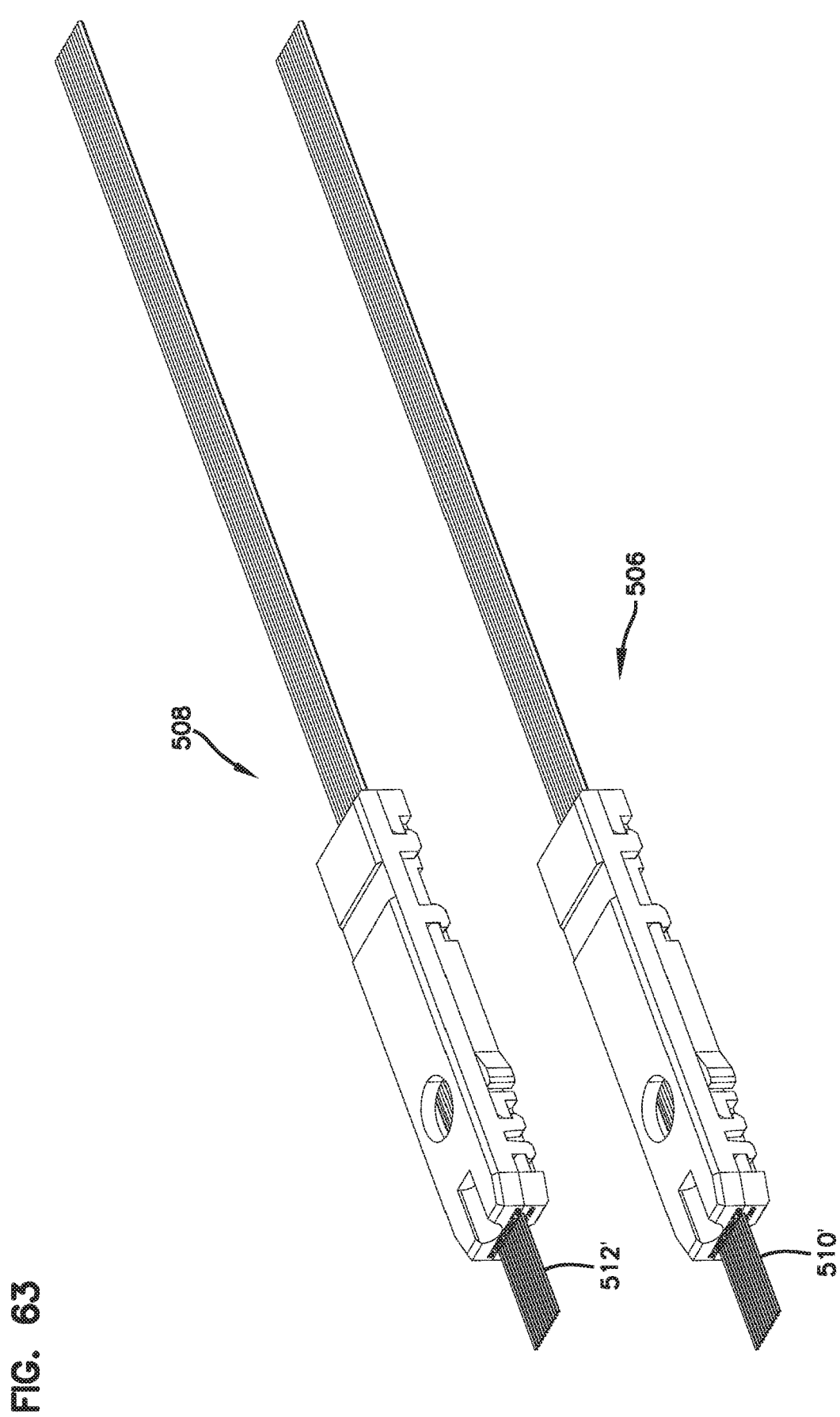
FIG. 63 shows the fiber optic subassemblies of FIG. 62 with full module covers mounted to main module bodies of each of the fiber carrier modules such that the rows of optical fibers are captured between the main module bodies and the full covers, it will be appreciated that the full covers can be secured to the main module bodies by mechanical connections such as mechanical latches or snap-fit configurations.
Figure 64:
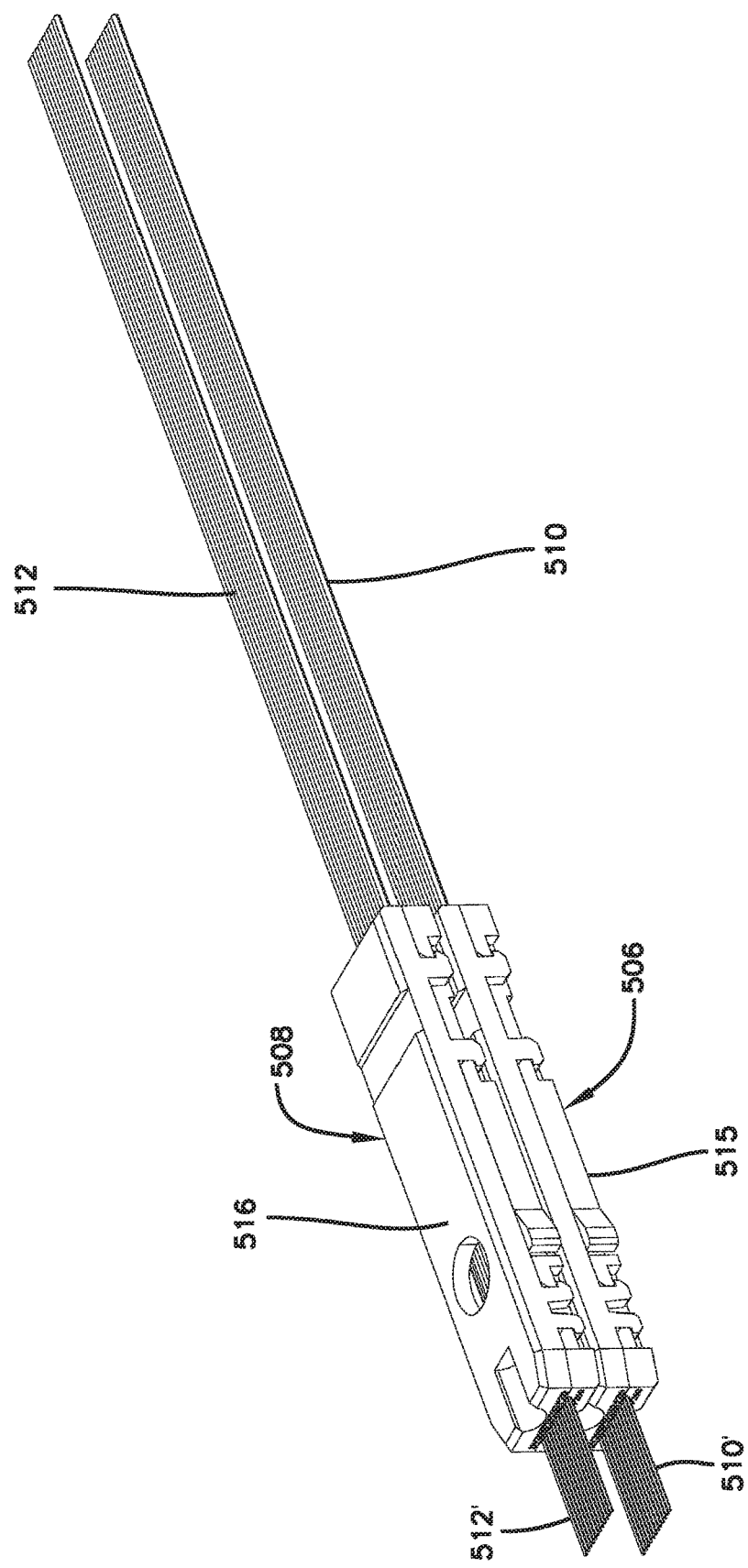
FIG. 64 shows the assembled subassemblies of FIG. 63 mounted together in a stacked relationship.

Turning to FIG. 40, fiber portions 37C, 39C of the optical fibers 37B, 39B located within the female fiber optic connector 20 are de-ribbonized and therefore not bound together with matrix material. Instead, the fiber portions 37C, 39C can be bare (e.g., uncoated so as to include only an optical core surrounded by a cladding layer with no additional surrounding polymeric coating). The fiber portions 37C, 39C can be managed in separate groups within female fiber optic connector 20 by corresponding first and second fiber carrier modules 400, 402 (e.g., the fiber portions 37C are managed by the first fiber carrier module 400 and the fiber portions 39C are managed by the second fiber carrier module 402). The optical fibers 37B and the first fiber carrier module 400 form a first fiber optic subassembly 404 (see FIG. 54) while the optical fibers 39B and the second fiber carrier module 402 form a second fiber optic subassembly 406 (see FIG. 54). The first and second fiber carrier modules 400, 402 are preferably arranged in a stacked configuration when mounted within the female fiber optic connector 20. The first and second fiber carrier modules 400, 402 can be held in the stacked configuration mechanically (via latches, a snap-fit interface, clamps, fasteners, etc.) or by an adhesive such as epoxy. The first and second fiber carrier modules 400, 402 can have mating interfaces for ensuring alignment between the stacked modules. Mating interfaces can include male features that are received in female features. Example features include posts that mate with openings, ribs or flanges that mate with receptacles and shoulders that mate with slots.

The first and second fiber carrier modules 400, 402 have similar structures and features and are preferably are of the same size or generally the same size. The first and second fiber carrier modules 400, 402 include a length L which extends between first and second opposite ends 412, 414 of the first and second fiber carrier modules 400, 402. The first and second fiber carrier modules 400, 402 each include a module main body 408 (see FIGS. 41 and 42) that defines a fiber passage 410 which extends from the first end 412 to the second end 414. The fiber portions 37C, 39C extend through the fiber passage 410 of their respective fiber carrier modules 400, 402. Non-ferrulized end portions 37D, 39D (see FIG. 19) of the fiber portions 37C, 39C project outwardly from the first ends of the fiber carrier modules 400, 402. The fiber passages 410 can include internal grooves or other dividing structures for separating the optical fibers with the passages 410 and for maintaining positioning of the optical fibers. The optical fibers extend through the first and second fiber carrier modules 400, 402 and include non-ferrulized end portions 37D, 39D that project respectively from the first ends 412 of the first and second fiber carrier modules 400, 402.

The first and second fiber carrier modules 400, 402 can each include one of the main module bodies 408 and a cover structure. The optical fiber portions 37C, 39C are routed within the fiber passages 410 and pass between the corresponding main module body 408 and one of the covers. The covers can include full covers 416 (see FIGS. 43 and 44) or partial covers 418 (see FIGS. 45 and 46). The covers can function to provide adhesive containment for containing adhesive (e.g., epoxy) at certain locations (e.g., fiber anchoring locations) in the fiber passage 410 and also can function to capture the optical fibers within the fiber passages 410. The covers can have features that mate with corresponding features of the module main body 408 to achieve/maintain specific positioning and/or alignment between the module main body and the covers. Example structures includes projections (e.g., posts), openings, through holes, slots, shoulders and the like.

Figure 41:
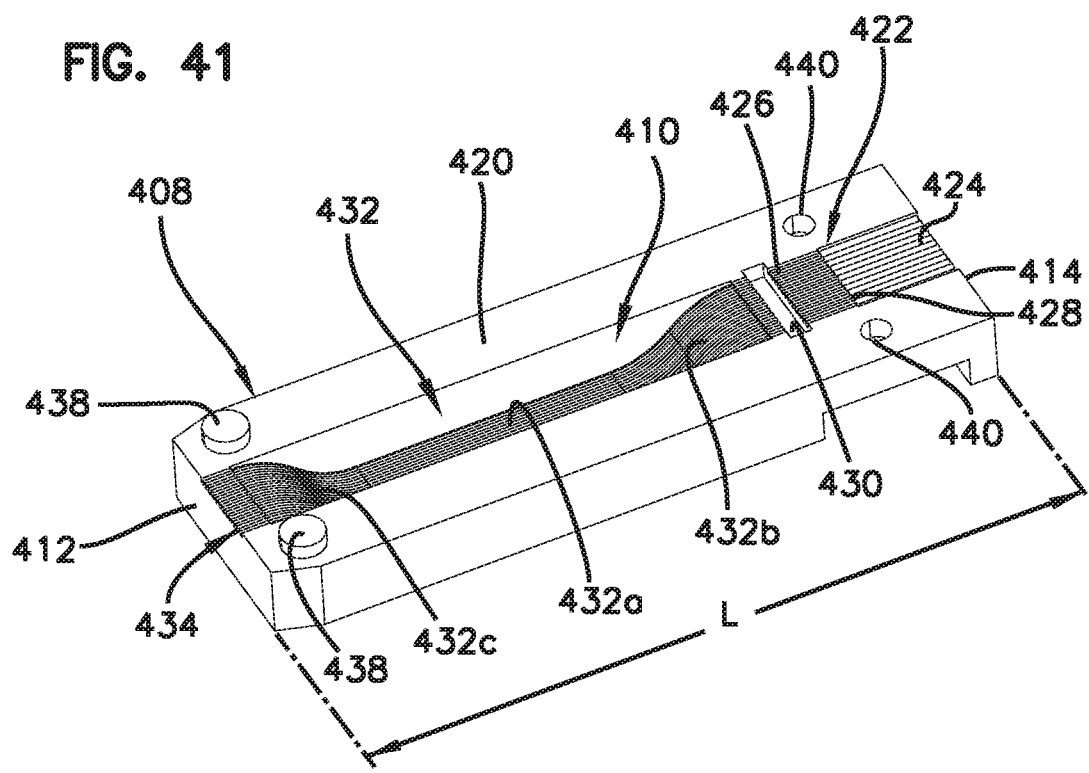
FIG. 41 is a perspective view of a first side of a main module body used by the fiber optic subassemblies of FIG. 40.

The main module bodies 408 are designed to provide various functionalities at specific locations along the length of the fiber passages. Referring to FIG. 41, a first side 420 of the main module body 408 defines the fiber passage 410 and much of the functionality is at the first side 420 within the fiber passage 410. For example, adjacent the second end 414, the main module body 408 defines a fiber anchoring location 422 within the passage 410. The fiber anchoring location 422 includes first and second grooved sections 424, 426 of the passage 410. The first grooved section 424 is deeper than the second grooved section 426 and is positioned directly at the second end 414 of the main module body 408. The depth of the first section 424 is suitable for receiving ends portions of the fiber ribbons 37A, 39A. The second grooved section 426 is adjacent the first grooved section 424 within a step 428 delineating the two sections. The second grooved section 426 has shallower grooves which receive the bare fiber portions 37C, 39C of the optical fibers 37B, 39B. The first side 420 further includes a capillary flow stop 430 and a fiber buckling region 432. The capillary flow stop 430 is positioned between the fiber anchoring location 422 and the fiber buckling region 432. The capillary flow stop 430 is configured to prevent epoxy from flowing via capillary action along the grooves of the passage 410 from the fiber anchoring location 422 to the fiber buckling region 432. The first side 420 further includes a non-ferrulized fiber locating region 434 at the first end of the main module body 408. The locating region includes grooves 436 (see FIG. 42) that precisely position the non-ferrulized end portions 37D, 39D of the optical fibers so that the non-ferrulized end portions 37D, 39D can be received within bare fiber alignment features 69 (e.g., grooves such as v-grooves, bores, slots, etc.) of a bare fiber alignment structure 71 (see FIG. 5) within the female fiber optic connector 20 when the stacked first and second fiber optic subassemblies 404, 406 are loaded into the connector housing 22.

The capillary flow stop 430 provides a break or discontinuity in the grooves of the fiber passage 410. The capillary flow stop 430 is depicted as an enlarged void region, cross slots, discontinuity, or open region. The capillary flow stop 430 provides a region of increased volume/depth as compared to the grooves in the fiber passage 410 on opposite sides of the capillary flow stop 430. In certain examples, the capillary flow stop 430 is positioned at an intermediate location along grooves sized for receiving bare optical fibers so as to provide an intermediate break or discontinuity in the grooves. In certain examples, the capillary flow stop 430 has a depth that is at least two, three or four times larger than the depths of the adjacent fiber grooves. Additionally, in certain examples, the capillary stop has a dimension in a direction parallel to the axes of the grooves that is at least two, three, four or five times as large as the diameters of the bare fibers received within the grooves.

The fiber buckling region 432 has a central portion 432a that is significantly deeper than the grooves for separating the fibers in the fiber passage 410. The central portion 432a can be significantly deeper than the capillary flow stop 430. The central portion 432a can have a constant depth and can be positioned between transition portions 432b, 432c of the buckling region 432 that provide a gradual depth transition from the relatively shallow depths of the anchoring and fiber locating region 422, 434 to the relatively deep depth of the central portion 432a. It will be appreciated that when the optical fibers are mounted in the carrier modules, the fibers are fixed relative to the carrier modules at the anchoring locations, but can move relative to the carrier modules in the region between the anchoring location and the first ends 414. When an optical connection is made with a mating fiber optic connector, contact between the abutting ends of the non-ferrulized fiber end portions can cause the fibers to be pushed back in the carrier modules causing the fibers to buckle in the buckling zone since the fibers are fixed at the anchoring location. When the fibers buckle, the elasticity of the fibers can assist in maintaining pressurized contact between the abutting ends of the optical fibers coupled together.

Figure 5:
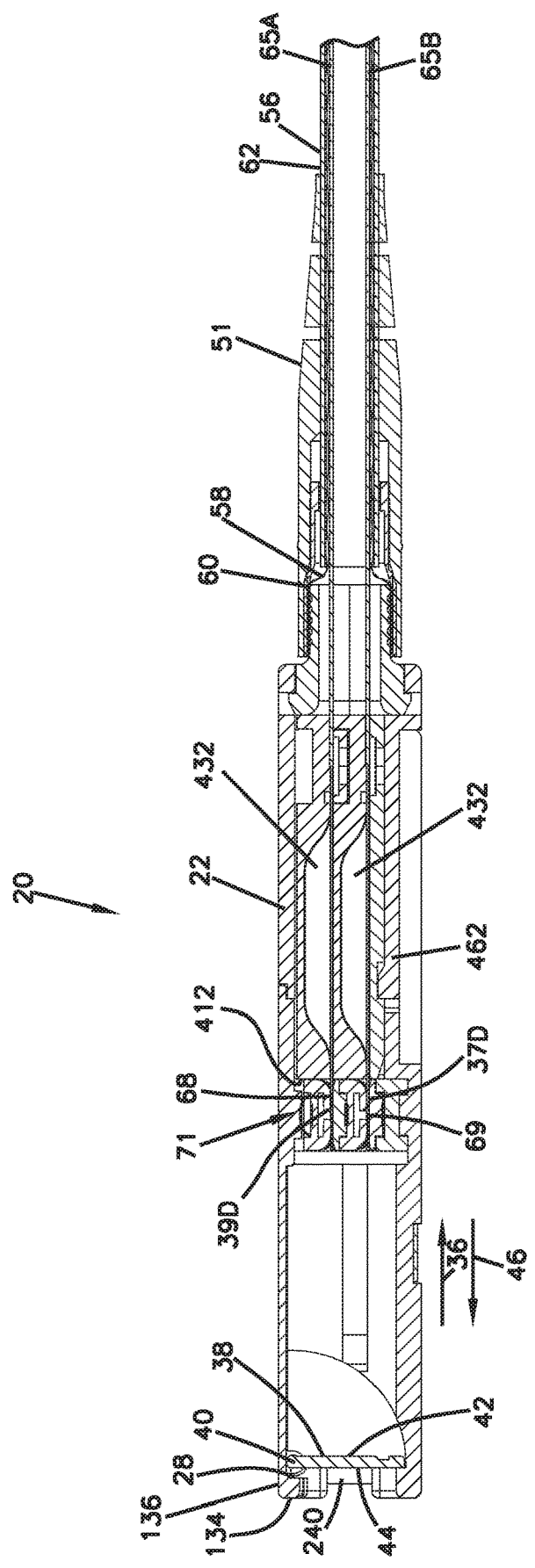
FIG. 5 is a cross-sectional view of the female fiber optic connector of FIG. 1 taken along cross-section line 5-5, a shutter of the female fiber optic connector is shown in a closed position.
Figure 6:
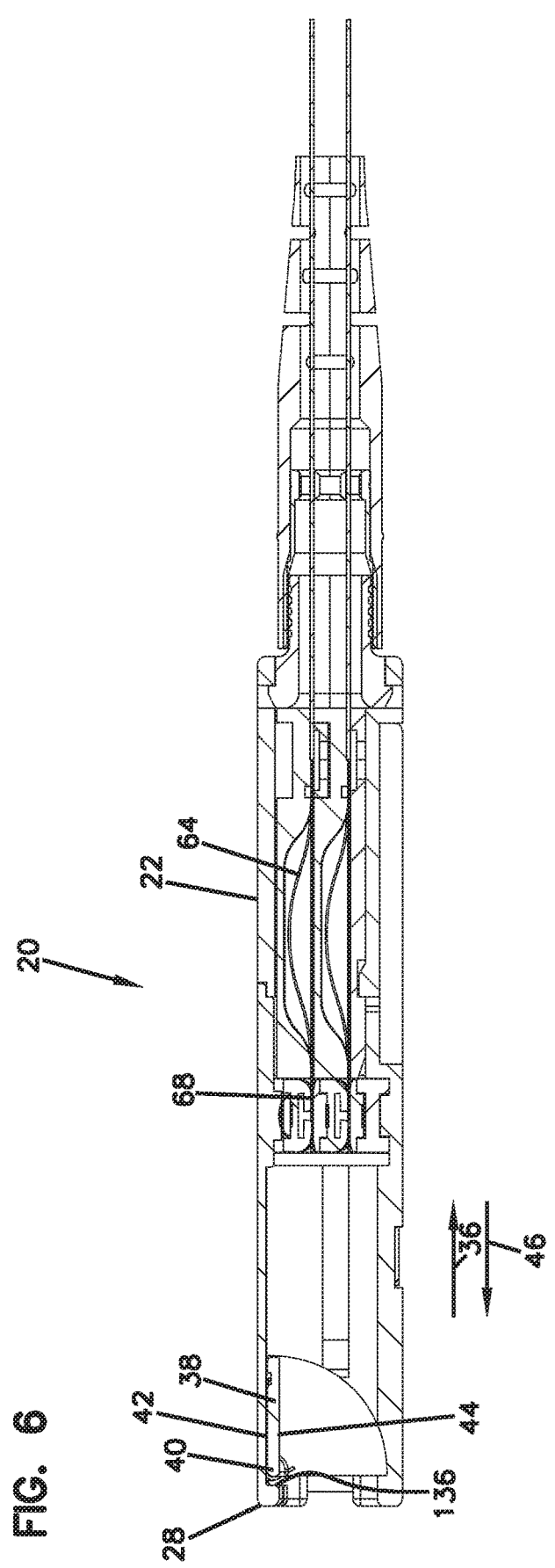
FIG. 6 is a cross-sectional view of the female fiber optic connector of FIG. 1 taken along cross-section line 5-5 with the shutter in an open position.
Figure 7:
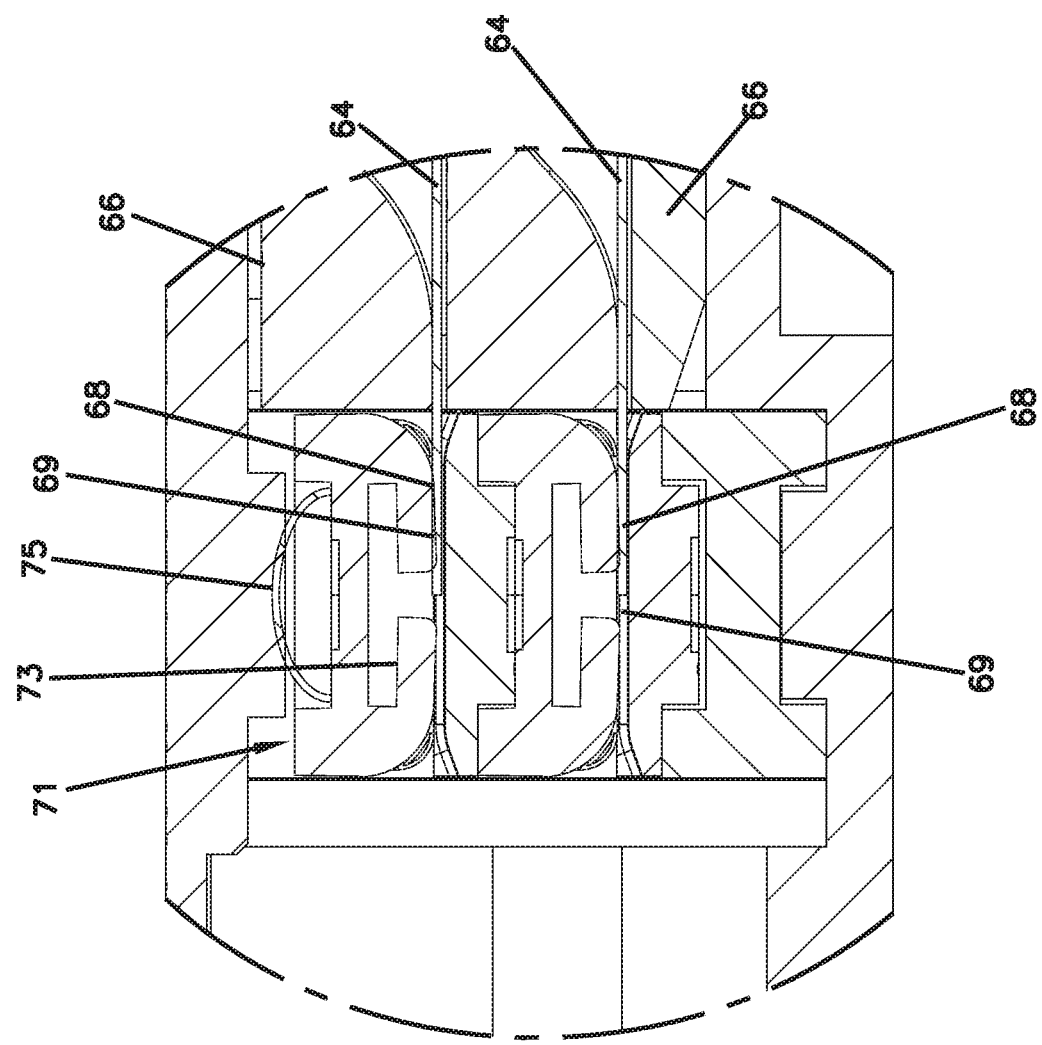
FIG. 7 is an enlarged view of a fiber alignment structure of the female fiber optic connector of FIG. 1.
Figure 8:
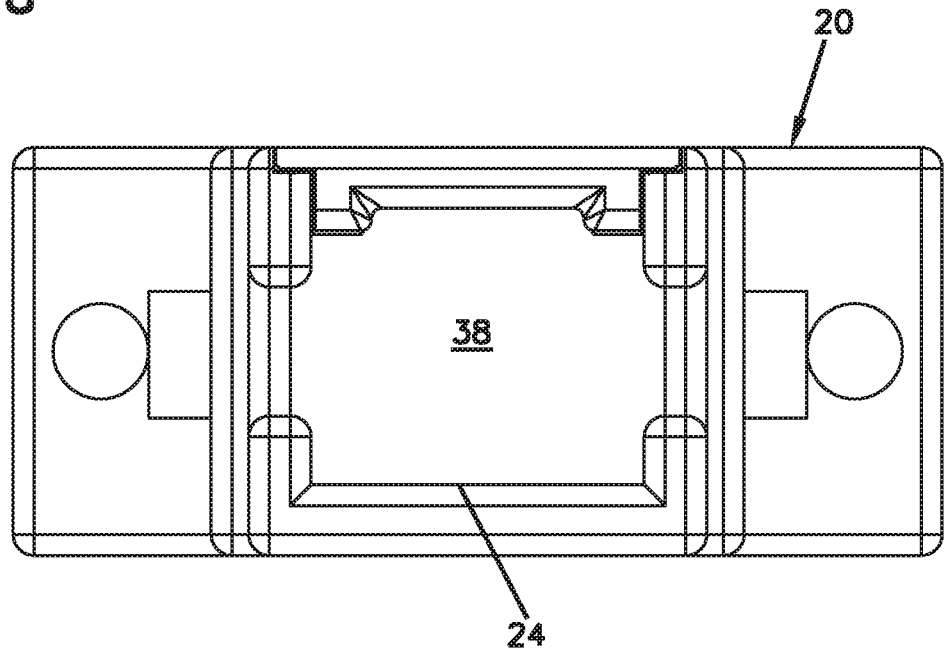
FIG. 8 is a front view of the fiber optic connector with the shutter in the closed position.
Figure 9:
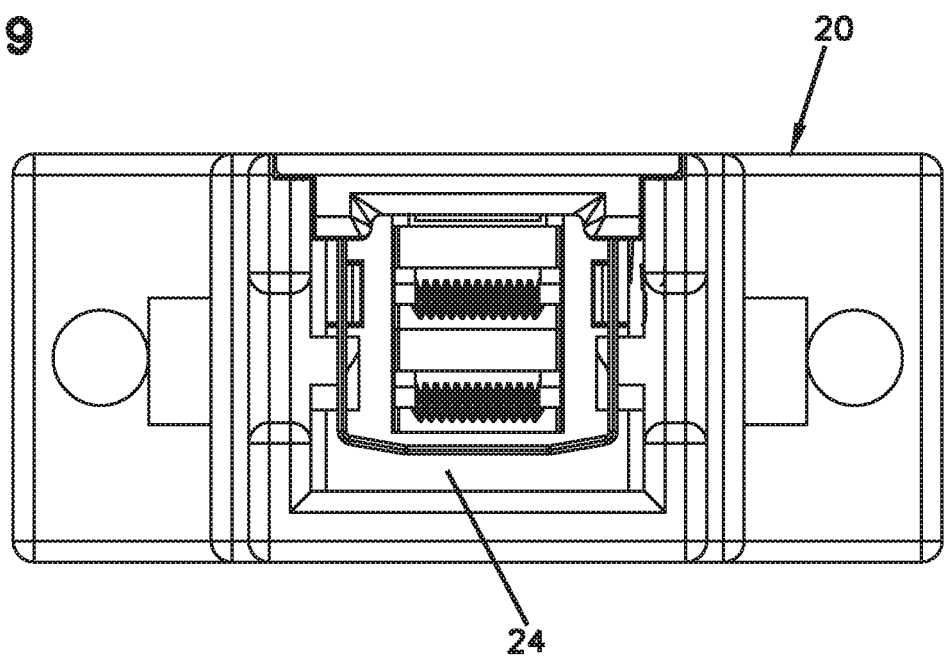
FIG. 9 is a front view of the female fiber optic connector of FIG. 1 with the shutter in the open position.
Figure 42:
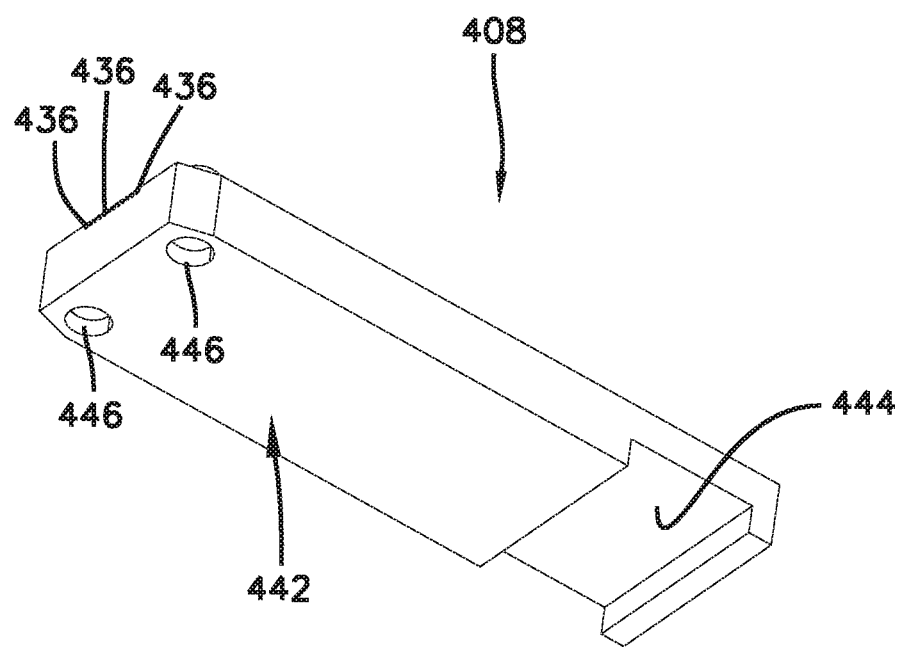
FIG. 42 is a perspective view of a second side of the main module body of FIG. 41, the second side of the main module body is opposite from the first side of the main module body shown at FIG. 41.
Figure 43:
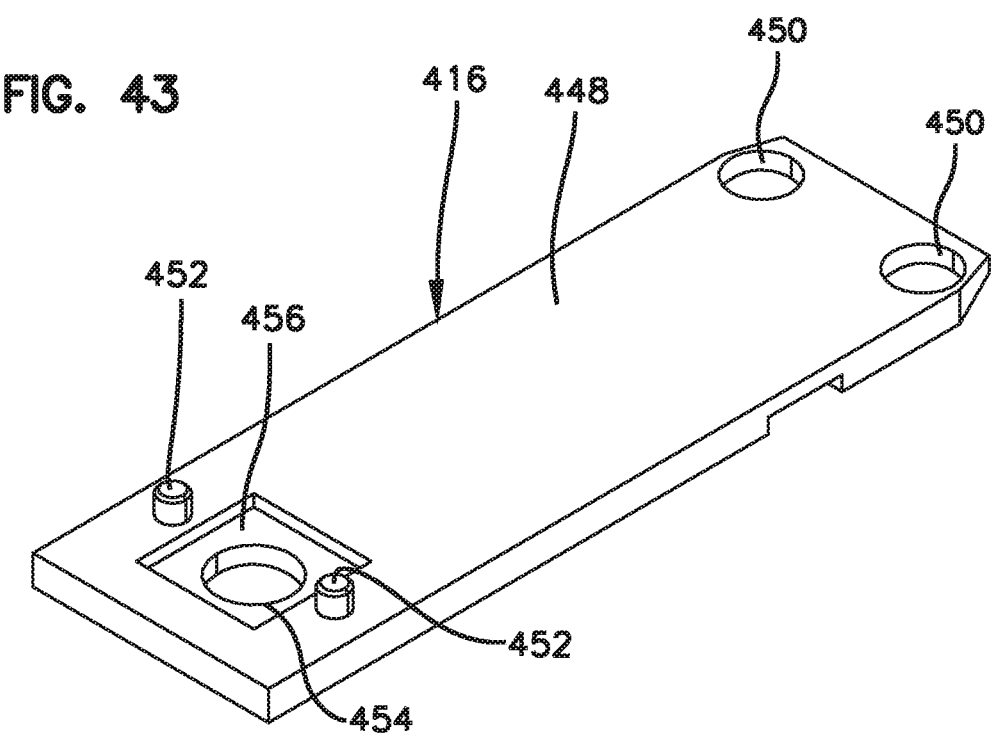
FIG. 43 is a perspective view showing a first side of a full cover piece used in one of the fiber optic subassemblies of FIG. 40.
Figure 44:
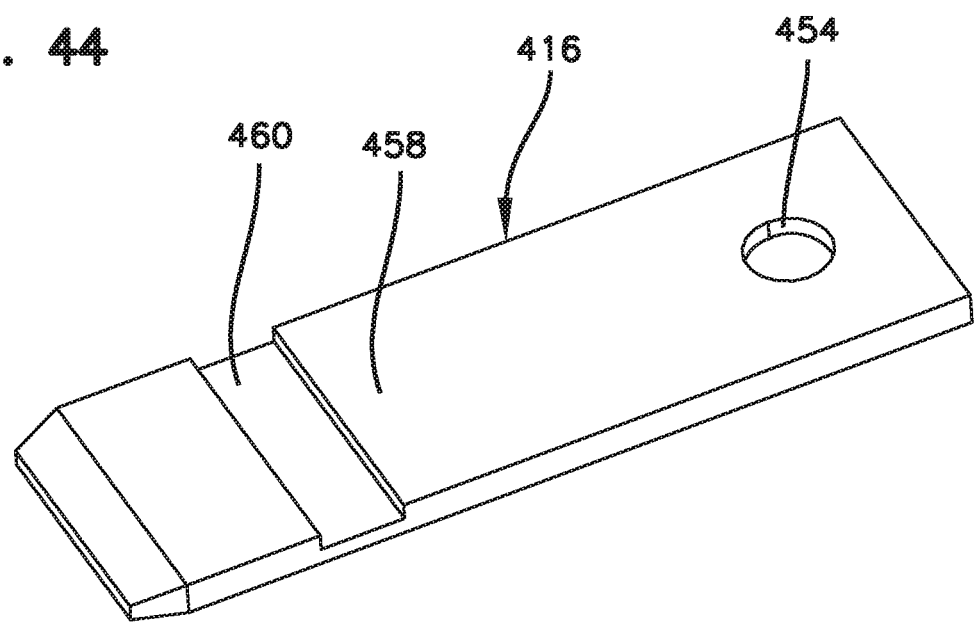
FIG. 44 is a perspective view showing a second side of the full cover piece of FIG. 43, the second side being opposite from the first side shown at FIG. 43.
Figure 45:
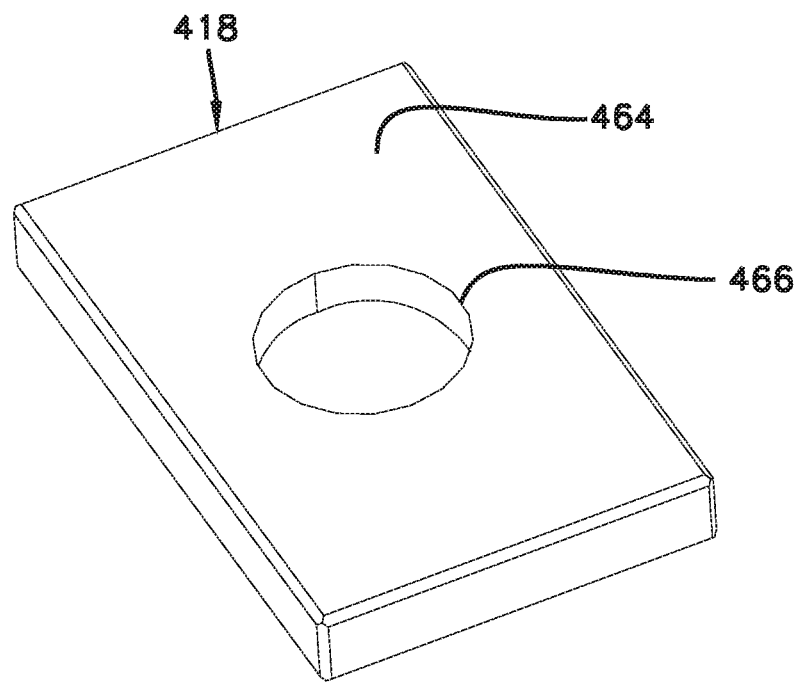
FIG. 45 is a perspective view showing a first side of a partial cover used by one of the fiber optic subassemblies of FIG. 40.
Figure 46:
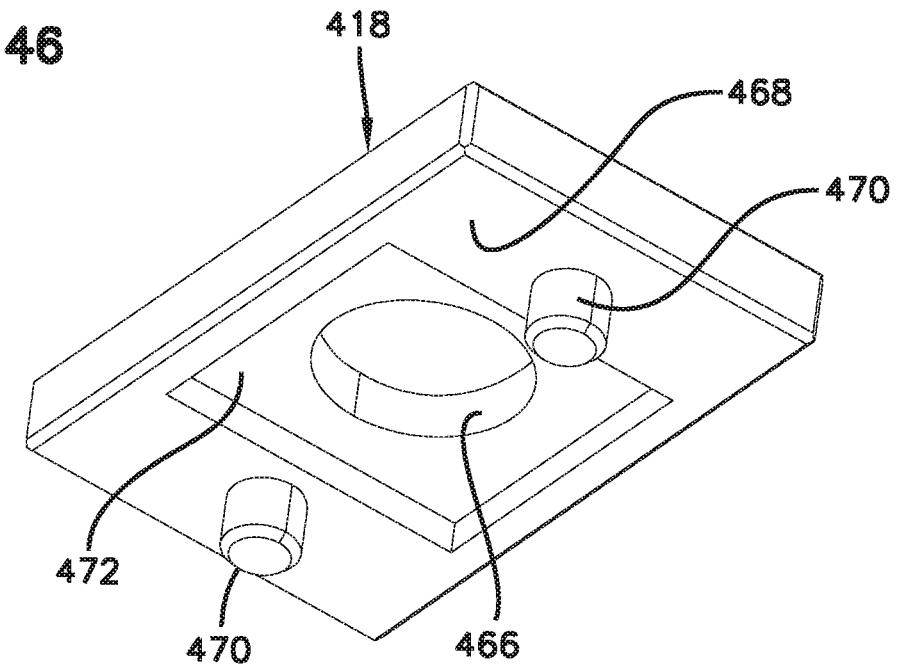
FIG. 46 is a perspective view showing a second side of the partial cover of FIG. 45, the second side being opposite from the first side shown at FIG. 45.
Figure 47:
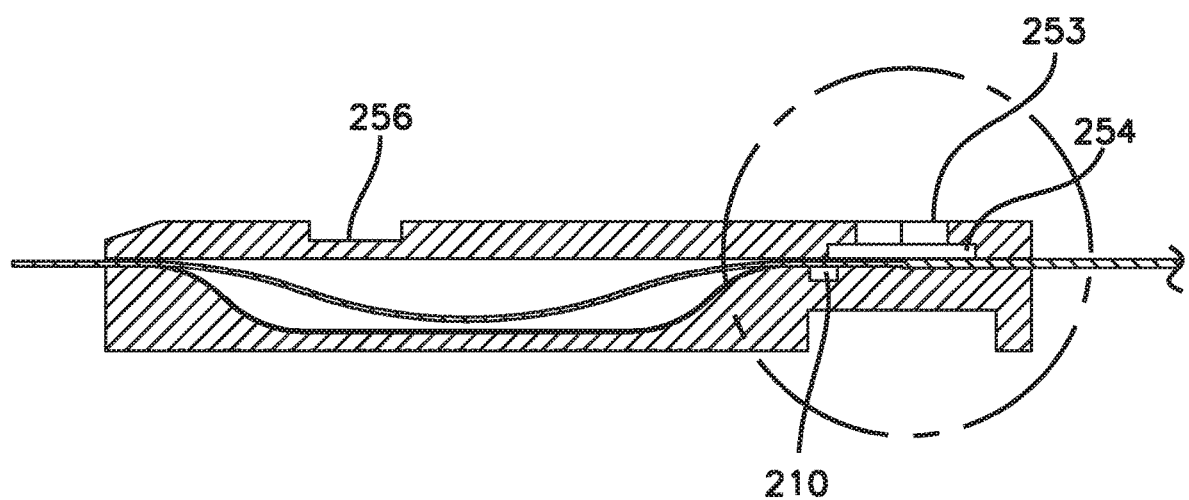
FIG. 47 is a cross-sectional view through one of the fiber optic subassemblies of FIG. 40.
Figure 48:
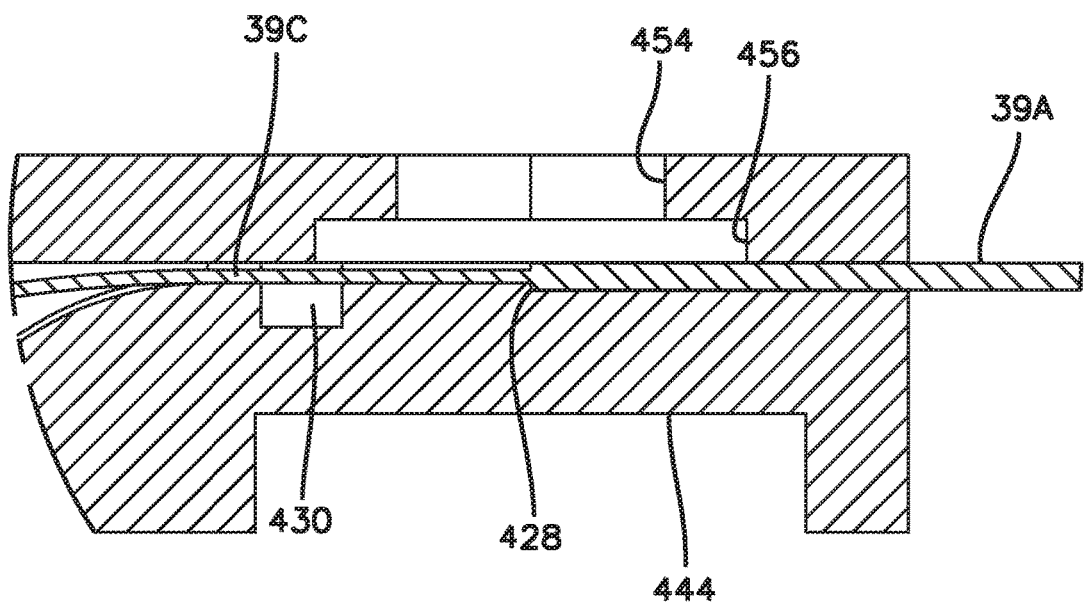
FIG. 48 is an enlarged view of a portion of FIG. 47 showing a fiber anchoring region and a capillary flow stop that are integrated as part of the fiber optic subassembly.
Figure 49:
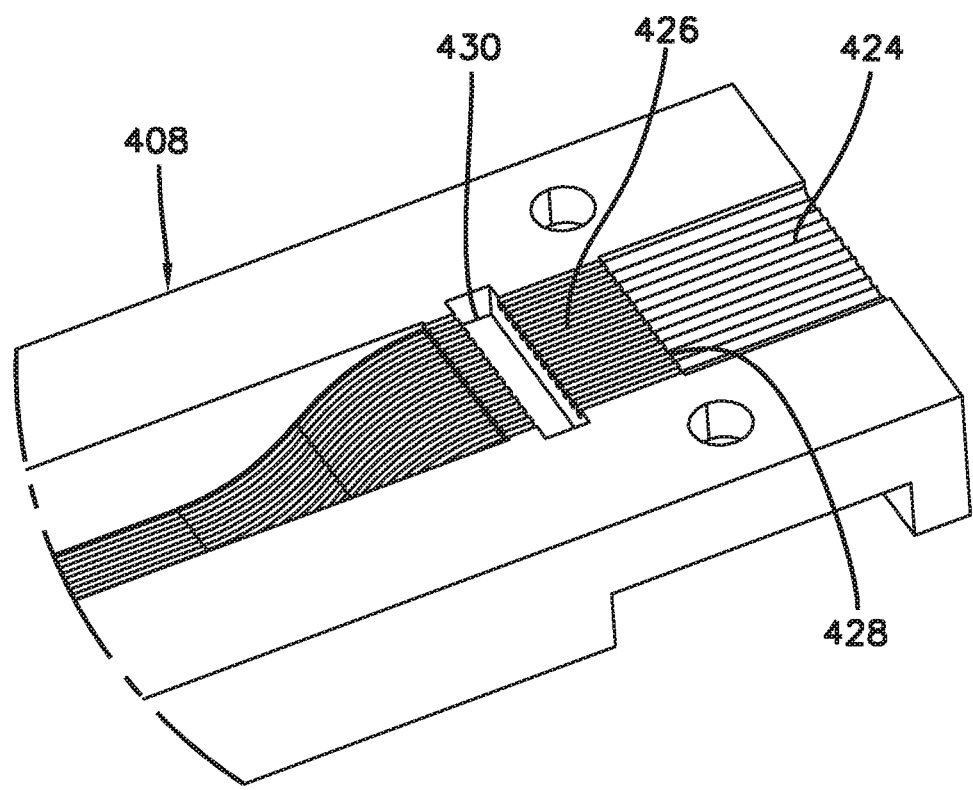
FIG. 49 is an enlarged perspective view of a portion of the fiber anchoring region and capillary flow stop of FIG. 48.
Figure 50:
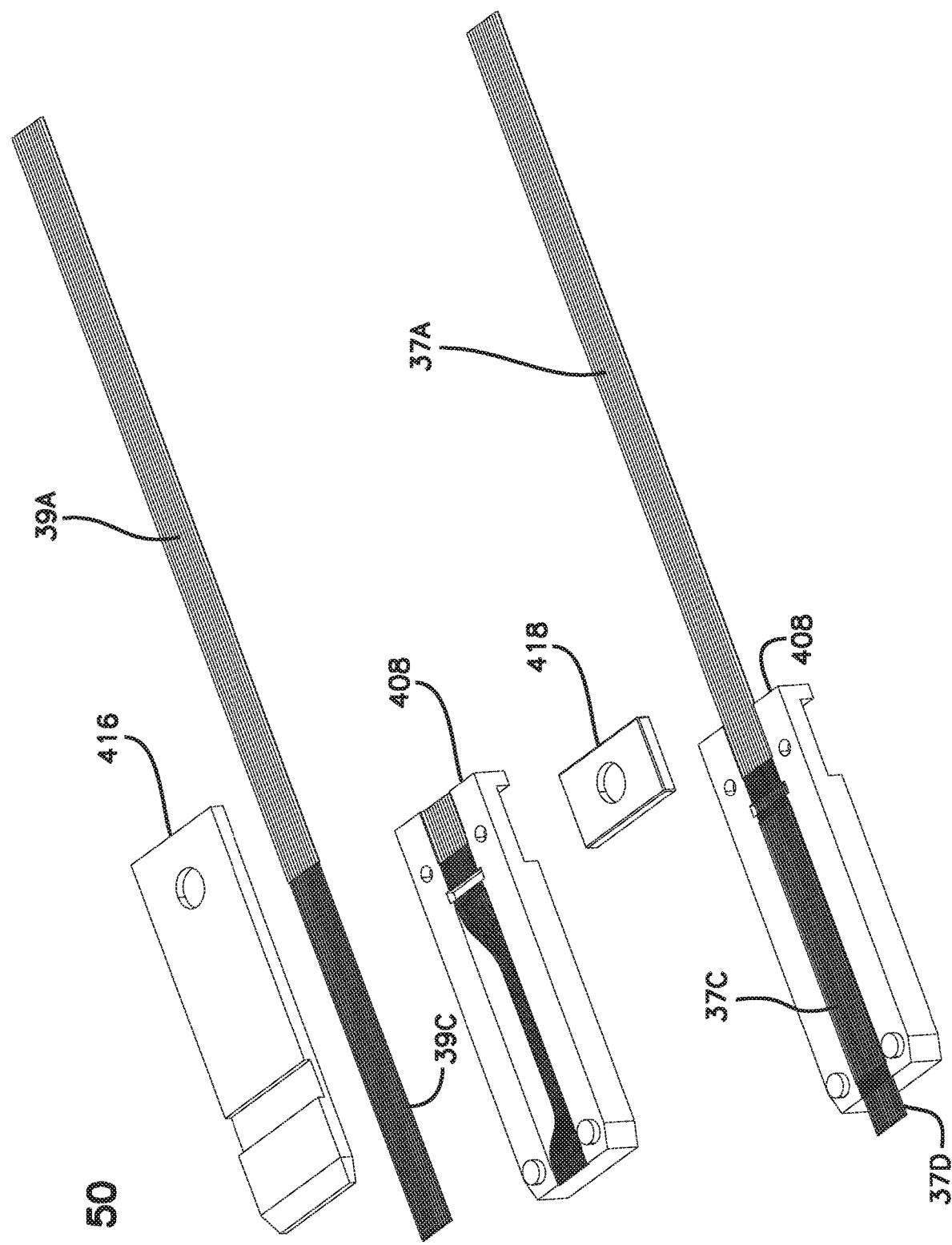
FIG. 50 shows a first assembly step for assembling the plurality of fiber optic subassemblies of FIG. 40 where an array (e.g., a row) of fibers are laid into a passage of the main module body of the lower-most fiber carrier module, the optical fibers include coated portions (e.g., portions protected within a ribbon matrix material or other coating) and a non-coated portion (e.g., portions having bare fibers having cores and claddings not covered by a coating layer)
Figure 51:
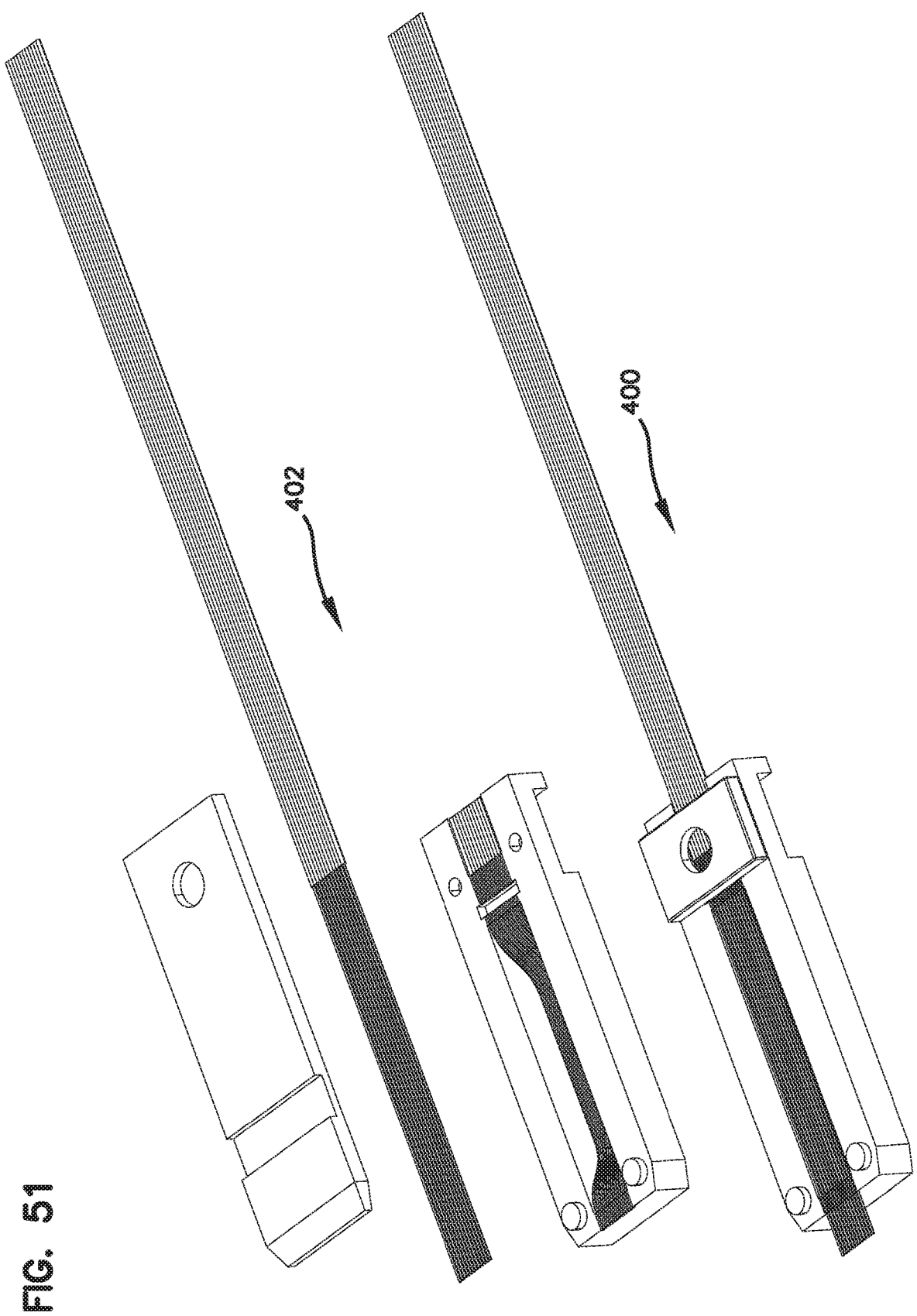
FIG. 51 shows an assembly step after the assembly step of FIG. 50 in which a partial cover is mounted at the fiber anchoring location of the lower-most fiber carrier module.
Figure 52:
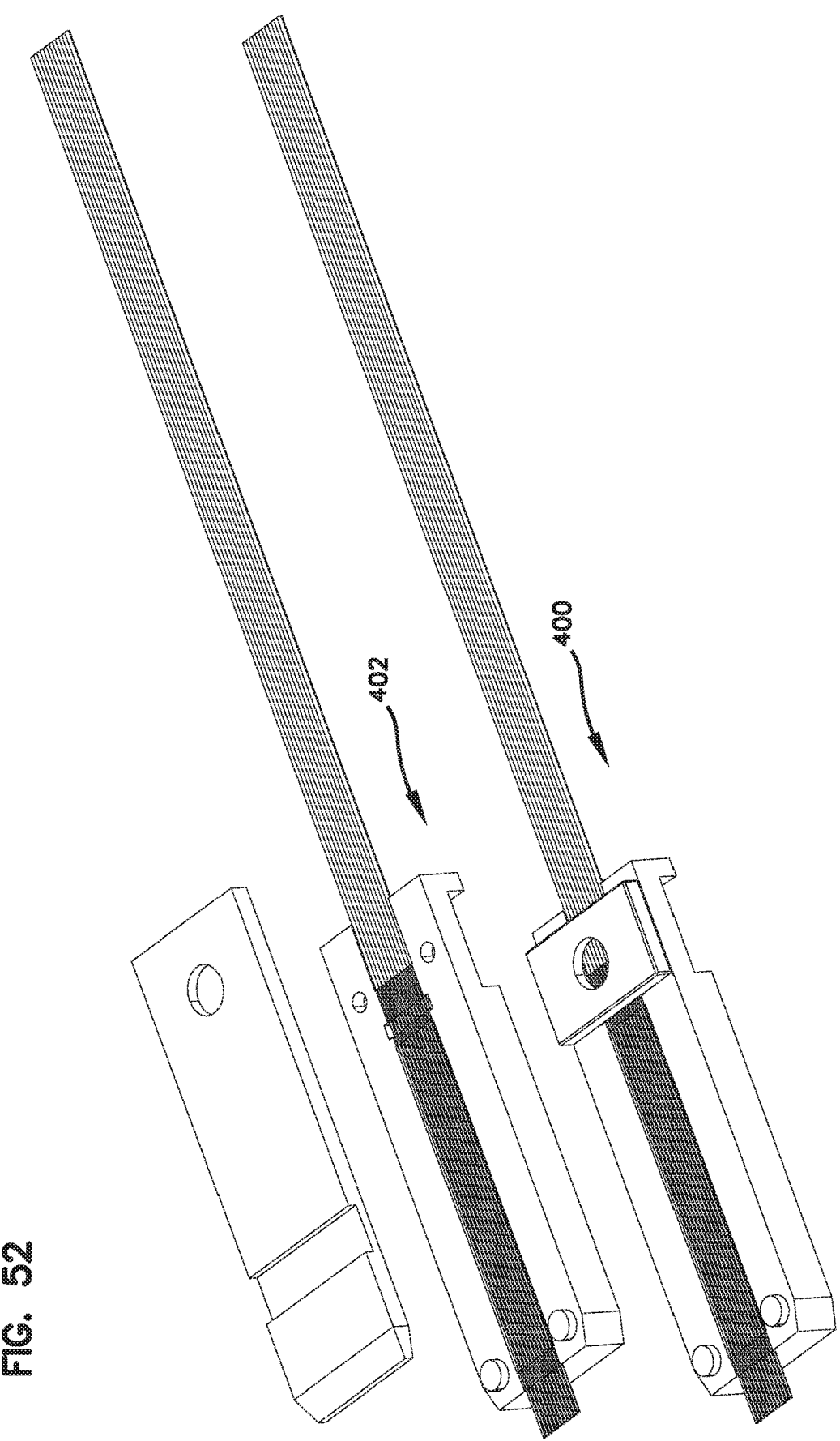
FIG. 52 shows another assembly step after the assembly step of FIG. 51 where an array of optical fibers are positioned within the fiber passage of the upper most fiber carrier module.
Figure 53:
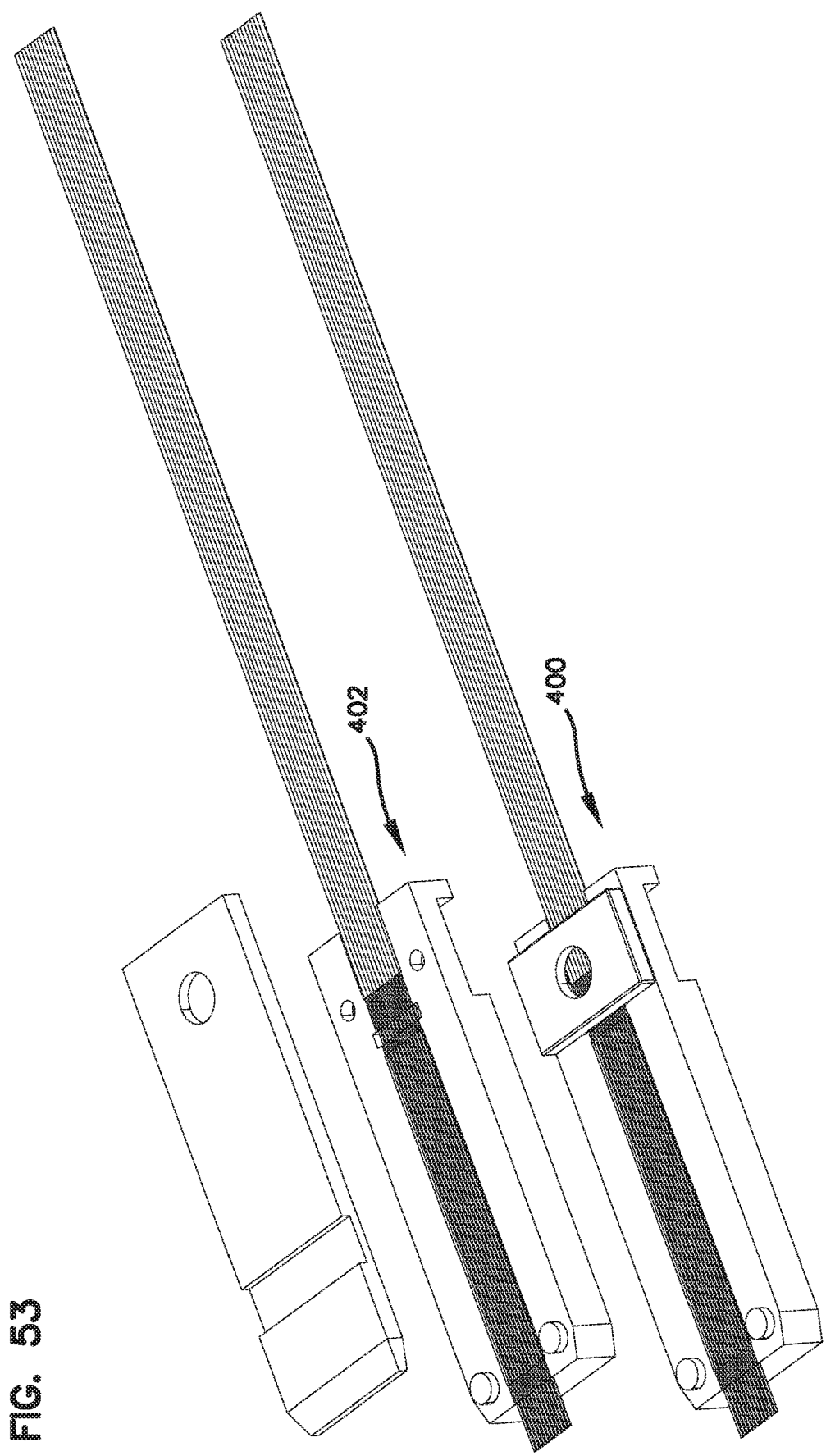
FIG. 53 shows an assembly step after the assembly step of FIG. 52 in which a full cover is mounted on the main module body of the upper fiber carrier module with the array of optical fibers captured between the full cover and the main module body.

As shown at FIG. 41, the first side 420 of the main module body 408 also includes alignment pins 438 adjacent the first end 412 and alignment openings 440 adjacent the anchoring location 422. As shown at FIG. 42, a second side 442 of the main module body 408 includes a cross-channel 444 coinciding with the fiber anchoring location 422 and alignment openings 446 coinciding (e.g., co-axially aligned) with the alignment pins 438. As shown at FIG. 43, the full cover 416 includes a first side 448 adapted to mate with the first side 420 of the main module body 408 of the second fiber optic subassembly 406. The first side 448 includes through-holes 450 for receiving the alignment pins 438 and alignment pins 452 that fit within the alignment openings 440 at the anchoring location 422. The cover 416 includes an adhesive injection port 454 for injecting adhesive into the anchoring location for locking the optical fibers in place at the anchoring location, and a recess or cavity 456 surrounding the port 454 for facilitating the flow of injected adhesive (e.g., epoxy) within through-out the entire anchoring location so that all the optical fibers in the passage 410 are bonded at the anchoring location 422. As shown at FIG. 44, the cover 416 includes an opposite second side 458 through which the injection port 454 extends. The second side 458 also includes a cross-channel 460 for interlocking with a latch 462 (e.g., an internal snap-fit latch) of the connector housing 22 when the stacked first and second fiber carrier modules 400, 402 are loaded into the back end to the connector housing 22. FIG. 5 shows the stack loaded in the connector housing 22 with the latch 462 depicted interlocked with the cross-channel 460. FIG. 45 shows a first side 464 of the partial cover 418. The partial cover 418 defines an adhesive injection port 466 that extends through the cover 418 from the first side 464 to a second side 468 (see FIG. 46). The second side 468 is configured to mate with the first side 420 of the main module body 408 of the first fiber optic subassembly at the fiber anchoring location 422. The second side 468 includes alignment pins 470 that fit within the alignment openings 440 of the main module body 408 and a recessed adhesive flow cavity 472 surrounding the adhesive injection port 466. When the assembled first and second fiber optic subassemblies 404, 406 are assembled and mated together the first side 420 of the main module body 408 of the first fiber optic subassembly 404 mates with the second side 442 of the main module body 408 of the second fiber optic subassembly 406. As such, the partial cover 418 of the first fiber optic subassembly 404 fits within the cross-channel 444 of the main module body 408 of the second fiber optic subassembly 406. Additionally, the alignment pins 438 of the main module body 408 of the first fiber optic subassembly 404 mate with the alignment openings 446 of the main module body 408 of the second fiber optic subassembly 406. Steps for assembling the first and second fiber optic subassemblies 404, 406 are shown at FIGS. 50-54.

The optical fibers are preferably anchored or fixed relative to the first and second fiber carrier modules 400, 402 adjacent second ends of the first and second fiber carrier modules 400, 402. The fibers can be anchored mechanically by crimping, clamping or other means. However, it is preferred for the optical fibers to be axially fixed relative to the first and second fiber carrier modules 400, 402 using an adhesive such as epoxy at the anchoring location. Between the anchoring locations and the first ends of the first and second fiber carrier modules 400, 402, it is preferred for the optical fibers to not be axially fixed relative to the first and second fiber carrier modules 400, 402. Thus, in these regions, the optical fibers can slide axially relative to the first and second fiber carrier modules 400, 402. As described above, the first and second fiber carrier modules 400, 402 can include internal fiber buckling zones for allowing excess fibers to be taken up within the fiber carrier modules as the optical fibers are pushed back in a direction from the first end to the second end of the fiber carrier modules.

In certain examples, the stack of first and second fiber carrier modules 400, 402 can be secured within the connector housing 22. When secured within the connector housing 22, the non-ferrulized end portions 37D, 39D can be received in the bare fiber alignment features 69 of the a non-ferrulized fiber alignment structure 71 provided within the connector housing 22. The non-ferrulized fiber alignment structure 71 can include structures for aligning optical fibers such as grooves (e.g., V grooves, precisely shaped bores, or other structures. Example non-ferrulized fiber alignment structures (e.g., bare fiber alignment structures) are disclosed by U.S. Pat. No. 9,759,869; and U.S. Provisional Patent Application Ser. Nos. 62/536,769 and 62/565,323 which are hereby incorporated by reference in their entireties. It will be appreciated that the stack of first and second fiber carrier modules 400, 402 can be loaded into and retained within the connector housing 22 such that the non-ferrulized end portions 37D, 39D are received within corresponding fiber alignment features defined by the non-ferrulized fiber alignment structure 71. In certain examples, mechanical latches, fasteners or adhesive can be used to secure the stack of first and second fiber carrier modules 400, 402 within the connector housing 22. In a preferred example, a snap-fit interface is used to retain the stack of first and second fiber carrier modules 400, 402 within the connector housing 22.

Referring to FIG. 5, the non-ferrulized end portions 37D, 39D are shown inserted within the non-ferrulized fiber alignment structure 71. The fiber buckling regions 432 are shown provided between the first ends 412 of the first and second fiber carrier modules 400, 402 and their corresponding fiber anchoring portions. Capillary flow stops 430 are provided between the anchoring regions and the fiber buckling regions.

FIGS. 55-60 show an example male, multi-fiber, ferruleless fiber optic connector 500 in accordance with the principles of the present disclosure. The fiber optic connector includes a connector body 502, a rear cable anchor 504 secured to a rear of the connector body 502, fiber optic subassemblies 506, 508 managing sets of optical fibers 510, 512 corresponding to the connector 500 and a retractable nose piece 514. The subassemblies 506, 508 include stacked fiber carrier modules 515, 516 that have rear ends secured in the connector body 502. The fibers 510, 512 include non-ferrulized end portions 510', 512' that project from forward ends of the modules 515, 516. The nose piece 514 is mounted on front ends of the modules 515, 516. The nose piece 514 is moveable between an extend position where the end portions 510', 512' are covered by the nose piece 514 and a retracted position wherein the end portions 510', 512' are exposed. A spring 550 biases the nose piece 514 to the extended position. The modules 515, 516 are snapped together in the stack. The modules 515, 516 do not include fiber buckling regions, but optionally could. The modules 515, 516 include fiber anchoring regions and non-ferrulized fiber locating regions that can have the same configurations as those previously described herein. FIGS. 61-64 show a sequence for assembling the subassemblies 506, 508.

The fiber optic connector 500 is adapted to be inserted in the connector port 30 of the female fiber optic connector 20. During insertion, the nose piece retracts to expose the non-ferrulized end portions 510', 512'. The end portions 510' and 512' are received in the bare fiber alignment features 69 of the fiber alignment structure 71 and are co-axially aligned and optically coupled with the fiber ends 37D, 39D of the female fiber optic connector 20. In certain examples, the end portions 510', 512' abut the fiber ends 37D, 39D within the alignment features 69 causing the fibers 37C, 39C to buckle within the buckling regions of the female fiber optic connector.

Figure 65:
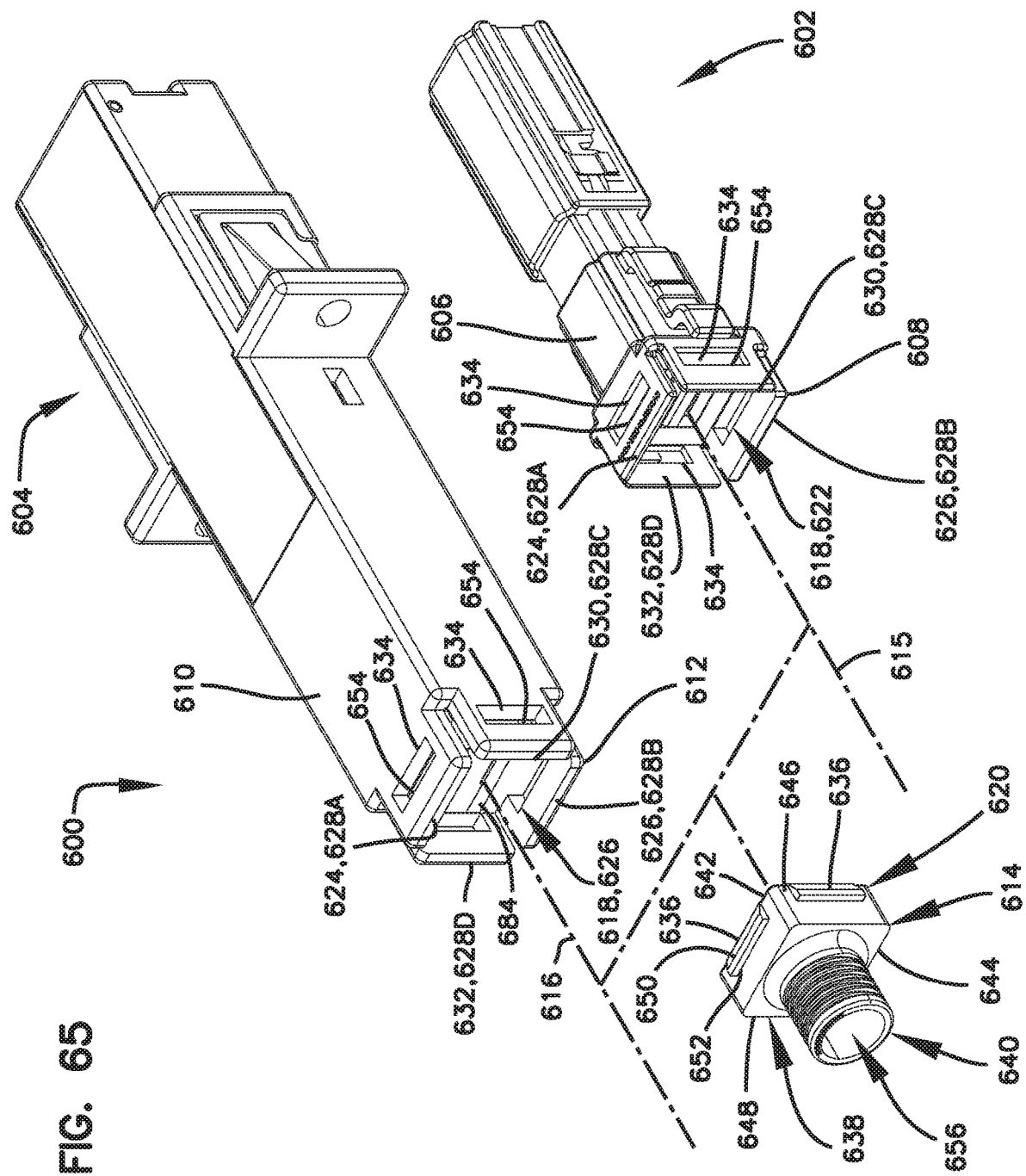
FIG. 65 depicts a fiber optic connector system in accordance with the principles of the present disclosure.

FIG. 65 depicts a fiber optic connector system 600 (e.g., a fiber optic connector product line or family of fiber optic connectors) in accordance with the principles of the present disclosure. The fiber optic connector system 600 includes a first fiber optic connector 602 of a first type (e.g., a male fiber optic connector) and a second fiber optic connector 604 of a second type (e.g., a female fiber optic connector). In certain examples, the fiber optic connector system can include more than two types of fiber optic connectors (e.g., three, four, five, six or more different types of fiber optic connectors). The first fiber optic connector 602 includes a first connector body 606 having a rear end 608 and the second fiber optic connector 604 includes a second connector body 610 having a rear end 612. The fiber optic connector system 600 also includes a rear connector piece 614 configured to be anchored to a fiber optic cable. The rear connector piece 614 is compatible and interconnectable with the rear ends 608, 612 of both the first and second connector bodies 606, 610. In a preferred example, the rear connector piece is compatible and interconnectable with the rear ends of all the different styles or types of connector bodies that are part of the fiber optic connector system.

In the depicted example, the rear connector piece 614 and the rear end 608 of the first connector body 606 are coupled together by a snap-fit connection when interconnected. Similarly, the rear connector piece 614 and the rear end 612 of the second connector body 610 are coupled together by a snap-fit connection when interconnected. In certain examples, the snap-fit connection can be made by linear translational movement between the components desired to be interconnected along an insertion axis. In certain examples, the insertion axis can be oriented along the lengths of the connector bodies 606, 610. As depicted at FIG. 65, the rear connector piece 614 is inserted along insertion axis 615 to snap the rear connector piece 614 into the rear end 608 of the first connector body 606 and the rear connector piece 614 is moved along the insertion axis 616 to snap the rear connector piece 614 into the rear end 612 of the second connector body 610.

It will be appreciated that the rear ends 608, 612 of the first and second connector bodies 606, 610 include first connection interfaces each having a first interconnect configuration 618. The rear connector piece 614 includes a second connection interface having a second interconnect configuration 620 configured to interlock with the first interconnect configuration 618. In certain examples, first and second interconnect configurations 618, 620 interlock via a snap-fit connection.

In certain examples, the first and second interconnect configurations 618, 620 include at least three receptacles and at least three tabs configured to fit within the at least three receptacles. In certain examples, one of the first and second interconnect configurations 618, 620 includes at least three receptacles and the other of the first and second interconnect configurations 618, 620 includes at least three tabs. In certain examples, during the interconnect process, at least portions of the first interconnect configuration 618 and/or the second interconnect configuration 620 elastically deform or flex during the insertion process and then snap back to a retention configuration once the insertion process has been completed. Thus, in certain examples, the first interconnect configuration 618 and/or the second interconnect configuration 620 snap into the interlocked state via the inherent elasticity of the components themselves. In certain examples, the first interconnect configuration 618 and/or the second interconnect configuration 620 can include insertion engagement surfaces that are angled relative to the insertion axis 615, 616 to allow the portions of the first interconnect configuration 618 and/or the second interconnect configuration 620 to flex during the insertion process without requiring a relatively high insertion force. In certain examples, the angled surfaces can be provided on retention tabs. In certain examples, the first and second interconnect configurations 618, 620 can also include retention surfaces that oppose each other when the first and second interconnect configurations 618, 620 are snapped together. In certain examples, the retention surfaces can be oriented perpendicular or nearly perpendicular relative to the insertion axis 615, 616. In this regard, opposition between the retention surfaces provides relatively high retention forces that are significantly higher than the insertion forces required to interconnect the first and second interconnect configurations 618, 620. In certain examples, the first interconnect configuration 618 and the second interconnect configuration 620 can have a multi-sided form factor (e.g., a triangular form factor, a rectangular form factor, a pentagonal form factor, a hexagonal form factor, etc.) or a circular form factor.

Referring to FIG. 65, each of the first interconnect configurations 618 includes a socket 622 having a first rectangular form factor including first and second opposing sides 624, 626 defined by a first and second opposing cantilever latches 628A, 628B, and also including third and fourth opposing sides 630, 632 defined by third and fourth opposing flexible cantilever latches 628C, 628D. Each of the cantilever latches 628A-628D defines an opening 634 for receiving a corresponding snap-fit tab 636 of the rear connector piece 614 when the first and second interconnect configurations 618, 620 are snapped together.

Referring still to FIG. 65, the rear connector piece 614 includes a main body 638 and a cable anchoring stub 640 that projects in a rearward direction from the main body 638. The second interconnect configuration 620 is defined by the main body 638 and includes a second rectangular form factor adapted to mate with the first rectangular form factor of the first interconnect configuration 618. The second rectangular form factor includes first and second opposite sides 642, 644 including snap-fit tabs 636 configured to snap within the openings 634 defined by the first and second opposing cantilever latches 628A, 628B. The second rectangular form factor also includes third and fourth opposite sides 646, 648 including snap-fit tabs 636 configured to snap within the openings 634 defined by the third and fourth opposing flexible cantilever latches 628C, 628D.

Each of the snap-fit tabs 636 includes an insertion engagement surface 650 that is oriented at an acute angle relative to the insertion axis 615, 616, and a retention engagement surface 652 that is perpendicular or generally perpendicular relative to the insertion axis 615, 616. The second interconnect configuration 620 is received within the first interconnect configuration 618 using a linear insertion process. During the linear insertion process, relative movement is generated between the first and second interconnect configurations 618, 620 along the respective insertion axis 615, 616. As the second interconnect configuration 620 is received within the first interconnect configuration 618 during the insertion process, the insertion engagement surfaces 650 of the snap-fit tabs 636 engage the cantilever latches 628A-628D causing the cantilever latches 628A-628D to flex outwardly. The insertion process continues until the snap-fit tabs 636 align with the openings 634 and the retention engagement surfaces 652 move past corresponding retention surfaces 654 defining the openings 634. Once the snap-fit tabs 636 align with the openings 634, the cantilever latches 628A-628D are no longer flexed outwardly by the snap-fit tabs 636 and are permitted to return (e.g., snap) inwardly toward their non-flexed position via the inherent elasticity of the flexed cantilever latches 628A-628D. When the cantilever latches 628A-628D snap back toward their non-flexed orientation, the snap-fit tabs 636 are captured within the openings 634 and the retention surfaces 652 of the snap-fit tabs 636 oppose the retention surfaces 654 to prevent the rear connector piece 614 from being withdrawn from the corresponding connector body to which the rear connector piece 614 has been connected.

It will be appreciated that the rear connector piece 614 is adapted for connection to a fiber optic cable. In certain examples, the fiber optic cable can have strength members that are secured or anchored to the rear connector piece 614. In certain examples, the fiber optic cable can include string or strand-like tensile reinforcing members which are typically made of a material such as Aramid yarn, fiberglass yarns or like materials. In certain examples, such tensile strength members or layers can be secured to the rear connector piece 614 by mechanically crimping the strength members to the exterior of the cable anchoring stub 640. In certain examples, the cable anchoring stub 640 can include ribs, protrusions, knurling or other surface discontinuities to assist in securing the strength members to the exterior of the cable anchoring stub 640. In certain examples, the rear connector piece 614 can include a fiber passage 656 for allowing optical fibers of the fiber optic cable to be routed through the rear connector piece 614 and into the corresponding connector body 606, 610 to which the rear connector piece 614 has been coupled. It will be appreciated that the optical fibers can be loose optical fibers or ribbonized optical fibers. In certain examples, optical fibers may be enclosed within a buffer tube or other structure that is routed through the fiber passage 656. In certain examples, a flexible boot or other structure for providing bend radius protection can be mounted over the cable anchoring stub 640 and over the cable. In other examples, heat-shrink sleeves or other shape memory elements that may include internal adhesive may be used to provide securement and sealing between the rear connector piece 614 and the cable.

It will be appreciated that the configuration/structural design of the rear connector piece can be varied depending upon the type of fiber optic cable to which the rear connector piece is desired to be anchored. In certain examples, mechanical crimps can be used to provide cable securement or anchoring. In other examples, adhesives such as epoxy can be used to secure strength members of a fiber optic cable to the rear connector piece. Example types of strength members in addition to the tensile reinforcing strands or strings described above can include metal reinforcing members and reinforcing rods that may be made of fiberglass reinforced polymer.

It will be appreciated that by using a common rear interface between the rear connector piece 614 and the various connectors of the connector family, the total number of different parts required for the overall family can be reduced. Additionally, it will be appreciated that it is desirable for different fiber optic connectors of the family to be compatible with different styles of fiber optic cables. The fiber optic cables can include newly developed cables and specialty cables. By using a common rear connection interface, it is only necessary to redesign the rear connector piece to make the entire connector family compatible with a given type of fiber optic cable.

It will be appreciated that the connector piece 614 can have different types of constructions. For example, the rear connector piece 614 can have a molded plastic construction. It will be appreciated that the molded plastic construction can be reinforced with metal reinforcement. In other examples, the rear connector piece can have an all metal construction such as a cast metal construction. It will be appreciated that the construction of the rear connector piece can be varied to satisfy different retention requirements.

Figure 66:
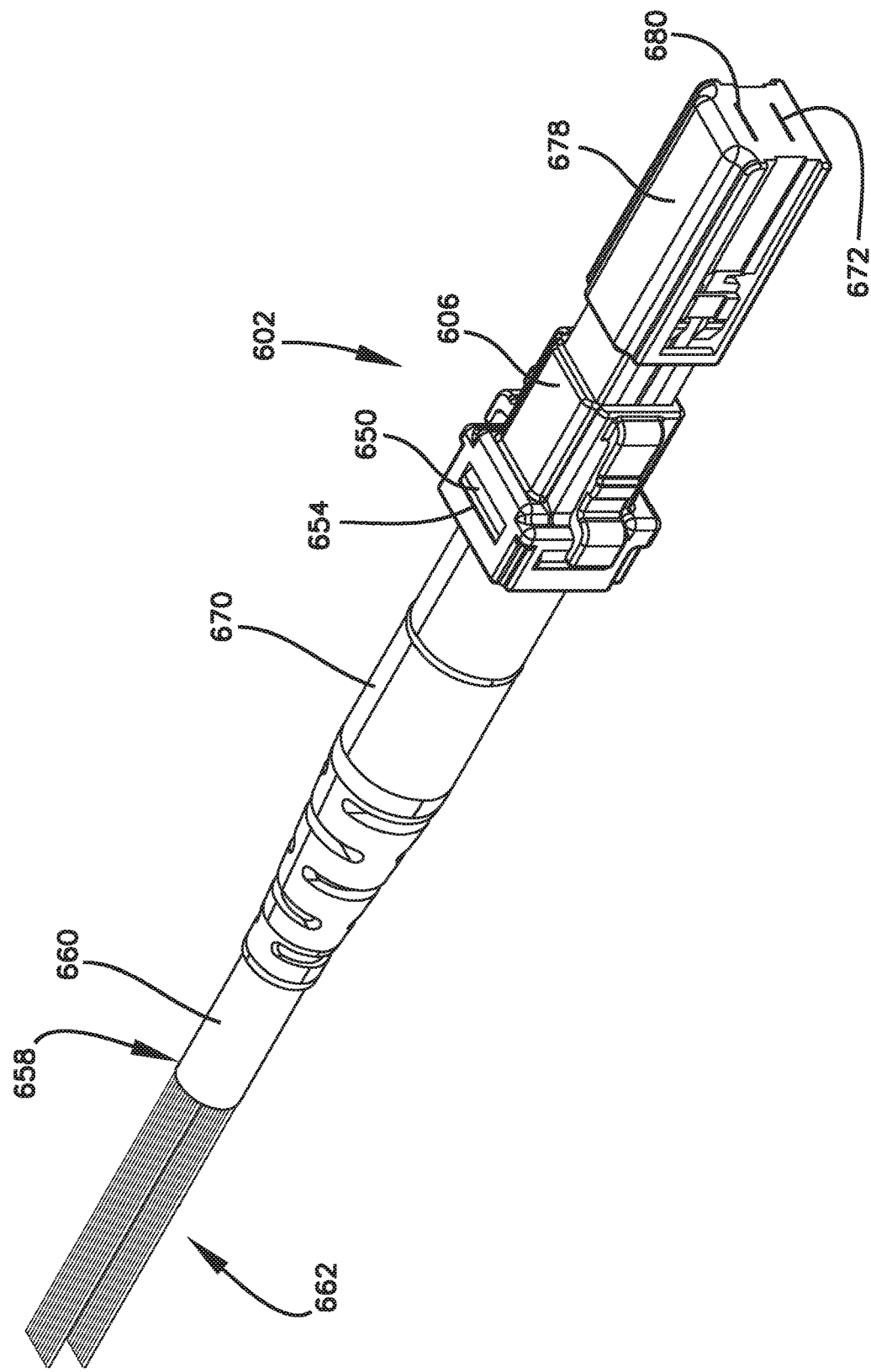
FIG. 66 is a perspective view showing a first fiber optic connector that is part of the fiber optic connector system of FIG. 65.
Figure 68:
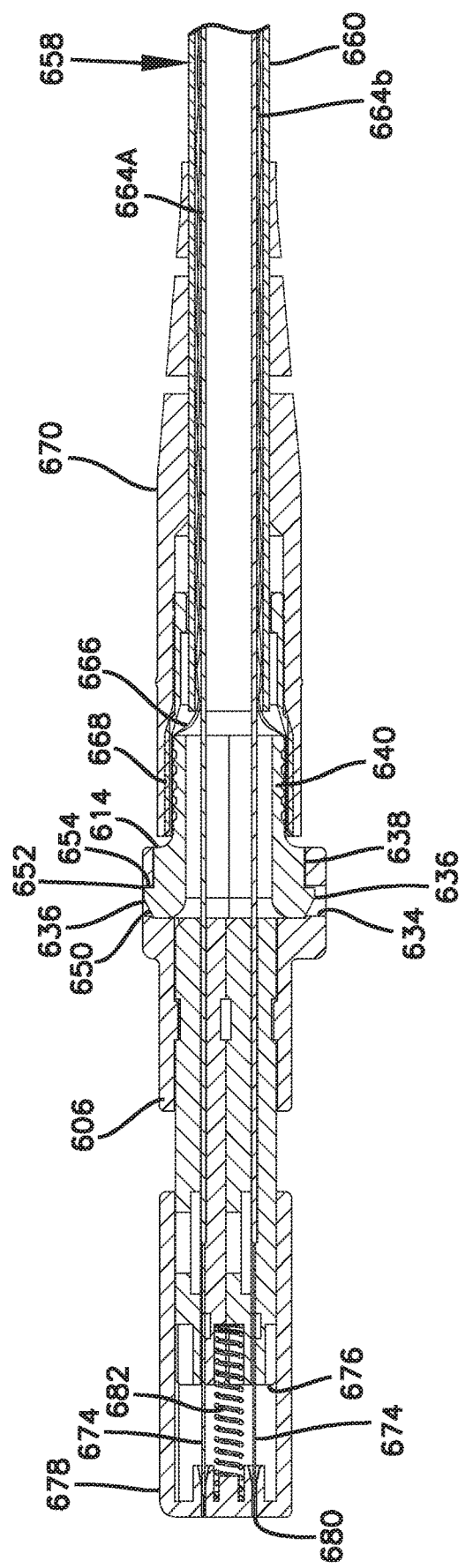
FIG. 68 is a cross sectional view taken lengthwise through the fiber optic connector of FIG. 66.
Figure 69:
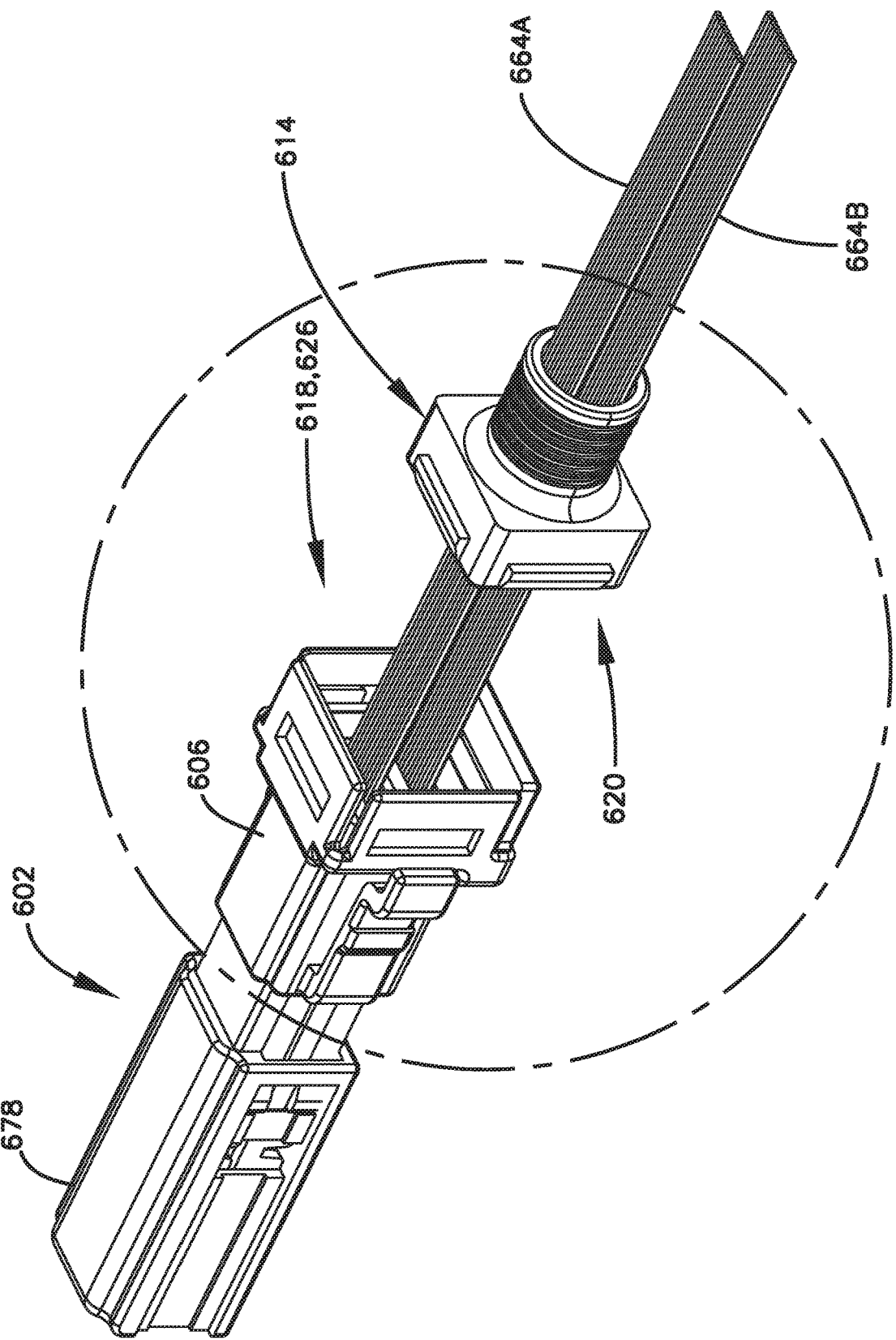
FIG. 69 is an exploded view showing a rear connection interface of the fiber optic connector of FIG. 66.
Figure 70:
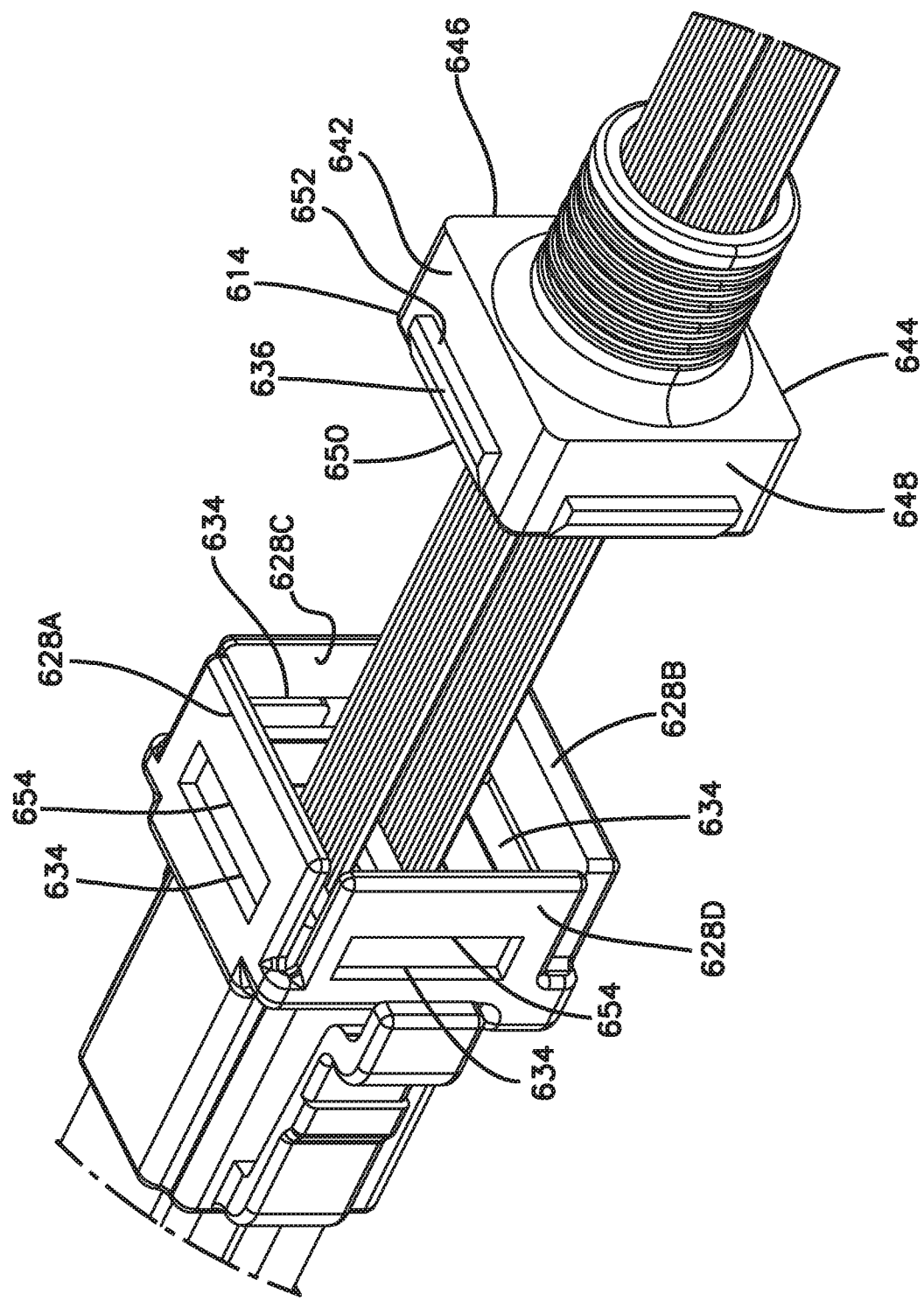
FIG. 70 is an enlarged view of the rear connection interface of FIG. 69.

FIG. 66 shows the first fiber optic connector 602 after the first connector body 606 has been interconnected with the rear connector piece 614. As shown at FIG. 66, a fiber optic cable 658 has been anchored to the rear connector piece 614. The fiber optic cable 658 includes a jacket 660 containing a plurality of optical fibers 662. The optical fibers 662 are ribbonized and are arranged in a first fiber ribbon 664A and a second fiber ribbon 664B. Each fiber ribbon 664A, 664B includes a plurality of optical fibers bonded together by a matrix material. In one example, each of the fiber ribbons 664A, 664B includes 12 optical fibers. As shown at FIG. 68, the optical fibers 662 are routed through the rear connector piece 614 and into the first connector body 606. The fiber optic cable 658 also includes strength members 666 (e.g., Aramid yarns) which are shown at FIG. 68 coupled to the cable anchoring stub 640 of the rear connector piece 614 by a crimp sleeve 668. The crimp sleeve 668 is also crimpled on the outer diameter of the cable jacket 660. A flexible boot 670 is mounted over the crimped sleeve 668 and serves to provide bend radius protection to the fiber optic cable 658 at the interface between the fiber optic cable and the rear connector piece 614.

Figure 67:
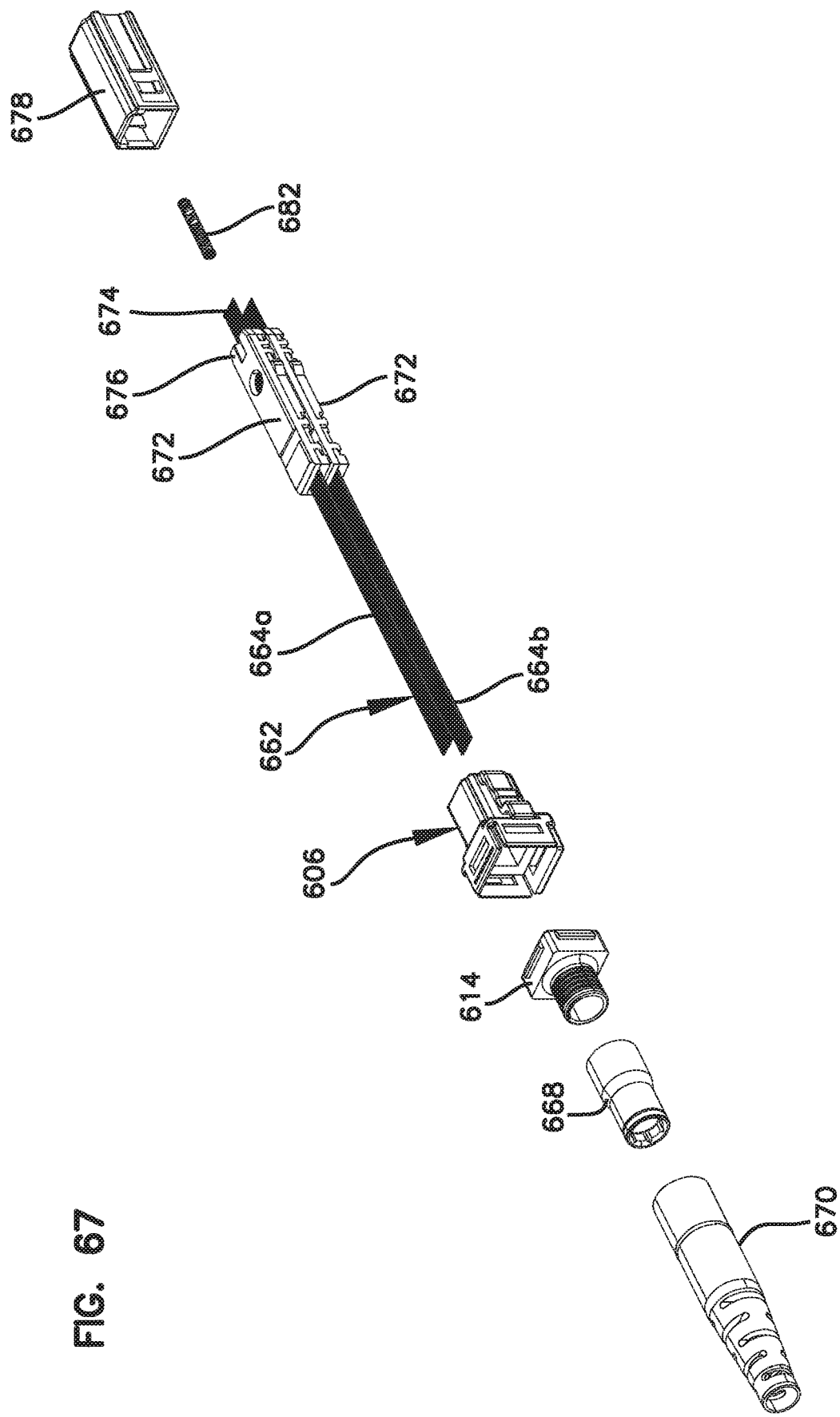
FIG. 67 is an exploded view of the fiber optic connector of FIG. 66.

It will be appreciated that the first fiber optic connector 602 is a male fiber optic connector. As depicted at FIGS. 66-71, the first fiber optic connector 602 is a multi-fiber fiber optic connector. As depicted at FIGS. 66-71, the first fiber optic connector 602 is a ferrule-less fiber optic connector. As shown at FIGS. 67 and 68, the first connector body 606 is configured to interlock with the rear connector piece 614 and is also configured to interlock with a plurality of fiber carrier modules 672. Each of the fiber ribbons 664A, 664B of the fiber optic cable 658 are routed through the rear connector piece 614 and also through one of the fiber carrier modules 672. In certain examples, end portions of the fiber ribbons 664A and 664B can be stripped of their matrix material and/or other coatings such that bare fibers are provided within the fiber carrier modules 672. The bare fibers can include end portions 674 that project beyond from distal ends 676 of the fiber carrier modules 672. The fiber carrier modules 672 can be secured within the first connector body 606. For example, the fiber carrier modules 672 can be stacked together and then snapped within the interior of the first connector body 654. In other examples, the fiber carrier modules 672 can be adhesively fixed within the first connector body 606.

The first fiber optic connector 602 also includes a nose piece 678 slidably mounted at the distal ends 676 of the fiber carrier modules 672. It will be appreciated that the nose piece 678 can include a plurality of openings 680 (see FIG. 66) for receiving the bare fiber end portions 674. In certain examples, the openings 680 can be arranged in rows corresponding to the fiber ribbons 664A, 664B. It will be appreciated that the nose piece 678 can be moved relative to the fiber carrier modules 672 between a retracted position where the bare fiber end portions 674 project outwardly beyond an end wall of the nose piece 678, and in an extended position where the bare fiber end portions 674 are protected within the interior of the nose piece 678. A spring 682 biases the nose piece towards the extended position.

Figure 71:
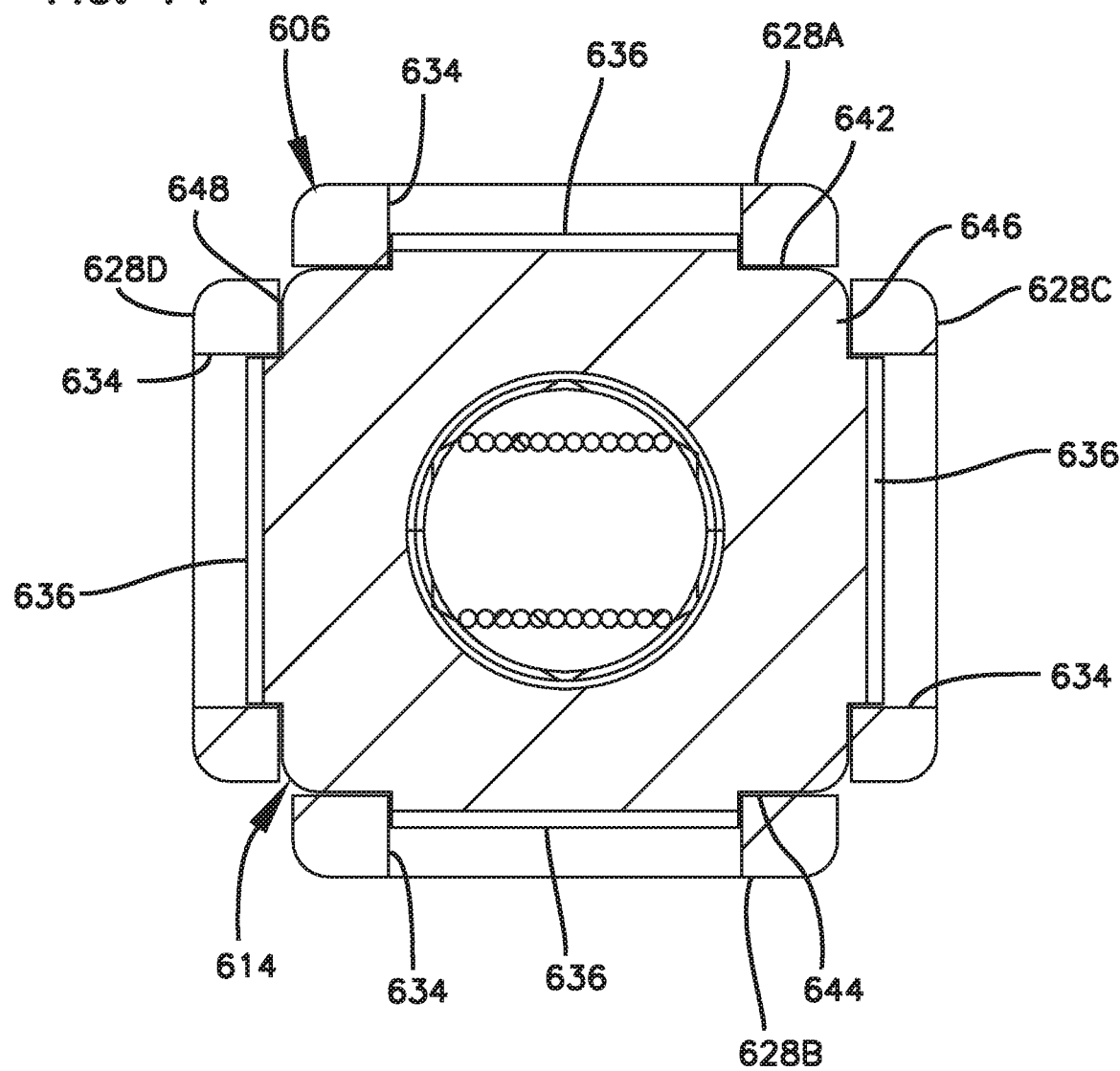
FIG. 71 is a cross sectional view taken along section line 71-71 of FIG. 66.

FIG. 71 is a cross sectional view through the first fiber optic connector 602 showing the mated relationship of the first and second interconnect configurations 618, 620. As shown at FIG. 71, all four of the snap-fit tabs 636 of the second interconnect configuration 620 have been snapped within their corresponding openings 634 defined by the cantilever latches 628A-628D of the first interconnect configuration 618.

Figure 72:
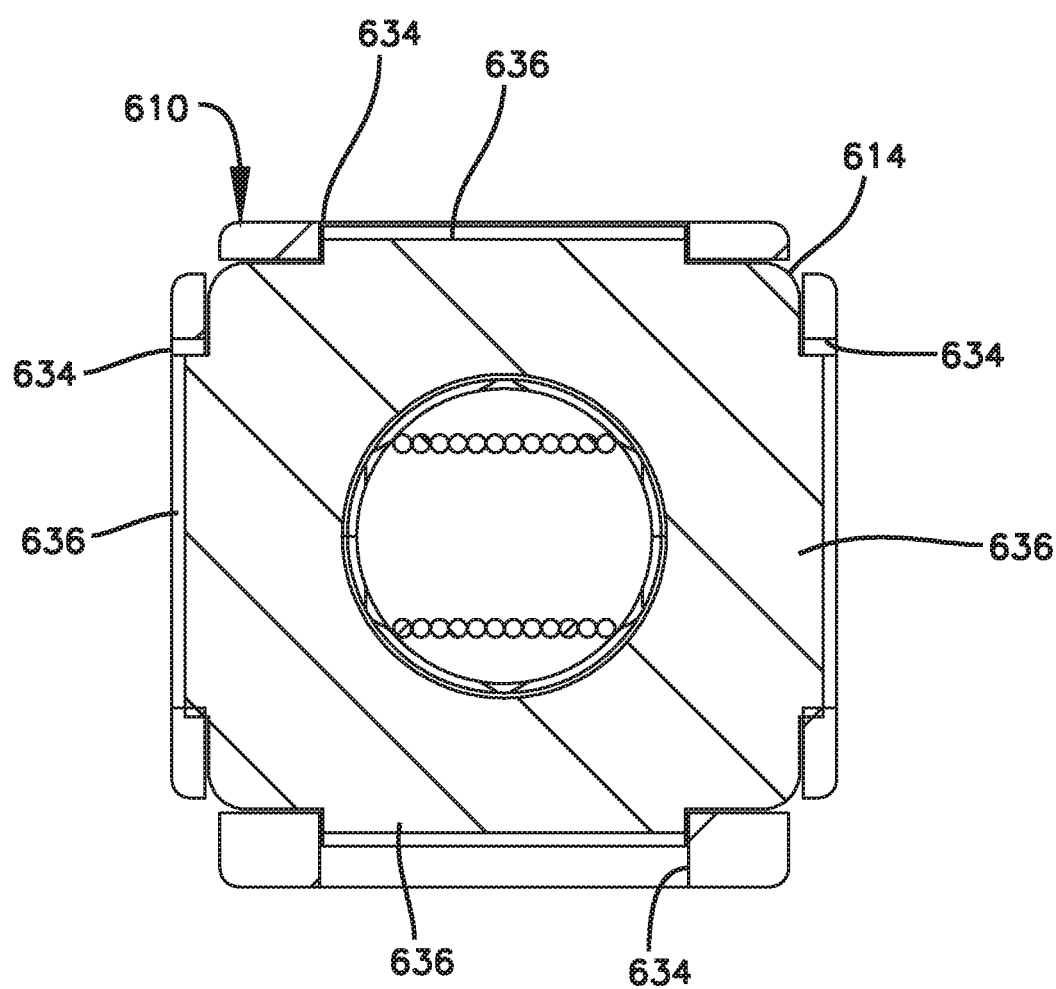
FIG. 72 is a cross sectional view taken along section line 72-72 of FIG. 1.

The second fiber optic connector 604 with the second connector body 610 can be coupled to the rear connector piece 614 through a coupling interface provided by the mated first and second interconnect configurations 618, 620 as depicted in FIGS. 1-5. The second fiber optic connector 604 is depicted as a female fiber optic connector. In the depicted example, the second fiber optic connector 604 is a multi-fiber fiber optic connector adapted to mate with the first fiber optic connector 602. The second connector body 610 of the second fiber optic connector 604 defines a connector port 684 (see FIG. 65) for receiving the first fiber optic connector 602. The second connector body 610 includes a connector housing in which the bare fiber alignment structure 71 is positioned. When the first fiber optic connector 602 is inserted into the connector port 684, the nose piece 678 moves from the extended position to the retracted position, and the bare fiber end portions 674 fit within corresponding alignment structures 71 (e.g., bores, grooves or like structures) for aligning the bare fiber end portions 674 of the fiber ribbon 664A, 664B with corresponding bare fiber end portions 674 of fiber optic cable anchored to the second fiber optic connector 604. It will be appreciated that the fiber optic cable can have the same configuration as the fiber optic cable 662 and can have strength members 666 secured to the cable anchoring stub 640 of the rear connector piece 614 by the crimp sleeve 668. It will be appreciated that the rear connector piece 614 can be secured to the second connector body 610 by an interlock between the first and second interconnect configurations 618, 620. As shown at FIG. 72, the snap-fit tabs 636 of the second interconnect configuration 620 are snapped within the corresponding openings 634 defined by the cantilever latches 628A-628D of the second connector body 610.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A fiber optic connector comprising:
   a plurality of fiber optic subassemblies each including a fiber carrier module supporting a plurality of optical fibers, the fiber carrier modules being coupled together in a stacked arrangement, each of the fiber carrier modules including a first end and an opposite second end, each of the fiber carrier modules defining a fiber passage that extends from the second end to the first end, the plurality of optical fibers extending through the fiber passage and including non-ferrulized portions that project outwardly from first ends of the fiber carrier modules, the plurality of fiber optic subassemblies also including fiber anchoring locations where the plurality of optical fibers are anchored relative to the fiber carrier modules; and
   a nose piece that mounts over front ends of the fiber carrier modules, the nose piece being slidable relative to the fiber carrier modules between an extended position where the non-ferrulized portions are protected and housed within the nose piece and a retracted position where the non-ferrulized portions extend through openings defined in the nose piece and are therefore exposed.

2. The fiber optic connector of claim 1, wherein the fiber carrier modules include mating interfaces for retaining the fiber carrier modules in the stacked arrangement.

3. The fiber optic connector of claim 2, wherein the mating interfaces include posts projecting from one of the fiber carrier modules that are received within corresponding openings defined by an adjacent one of the carrier modules.

4. The fiber optic connector of claim 2, wherein the fiber carrier modules are mechanically fastened together in the stacked arrangement or adhesively secured together in the stacked arrangement.

5. The fiber optic connector of claim 1, wherein the plurality of optical fibers are adhesively anchored to the fiber carrier modules at the fiber anchoring locations.

6. The fiber optic connector of claim 5, wherein the fiber passages of the fiber carrier modules define fiber buckling zones between the fiber anchoring locations and the first ends of the fiber carrier modules.

7. The fiber optic connector of claim 6, wherein the fiber carrier modules include capillary flow stops between the fiber anchoring locations and the fiber buckling zones for preventing adhesive from flowing from the fiber anchoring locations to the fiber buckling zones.

8. The fiber optic connector of claim 7, wherein the fiber carrier modules include groove arrangements adjacent the second ends of the fiber carrier modules, the groove arrangements including parallel coated fiber receiving grooves that extend to corresponding parallel bare fiber receiving grooves, the coated fiber receiving grooves having larger transverse cross-sectional areas as compared to the bare fiber receiving grooves, the bare fiber receiving grooves being positioned between the coated fiber receiving grooves and the fiber buckling zones, the coated fiber receiving grooves being positioned between the bare fiber receiving grooves and the second ends of the fiber carrier modules, the capillary flow stops being positioned at intermediate locations along the lengths of the bare fiber receiving grooves, coated portions of the plurality of optical fibers being adhesively secured within the coated fiber receiving grooves, and bare fiber portions of the plurality of optical fibers being adhesively secured in portions of the bare fiber receiving grooves extending from the capillary flow stops to the coated fiber receiving grooves.

9. A fiber optic component comprising:
- a module main body and a cover structure that mounts to the module main body;
- a fiber anchoring location defined in a first side of the module main body where optical fibers are anchored by adhesive; and
- a capillary flow stop defined in the first side of the module main body for preventing the adhesive from migrating from the fiber anchoring location;
- wherein a first side of the cover structure includes alignment pins that fit within alignment openings defined in the first side of the module main body, the alignment openings being positioned on opposing sides of the fiber anchoring location;
- wherein the first side of the cover structure includes an adhesive injection port for injecting adhesive into the fiber anchoring location for locking the optical fibers in place, and a cavity that surrounds the adhesive injection port for facilitating the flow of injected adhesive throughout the entire fiber anchoring location.

10. The fiber optic component of claim 9, wherein a second side of the main module body includes a cross-channel coinciding with the fiber anchoring location.

11. The fiber optic component of claim 9, wherein a second side of the cover structure includes a cross-channel.

\* \* \* \* \*